US006263302B1

(12) United States Patent
Hellestrand et al.

(10) Patent No.: US 6,263,302 B1
(45) Date of Patent: Jul. 17, 2001

(54) HARDWARE AND SOFTWARE CO-SIMULATION INCLUDING SIMULATING THE CACHE OF A TARGET PROCESSOR

(75) Inventors: Graham R. Hellestrand, Foster City, CA (US); King Yin Cheung, Kowloon (HK); James R. Torossian, Whale Beach (AU); Ricky L. K. Chan, East Lindfield (AU); Ming Chi Kam, Kingsford (AU); Foo Ngok Yong, Burwood (AU)

(73) Assignee: Vast Systems Technology Corporation, Sunnyvale, CA (US)

( * ) Notice: Subject to any disclaimer, the term of this patent is extended or adjusted under 35 U.S.C. 154(b) by 0 days.

(21) Appl. No.: 09/491,390

(22) Filed: Jan. 26, 2000

Related U.S. Application Data

(63) Continuation-in-part of application No. 09/430,855, filed on Oct. 29, 1999.

(51) Int. Cl.[7] .............................. G06F 9/455; G06F 17/50
(52) U.S. Cl. ............................ 703/17; 703/19; 703/20; 703/22
(58) Field of Search .................................. 703/13, 17, 19, 703/6, 28, 14, 22, 27; 716/3, 18

(56) References Cited

U.S. PATENT DOCUMENTS

| 5,546,562 | * | 8/1996 | Patel ........................................ 703/14 |
| 5,838,948 | * | 11/1998 | Bunza .................................... 703/27 |
| 5,943,490 | * | 8/1999 | Sample .................................. 703/28 |
| 5,946,472 | * | 8/1999 | Graves et al. ........................ 703/6 |
| 6,052,524 | * | 4/2000 | Pauna .................................... 703/22 |
| 6,110,220 | * | 8/2000 | Dave et al. ........................... 716/3 |
| 6,178,542 | * | 1/2001 | Dave .................................... 716/18 |

OTHER PUBLICATIONS

Guerra et al., Lisa Cycle and Phase Accurate DSP Modeling and Integration for HW/SW Co–Verification, ACM 1–581113–092, 9/99/0006, 36th Design Automation Conference (ACM Inc) New Orleans, 1999, pp. 964–969, Jul. 1999.*

Paulin et al., Pierre High–Level Synthesis and Codesign Methods: An Application to a Videophone Codec, Design Automation Conference, 1995, Proceedings EURO–DAC '95, IEEE 0–8186–7156–4/95, Apr. 1995, pp. 444–451, Apr. 1995.*

(List continued on next page.)

Primary Examiner—Kevin Teska
Assistant Examiner—Russell W. Frejd
(74) Attorney, Agent, or Firm—Dov Rosenfeld; Inventek

(57) ABSTRACT

A co-simulation design system that runs on a host computer system is described that includes a hardware simulator and a processor simulator coupled via an interface mechanism. The execution of a user program on a target processor that includes a cache is simulated by executing an analyzed version of the user program on the host computer system. The analysis adds timing information to the user program so that the processor simulator provides accurate timing information whenever the processor simulator interacts with the hardware simulator. The analysis also adds hooks to the user program such that executing the analyzed user program on the host computer system invokes a cache simulator that simulates operation of the cache.

86 Claims, 29 Drawing Sheets

OTHER PUBLICATIONS

Hellestrand, Graham Designing System on a Chip Products using Systems Engineering Tools, Proceedings of the 1999 IEEE International Symposium on Circuits and Systems, 1999, ISCAS '99, vol. 6, pp. 468–473, Jan. 1999.*

Cheung et al., T.K.–Y. A Multi–level Transformation Approach to HW/SW Codesign: A Case Study, Fourth International Workshop on Hardware/Software Co–Design, (Codes/CASHE '96), Proceedings, 1996, pp. 10–17, Sep. 1996.*

Liu et al., Jie Software Timing Analysis Using HW/SW Cosimulation and Instruction Set Simulator, Proceedings of the Sixth International Workshop on Hardware/Software Codesign, (CODES/CASHE '98), 1998, pp. 65–69, Jan. 1998.*

Gelinas et al., Bob Leah: An Introduction to Behavioral Abstraction and Co–Simulation Using Perl and Verilog, 1996 IEEE International Verilog HDL Conference, 1996, pp. 81–88, Jul. 1999.*

* cited by examiner

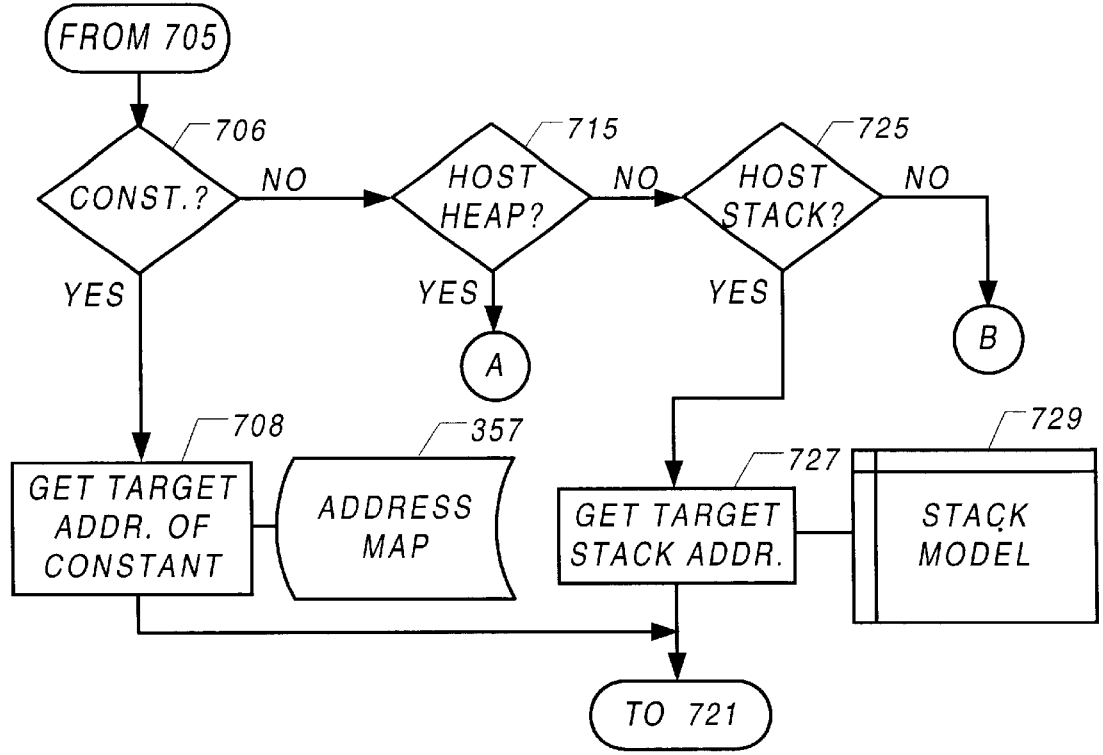
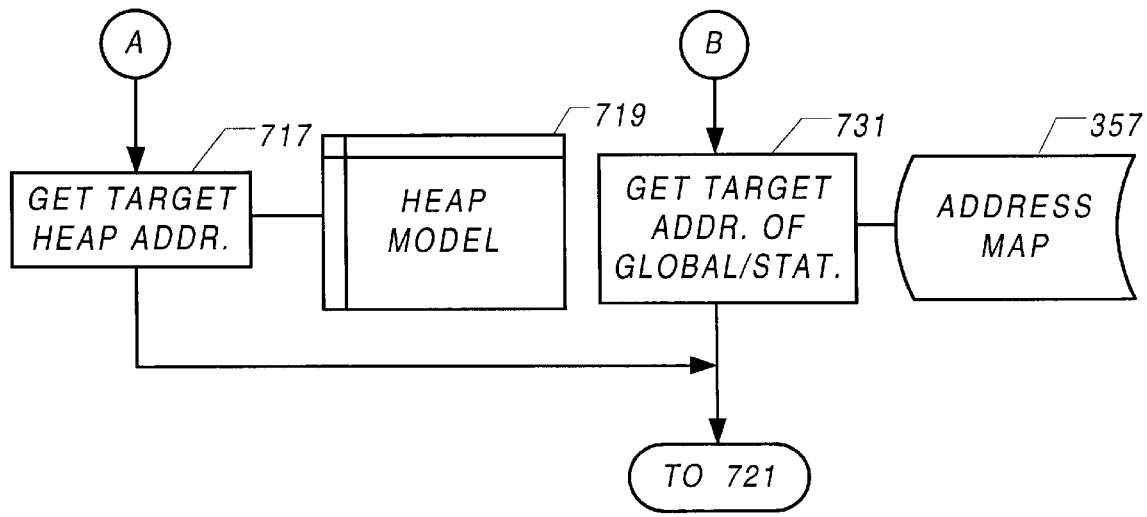
FIG. 7B

```
/****
   factorial.c

This is an example user program (with two functions)to
   demonstrate code insertion.
****/
include <stdio.h> static int buf[123];
static int d;

short
fac1(unsigned short n)
{
      unsigned short result = 1;
      unsigned short i;

for (i = 2;
           i <= n; i ++)
      {
           result *= i;
      }
      return result;
} void
processor1_pli()
{
      unsigned short result1;

result1 = fac1(8);
      (void) printf ("Factorial 8: %u\n", result1);
      (void) printf ("Time: %d\n", d);
      (void) printf ("Buf: %d\n", buf[0]);
/****
   VAST_DEBUG VAST_END and VAST_ELSE translate to the
   compilation directives # ifdef VAST_DEBUG, # endif, and
   # else, respectively. VAST_DEBUG is a name which is set
   in the analysis process when a particular flag is true
   and is only defined for host (not target) compilation.
****/
VAST_DEBUG ();
//VST_NOT_TIMED( );
      (void) printf ("Time %lu\n", (unsigned long) _VPAgdy);
VAST_ELSE ();
      (void) printf ("Time2 %d\n", d);
VAST_END ( ) ;
}
```

FIG. 12

```
/****
    vpm_factorial.c

This is an example of code inserted in a simple user
    program "factorial.c" with two functions.

Only fragments of the analyzed user program are shown
    here.
****/

...

/****
    The following indicates we are at line 1.
    Code is now inserted. A "dummy" name VPA_nf is
    used so that the debugger (Gnu's GDB), when it
    encounters the name VPA_nf, is prevented from
    stopping at any instruction (which are inserted
    instructions) until a proper name (e.g., back
    to fact16.c) is encountered
****/
#line 1 "VPA_nf"
/****
    The global variable _VPAgdy is the global delay
    variable. It is global to allow modules to be
    linked together.
****/
extern unsigned long long _VPAgdy;
/****
    Define _VPAproc. This is used to allow more than one VPM
    to share the same code. The timing information is in a
    table. _VPAproc is a switch to switch between different
    tables that are for different
    processors.
****/
extern unsigned _VPAproc;
/****
    Define limit before suspending operation
 ****/
extern unsigned long long _VPAdylmt;
/****
    Delay Time of the blocks in this code is in a
    local array _VPAtab0. There are four blocks
    in the particular code, and the delay times
    as determined by static analysis are 9, 23,
    12, and 25 cycles, respectively
****/
static long _VPAtab0[4] = {9, 23, 12, 25 };
```

FIG. 13A

```
/****
   Size of the blocks in this code is in a
   local array _VPAsz0. There are four blocks
   in the particular code, and the sizes
   as determined by static analysis are 36, 52,
   48, and 100 bytes, respectively.
****/
static long _VPAsz0[4] = {36, 52, 48, 100 };
/****
   Accumulated sizes of the functions up to each
   block boundary and starting with 0 at the start
   of a new function is in an array _VPAfacc0.
   There are two functions in this code.
****/
static long _VPAfacc0[4] = {0, 36, 88, 0 };
/****
   Define _ VPAtab, VPAsz, VPAfacc.  These are the set of
   time tables and sizes and facc for different processors
   that may share the same code. Thus, _VPAtab[0] is
   _VPAtab0, the table for this processor.
****/
static long *_VPAtab[13] =
   {_VPAtab0,0,0,0,0,0,0,0,0,0,0,0,0};
static long *_VPAsz[13] =
   {_VPAsz0,0,0,0,0,0,0,0,0,0,0,0,0};
/****
   define  function IDs
  ****/
static unsigned _VPAfid[2] = {0, 0 };
static unsigned long *_VPAfacc[13] =
   {_VPAfacc0,0,0,0,0,0,0,0,0,0,0,0,0};
/****
   Define VPAINC(I) as increasing _VPAgdy by _VPAtab0[I]
  ****/
#define _VPAINC(I) _VPAgdy+=_VPAtab[0][I]
/****
   declare the cache functions used
  ****/
extern void vpm_resetdc();
extern unsigned vst_NewFID(const char *);
extern unsigned long vst_ICache(unsigned, unsigned long,
   unsigned long);
extern unsigned long vst_DCache();
```

FIG. 13B

```
/****
   include the cache library and declare more cache
   functions
 ****/
#line 1 "VPA_nf"

#include "vpm.h"
extern unsigned vst_ICacheOn;
extern unsigned vst_DCacheOn;
extern unsigned vst_NextICacheOn;
extern unsigned vst_NextDCacheOn;
extern void vst_prenextbreak();
extern void vst_postnextbreak();
extern void vpm_dc(const void*, unsigned, unsigned);
extern void vpm_flushwrite();
extern int vpm_Index(const char *);
extern char *vst_UserData;
/****
   these are the replacements for malloc, free, etc.
 ****/
#define malloc(s) vst_malloc(s)
#define free(s) vst_free(s)

...

/****
   Define VPACMP(I) as increasing _VPAgdy by _VPAtab0[I]
   using above defined function _VPAINC(I);
 ****/
#define VPACMP(I) _VPAINC(I);vst_ICacheOn=vst_NextICacheOn;
   vst_DCacheOn=vst_NextDCacheOn /****
   The following indicates we are at line 1 of
   the program "factorial.c"
****/ line 1 "factorial.c"
1 "vpmdir/vpm_sout.c"
# 1 "VPA_nf"
# 1 "factorial.c"
```

FIG. 13C

```
1 "factorial.c" 2 static int buf[123];
static int d;

short
fac1(unsigned short n)
{{}
/****
   The following indicates we are at line 9.
   Code is now inserted.
****/
#line 9 "VPA_nf"
/****
   Get new function ID for this function "fac1"
 ****/
if (vst_ICacheOn && (!_VPAfid[0])){_VPAfid[0] =
   vst_NewFID("fac1"); }
/****
   Increment _VPAgdy by _VPAtab0[0];
 ****/
VPACMP(0);
{
/****
   The following indicates we are back in function
   "factorial.c" at the same line number as when we last
   inserted code
****/
#line 9 "factorial.c"

unsigned short result = 1;
   unsigned short i;
#line 11 "VPA_nf"
/****
   Data cache for the passed parameter "n"
 ****/
vpm_dc(&(n), 0, sizeof(n));
#line 11 "factorial.c"

#line 13 "VPA_nf"
```

FIG. 13D

```
/****
   Block boundary.
   Disable interrupts (asynchronous events) so that they
   cannot occur while any bus cycles that are needed in case
   of a cache miss
****/
if (vst_DCacheOn || vst_ICacheOn){ vst_prenextbreak();
   vast_disableasynevent(); }
/****
   Make the ICache() call for the linear code block. Note
   that if there is a cache miss, may involves bus
   transactions. When there are bus transactions
   "vst_Icache" always returns zero value since any delay is
   consumed in the hardware simulator.
****/
if (vst_ICacheOn){ _VPAgdy
   +=vst_ICache(_VPAfid[0],_VPAfacc[_VPAproc][0],
   _VPAsz[_VPAproc][0]); }
/****
   Make the DCache() call for any "vpm_dc" calls in the
   previous linear  code block. Note that if there is cache
   miss, may  * involves bus transactions in which case the
   DCache() call always returns zero value. Also reset the
   D-cache.
****/
if (vst_DCacheOn){ _VPAgdy +=vst_DCache(); vpm_resetdc(); }
/****
   Enable interrupt (asynchronous events)
****/
if (vst_DCacheOn || vst_ICacheOn){ vast_enableasynevent();
   vst_postnextbreak(); } line 13 "factorial.c"
/****
   Note the next two code lines, which in the original user
   program are
       for (i = 2;
            i <= n; i ++)
   so that appropriate vpm_dc() calls are inserted to make
   sure accesses are placed in table to be processed at the
   end of the linear block
****/
```

FIG. 13E

```
for ((vpm_flushwrite(), vpm_dc(&(i), 0, sizeof(i)), i = 2);
   (vpm_flushwrite(), vpm_dc(&(i), 1, sizeof(i)),
   vpm_dc(&(n), 1, sizeof(n)),
      i <= n); (vpm_flushwrite(), vpm_dc(&(i), 1,
   sizeof(i)), vpm_dc(&(i), 0, sizeof(i)), i ++))
   {
#line 15 "VPA_nf"
/****
   Increment _VPAgdy
****/
VPACMP(1);
{
#line 15 "factorial.c"

#line 15 "VPA_nf"
vpm_flushwrite(); vpm_dc(&(i), 1, sizeof(i));
   vpm_dc(&(result), 1, sizeof(result)); vpm_dc(&(result),
   0, sizeof(result));
#line 15 "factorial.c"
      result *= i;vpm_flushwrite();
   }
#line 17 "VPA_nf"
/****
   Disable Synch events and call D cache and I cache
   simulators
   enable asynch events. Increment _VPAgdy for block
****/
if (vst_DCacheOn || vst_ICacheOn){ vst_prenextbreak();
   vast_disableasynevent(); }
if (vst_ICacheOn){ _VPAgdy
   +=vst_ICache(_VPAfid[0],_VPAfacc[_VPAproc][1],
   _VPAsz[_VPAproc][1]); }
if (vst_DCacheOn){ _VPAgdy +=vst_DCache(); vpm_resetdc(); }
if (vst_DCacheOn || vst_ICacheOn){ vast_enableasynevent();
   vst_postnextbreak(); }
} VPACMP(2);

#line 17 "factorial.c"

#line 17 "VPA_nf"
```

FIG. 13F

```
/****
   D cache reference for result.
****/
;vpm_flushwrite(); vpm_dc(&(result), 1, sizeof(result));
#line 17 "factorial.c"

#line 18 "VPA_nf"
/****
   Disable Synch events and call D cache and I cache
   simulators
   enable asynch events.
****/
if (vst_DCacheOn || vst_ICacheOn){ vst_prenextbreak();
   vast_disableasynevent(); }
if (vst_ICacheOn){ _VPAgdy
   +=vst_ICache(_VPAfid[0],_VPAfacc[_VPAproc][2],
   _VPAsz[_VPAproc][2]); }
if (vst_DCacheOn){ _VPAgdy +=vst_DCache(); vpm_resetdc(); }
if (vst_DCacheOn || vst_ICacheOn){ vast_enableasynevent();
   vst_postnextbreak(); } line 18 "factorial.c"
return result;vpm_flushwrite();
}
#line 19 "VPA_nf"
/****
   Disable Synch events and call D cache and I cache
   simulators
   enable asynch events.
****/
if (vst_DCacheOn || vst_ICacheOn){ vst_prenextbreak();
   vast_disableasynevent(); }
if (vst_ICacheOn){ _VPAgdy
   +=vst_ICache(_VPAfid[0],_VPAfacc[_VPAproc][2],
   _VPAsz[_VPAproc][2]); }
if (vst_DCacheOn){ _VPAgdy +=vst_DCache(); vpm_resetdc(); }
if (vst_DCacheOn || vst_ICacheOn){ vast_enableasynevent();
   vst_postnextbreak(); }
}
#line 19 "factorial.c"
```

FIG. 13G

```
/****
   Main PLI function
****/
void
processor1_pli()
{{}
#line 23 "VPA_nf"
/****
   New function ID
****/
if (vst_ICacheOn && (!_VPAfid[1])){_VPAfid[1] =
   vst_NewFID("processor1_pli"); }
VPACMP(3);
{
#line 23 "factorial.c"

unsigned short result1;
#line 24 "VPA_nf"
/****
   The data cache functions "result1"
****/
vpm_flushwrite(); vpm_dc(&(result1), 0, sizeof(result1));
#line 24 "factorial.c"

/****
   data cache funtions in next statements
****/ result1=fac1(8);vpm_flushwrite();vpm_dc(&(result1),1,size
   of(result1));
   (void)printf("Factorial8:%u\n",result1);vpm_flushwrite();
   vpm_dc(&(d),1,sizeof(d));
   (void)printf("Time:%d\n",d);vpm_flushwrite();
   vpm_dc(&(buf[0]),1,sizeof(buf[0]));
   (void)printf("Buf:%d\n",buf[0]);vpm_flushwrite();

#line 30 "VPA_nf"

#ifdef VAST_DEBUG
```

FIG. 13H

```
#line 30 "factorial.c"

(void) printf ("Time %lu\n", (unsigned long) _VPAgdy);

#line 33 "VPA_nf"

else line 33 "factorial.c"

(void) printf ("Time2 %d\n", d);

#line 35 "VPA_nf"

endif line 35 "factorial.c"

}
#line 36 "VPA_nf"
/****
   Disable asynchronous events, then I-cache, then D-cache,
   then
   enable asynchronous events
****/
if (vst_DCacheOn || vst_ICacheOn){ vst_prenextbreak();
   vast_disableasynevent(); }
if (vst_ICacheOn){ _VPAgdy
   +=vst_ICache(_VPAfid[1],_VPAfacc[_VPAproc][3],
   _VPAsz[_VPAproc][3]); }
if (vst_DCacheOn){ _VPAgdy +=vst_DCache(); vpm_resetdc(); }
if (vst_DCacheOn || vst_ICacheOn){ vast_enableasynevent();
   vst_postnextbreak(); }
}
#line 36 "factorial.c"
```

FIG. 13I

```
/**** vpm.info

This file contains the name of processor model, the name
  of file liked to produce the target image, the starting
  address (target) of the ROM, the end address (target) of
  the ROM, the starting address (target) of the RAM, and
  the end address (target) of the RAM.

Optional parameters include: target heap start address.
  Target heap end adress, target stack start address, and
  target stack end start address.
****/
processor1_pli r4000 {
factorial.c
} { 100000 300000 3000ff 600000 }
```

FIG. 14

```
/****
   processor1_pli.map

This is an example of the map generated for the program
   factorial.c for processor1.
****/
/****
    The first part of the map is for functions. Starts with
    number of functions, the table lines each have:
       Function name, host start address, Target start
       address, target end address.
****/
31
main 401874 a0012910 a001293f
open 0 a0012960 a001298b
sbrk 0 a001298c a00129ab
read 0 a00129ac a00129db
write 0 a00129dc a0012a0b
lseek 0 a0012a0c a0012a3b
close 0 a0012a3c a0012a63
isatty 0 a0012a64 a0012a8b
fstat 0 a0012a8c a0012ab7
sleep 0 a0012ab8 a0012adf
usleep 0 a0012ae0 a0012b0f
fac1 401048 a0012b10 a0012ba3
processor1_pli 4015a8 a0012ba4 a0012c3f
printf 402a30 a0012c74 a0012cbf
vfprintf 0 a0012dc8 a0012dfb
cvt 0 a001438c a0014537
exponent 0 a0014538 a001460f
fflush 0 a00149d0 a0014aef
setlocale 0 a0014b74 a0014b9f
localeconv 0 a0014ba0 a0014bcf
std 0 a0014bd0 a0014c27
isinf 0 a0015310 a001535f
isnan 0 a0015360 a001539f
memchr 0 a00153a0 a00154bf
strlen 0 a00154c0 a001559f
quorem 0 a00155a0 a00157df
memmove 0 a0016c80 a0016d0f
strcmp 402a58 a0016db0 a0016e9f
malloc_extend_top 0 a0017020 a0017237
memset 0 a0017820 a00178ef
memcpy 0 a0018dc0 a0018eaf
==END== 0 0 0
```

FIG. 15A

```
/****
   The second part of the map is for data. Starts with
   number  of data entries, the table lines each have:
      host start address, host end address, target start
      address, target end address.
   Note that while d is four bytes, our compiler (GCC)
   reserved 15 bytes for d.
****/
5
0 0 a001a17c a001a183
0 0 a001a184 a001a1bf
/****
   This is the data for "d".
/****
4041f0 4041ff a001a1e0 a001a1ef
/****
   The next line is the data for "buf"
/****
0 0 a001a1f0 a001a20f
404000 4041ef a001a210 a001a3ff
```

FIG. 15B

HARDWARE AND SOFTWARE CO-SIMULATION INCLUDING SIMULATING THE CACHE OF A TARGET PROCESSOR

CROSS-REFERENCE TO RELATED APPLICATION

This is a continuation-in-part of U.S. patent application Ser. No. 09/430,855 filed Oct. 29, 1999 and entitled HARDWARE AND SOFTWARE CO-SIMULATION INCLUDING EXECUTING AN ANALYZED USER PROGRAM, the benefit of the filing of which is hereby claimed under 35 U.S.C. §120. U.S. patent application Ser. No. 09/430,855 is incorporated herein by reference.

FIELD OF THE INVENTION

The present invention relates to computer hardware simulators, and more specifically, to a system and method for the simulation of an electronic system that includes one or more target processors executing software and interacting with hardware.

BACKGROUND

Computer simulation of digital hardware systems has become a common technique to reduce the cost and time required for the design of such hardware systems. Simulating digital hardware allows a designer to predict the functioning and performance of the hardware prior to fabricating the hardware. As more and more digital systems incorporate a processor, including a microprocessor, a digital signal processor, or other special purpose computer processor, there has been increased effort to develop a simulation system that includes simulating the hardware and simulating the running of software on a processor that is included in the digital system. Having such a simulation system allows a designer to test the operation of software on the processor before a physical processor is available. Thus, for example, a designer may be able to start designing a system incorporating a new microprocessor before the manufacturer actually releases physical samples of the microprocessor. In addition, a system designer designing an integrated circuit or a system on a printed circuit board that includes a processor can, for example, use the simulation system to test the integrated circuit or printed circuit board implementation, including operation of software on the processor part, and any testing interactions between the processor and the other digital circuit elements of the integrated circuit or board, before the integrated circuit or board is fabricated. This clearly can save time and money.

Such a simulation system is called a co-simulation design system, a co-simulation system, or simply a design system herein, and the environment for operating such a co-simulation system is called a design environment. The processor is called a target processor and the computer system on which the environment operates is called the host computer system. The hardware other than the processor is called digital circuitry. The computer software program that is designed by a user to operate on the target processor is called the user program.

The target processor may be a separate microprocessor with the digital circuitry being external to the microprocessor (e.g., on a printed circuit board or elsewhere in the system), or may be a processor embedded in an application specific integrated circuit (ASIC) or a custom integrated circuit (IC) such as a very large scale integrated (VLSI) device, with the digital circuitry including some components that are part of the ASIC or IC, and other components that are external to the ASIC or IC.

A design environment capable of co-simulation requires 1) the capability of accurately simulating the digital circuitry, including timing, and 2) the capability of accurately simulating on the host processor the running of the user program on the target processor, including the accurate timing of operation of the user program and of any software/hardware interaction. The first requirement is available today in a range of hardware description languages (HDLs) such as Verilog and VHDL, and simulation environments using them. It also is available as a set of constructed libraries and classes that allows the modeling of hardware in a higher-level language such as 'C' or 'C++.' The second requirement is for a processor simulator using an executable processor model that both accurately simulates the execution of a user program on the target processor, and can interact with the digital circuitry simulation environment. Such a processor simulator should provide timing information, particularly at times of software/hardware interaction, i.e., at the software/hardware interface. A processor model that includes such accurate timing information is called a "quantifiable" model herein.

One known way of providing such processor simulation is to simulate the actual hardware design of the processor. This can be done, for example, by specifying a processor model in a hardware description language (HDL). Such a model is called an architectural hardware model herein, and a processor simulator derived therefrom is called a hardware architecture simulator herein. An architectural hardware model clearly can include all the intricacies of the processor design, and thus is capable of accurate timing. Since it is written in a hardware description language, it may be treated as a hardware device in a hardware simulation environment. The main but great disadvantage of simulating the operation of the processor by simulating the hardware in some HDL is the slow execution speed, typically in the range of 0.1–100 instructions per second.

Another known way of accurately simulating the execution of software on a processor for inclusion in a co-simulation environment is an instruction set simulator (ISS), wherein both the function and the sequencing of the microprocessor is mimicked in software. An instruction set simulator still executes relatively slowly, compared for example to how fast a program would be executing on the target processor. An ISS executes in the range of 1,000 to 50,000 instructions per second depending on the level of timing and operational detail provided by the model.

Both the ISS and the architectural hardware model approaches to simulating software are relatively slow, and users of such environments often express frustration at their inability to run simulations at practical speeds. HDL and ISS microprocessor models limit the number of software cycles that can be properly verified on a hardware-software modeling system; a few thousand per second is all they allow. On the other hand, real systems execute 50–1000 million instructions per second or more. From this arises a disparity of a factor between about 10,000 to 200,000 in performance, so that 3 to 60 hours of simulation may be needed to model 1 second of real-time target processor performance.

One solution to the slow speed of simulating a processor is to use a hardware processor model. This device includes a physical microprocessor and some circuitry for interfacing and interacting with the design environment simulating the digital circuitry. The memory for the target processor is simulated as part of the digital circuitry. Such an approach is fairly expensive. Another limitation is due to having two definitions of time operating on the same simulation system: simulation time of a hardware simulator, and processor time, which is real time for the hardware processor. Correlating these is difficult.

Another solution is to use an emulator as the target processor model. An emulator, like a hardware processor model, is a hardware device, typically the target processor, and usually includes some memory. The emulator is designed to emulate the operation of the microprocessor. Such a processor emulator when it includes memory can execute the user program directly, but again is expensive and may require the development of external circuitry to interact with the hardware simulator simulating the digital circuitry. U.S. Pat. No. 5,838,948 describes an environment that uses an emulator for speeding up the running of a user program in the design environment.

Behavioral processor simulators are known that can run a user program on the host computer system. With such an approach, the functional outcome of the software execution is combined with the outcome of executing the hardware models described, for example, in an HDL. While such processor models can run at more than 100 million instructions per second and have reasonable functionality, they include no timing or architectural precision, for example to accurately simulate the interaction between the digital circuitry and the processor.

One of the requirements for accurately simulating a processor is architectural precision. For example, modem processors include an instruction pipeline that enables the different stages of handling an instruction to be overlapped. For example, a simple modem pipeline may have the following 5 stages: instruction fetch (IF), instruction decode (ID), execute (EX), memory access (MEM) and write back (WB). After the pipeline is filled, the processor is capable of executing instructions five times faster than it would take an individual instruction to complete all five states. However, pipeline hazards are known that cause a pipeline to stall. For example, hazards occur because instructions that are overlapped in execution may require processor resources simultaneously, with insufficient resources available to service all the requirements of the instructions simultaneously. Hazards also may occur when one instruction is dependent on a preceding instruction, and the dependency cannot be satisfied because the instructions overlap in the pipeline. It is desired to be able to accurately simulate the operation of the user program, including taking into account pipeline effects such as hazards. Hardware architecture simulators and instruction set simulators can be specified to include these intricacies, but, as described above, such processor simulators are inherently slow. Thus, there is a need in the art for a processor simulator that can simulate a user program operating on a target processor with reasonable speed. There also is a need in the art for a design system that simulates an electronic system that includes digital circuitry and a target processor having a pipeline, the design system including a processor simulator that can simulate a user program operating on a target processor with reasonable speed. There also is a need in the art for a processor model of a target processor that has a pipeline for use in a design system that simulates an electronic system that includes digital circuitry and the target processor, the model providing for rapid simulation of a user program operating on a target processor and taking into account timing and pipeline effects such as pipeline hazards.

While sometimes it is desired to run a simulation with great precision at a high level of detail, at other times, less detail may suffice, enabling faster execution of the simulation. There therefore is a need in the art for an executable and quantifiable processor model that can be used in a co-simulation system and that models the operation of the target processor at an elected level of detail, including an elected level of detail at the hardware/software interface.

Computer networks are becoming ubiquitous, and it is desired to be able to operate a co-simulation design system on a computer network, with different elements of the design system running on different processors of the computer network to speed execution. Similarly, multiprocessor computers are also becoming commonplace, and it would be desirable to be able to operate a co-simulation design system on a computer network, with different elements running on different processors of the computer network.

Electronic systems nowadays may include more than one target processor. It is therefore desirable to have a co-simulation design system that provides for rapidly simulating such an electronic system, including simulating respective user programs executing on the target processors, such processor simulation providing timing detail that takes into account instruction timing and pipeline effects for target processors that include a pipeline.

Above-mentioned incorporated by reference U.S. patent application Ser. No. 09/430,855 (hereinafter "the Parent Application") describes a method and system for rapidly simulating on a host computer system a target processor executing a user program. The Parent Application describes a processor model for the target processor that operates up to the host processor speed and yet takes into account instruction timing and pipeline effects such as pipeline hazards. The model can be incorporated into a design system that simulates an electronic circuit that includes the target processor and digital circuitry. The Parent Application also describes using more than one such processor models in a design system that simulates an electronic circuit that includes more than one target processor and digital circuitry. A further feature described in the Parent Application is how a user can modify the processor model to include more or less detail.

Above-mentioned incorporated by reference U.S. patent application Ser. No. 09/430,855 describes a design system operating on a host computer system and simulating an electronic system that contains target digital circuitry and a target processor having a pipeline, the design system comprising a hardware simulator simulating the target digital circuitry, a processor simulator simulating the target processor executing a user program by executing the user program substantially on the host computer system, and an interface mechanism that couples the hardware simulator with the processor simulator including passing information between the hardware simulator and the processor simulator. The hardware processor provides a simulation time frame for the design system. In one version, at significant events, including events that require the user program to interact with the target digital circuitry, the operation of the processor simulator is suspended and associated event information is passed from the processor simulator to the hardware simulator. The operation of the processor simulator then is resumed when the hardware simulator processes information and passes an event result back to the processor simulator.

The processor simulator described in the Parent Application accumulates a simulation time delay when operating, the simulation time delay determined using timing information that accounts for instruction timing including pipeline effects. The timing information is determined by an analysis process performed on the user program in accordance to characteristics of the target processor including instruction timing characteristics and pipeline characteristics. Such an analysis process is called a static analysis process herein because the timing information is obtained by analyzing the user program prior to running the analyzed version of the user program on the processor simulator. The static analysis process comprises decomposing the user program into linear blocks of one or more instructions; determining the time delay for each linear block of the user program using characteristics of the target processor; and combining the linear block timing information with the user program to determine the timing information for the processor simulator.

Some timing information is not available by such static analysis. Many modern processors include memory cache to speed up memory accesses. A separate cache, called a data-cache or D-cache, might exist for data access, another cache, called an instruction cache or I-cache, might exist for instruction access. Any timing effects, such as cache misses in a D-cache or an I-cache, are dependent on the current state of the cache, and cannot be known until runtime. Static analysis cannot easily account for such timing.

Thus there still is a need for a design environment that operates on a host computer system which includes a mechanism for rapidly and accurately simulating the operation of a target processor that includes a cache system.

SUMMARY

The broad goal of the invention is a method and system for rapidly simulating on a host computer system a target processor executing a user program, with the target processor including a cache. One feature of the invention is providing a processor model for the target processor that operates up to the host processor speed and yet takes into account instruction timing and cache effects. As an additional feature, the processor model also takes into account pipeline effects such as pipeline hazards for the case of the processor having a pipeline. Another feature of the invention is providing such a processor model that is modifiable by a user to include more or less detail. Another feature of the invention is providing such a processor model that can be incorporated into a design system that simulates an electronic circuit that includes the target processor and digital circuitry. Another feature of the invention is using more than one such processor model in a design system that simulates an electronic circuit that includes more than one target processor and digital circuitry.

Described herein is a design system operating on a host computer system and simulating an electronic system that contains target digital circuitry and a target processor having a cache, the design system comprising a hardware simulator simulating the target digital circuitry, a processor simulator simulating the target processor executing a user program by executing the user program substantially on the host computer system, and an interface mechanism that couples the hardware simulator with the processor simulator including passing information between the hardware simulator and the processor simulator. The processor simulator includes a cache simulator that simulates operation of the cache to account for the effects of cache misses on timing. The hardware processor provides a simulation time frame for the design system. In one version, at significant events, including events that require the user program to interact with the target digital circuitry, the operation of the processor simulator is suspended and associated event information is passed from the processor simulator to the hardware simulator. The operation of the processor simulator then is resumed when the hardware simulator processes information and passes an event result back to the processor simulator.

The processor simulator accumulates a simulation time delay when operating, the simulation time delay determined using timing information that accounts for instruction timing. The timing information is determined by an analysis process performed on the user program in accordance to characteristics of the target processor including instruction timing characteristics.

According to one aspect of the invention, the hardware simulator passes resumption control information to the processor simulator after the most recently accumulated simulation time delay has been consumed by the hardware simulator.

The analysis process comprises decomposing the user program into linear blocks of one or more instructions; determining, using characteristics of the target processor; the time delay for each linear block of the user program that would be incurred by executing the linear block with no cache misses, and combining the linear block timing information with the user program to determine the timing information for the processor simulator. The analysis process also includes determining those parts of the user program that include one or more references that might require a cache lookup, and inserting hooks into the user program to invoke, at run time, the cache simulator for at least one reference that includes a memory reference that requires a cache lookup.

In one embodiment, the hardware simulator runs on an HDL and at least some of the digital circuitry is specified in the HDL. In another embodiment, all or some of the digital circuitry is described to the hardware simulator in a higher-level language such as such as 'C' or 'C++.'

In accordance with another aspect, a method is described of simulating on a host computer system the execution of a user program on a target processor having a cache, the method comprising decomposing the user program into linear blocks, determining linear block timing information including the time delays that would be incurred executing each linear block of the user program on the target processor with no cache misses, identifying those parts of the user program that include one or more memory references that might require a cache lookup, inserting hooks into the user program to invoke, at run time, a cache simulator that simulates the operation of the cache for the memory reference to account for cache misses in timing, and executing the combined user program and linear block timing information and inserted hooks on the host computer system, such that the execution on the host computer system simulates the execution of the user program on the target processor including providing accurate execution timing that takes into account instruction timing and cache effects, including pipeline effects for a processor that has a pipeline. The determining of the block timing information uses characteristics of the target processor, including instruction timing characteristics, so that the block timing information takes into account instruction timing. The determining of the block timing information also includes combining the linear block timing information with the user program and inserted hooks.

One implementation described is when the user program includes statements in a higher-level language such as 'C', 'C++', Java®, ADA, FORTRAN, ALGOL, PASCAL, SIMULA, LISP, APL, and so forth. In this implementation, the step of decomposing the user program into linear blocks includes parsing the user program to determine linear block boundaries. The determining of the time delay for each linear block then further comprises cross-compiling the user program to produce target code, parsing the cross-compiled target code to determine the time delay for each line in each section of the target code corresponding to each linear block in the user program, and determining the time delay for each linear block of the user program from the time delays determined in the target code parsing step. The time delay determination uses characteristics of the target processor. According to a particular implementation, combining the linear block timing information with the user program produces an analyzed user program that includes instructions for accumulating the timing delay, and the executing step executes the analyzed user program on the host processor.

In accordance with another aspect of the invention, described herein is a method for creating a model for simulating the operation of a target processor on a host computer system. The model comprises a processor model shell for operation on a hardware simulator that simulates activity of one or more entities of the target processor accessible to digital circuitry external to the processor. The model also comprises a software shell to provide a user program programming access to the signals accessible to digital circuitry external to the processor. Also in the model is a cache simulator. Also in the model is target processor specific information for use in analyzing a user program to determine user program timing information such that when the user program is run on a processor simulator operating on a host computer system, the processor simulator accurately simulates execution as if the user program was executing on the target processor, including providing timing that takes into account instruction timing and cache effects. The user program analyzing process includes decomposing the user program into linear blocks, determining linear block timing information including the time delays that would be incurred executing each linear block of the user program on the target processor with no cache misses, identifying those parts of the user program that include one or more memory references that might require a cache lookup, inserting hooks into the user program to invoke, at run time, a cache simulator that simulates the operation of the cache for the memory reference.

In a particular implementation, the processor model shell includes an interface to hardware description language instructions such as VHDL or Verilog instructions, and the software shell comprises an interface code written in a higher-level computer language, such as 'C' or 'C++'. In another version in which the hardware simulator provides for simulating digital hardware in a higher-level language, the processor model shell includes an interface to code in such a higher-level computer language.

Other features and aspects of the invention will become clear from the detailed description that follows.

DESCRIPTION OF THE FIGURES

The present invention will be more fully understood from the detailed preferred embodiments of the invention, which, however, should not be taken to limit the invention to any specific embodiment but are for explanation and better understanding only. The various embodiments in turn are explained with the aid of the following figures:

FIG. 7B shows a flow chart of the host memory to target memory translation step of the flow chart of FIG. 7A according to an embodiment of the invention;

FIG. 12 shows a sample user program used to illustrate code insertion according to an embodiment of the invention;

FIGS. 13A–13I show the analyzed program resulting from the sample program of

FIG. 12 after code insertion according to an embodiment of the invention;

FIG. 14 shows sample information file describing the name of the processor and the target memory partitioning that was used with the analyzed program of FIGS. 13A–13I;

FIGS. 15A and 15B show the host-target memory map used for the examples of FIG. 12, FIGS. 13A–13I, and FIG. 14 according to an embodiment of the invention;

DETAILED DESCRIPTION OF THE PREFERRED EMBODIMENTS

Figure 1:
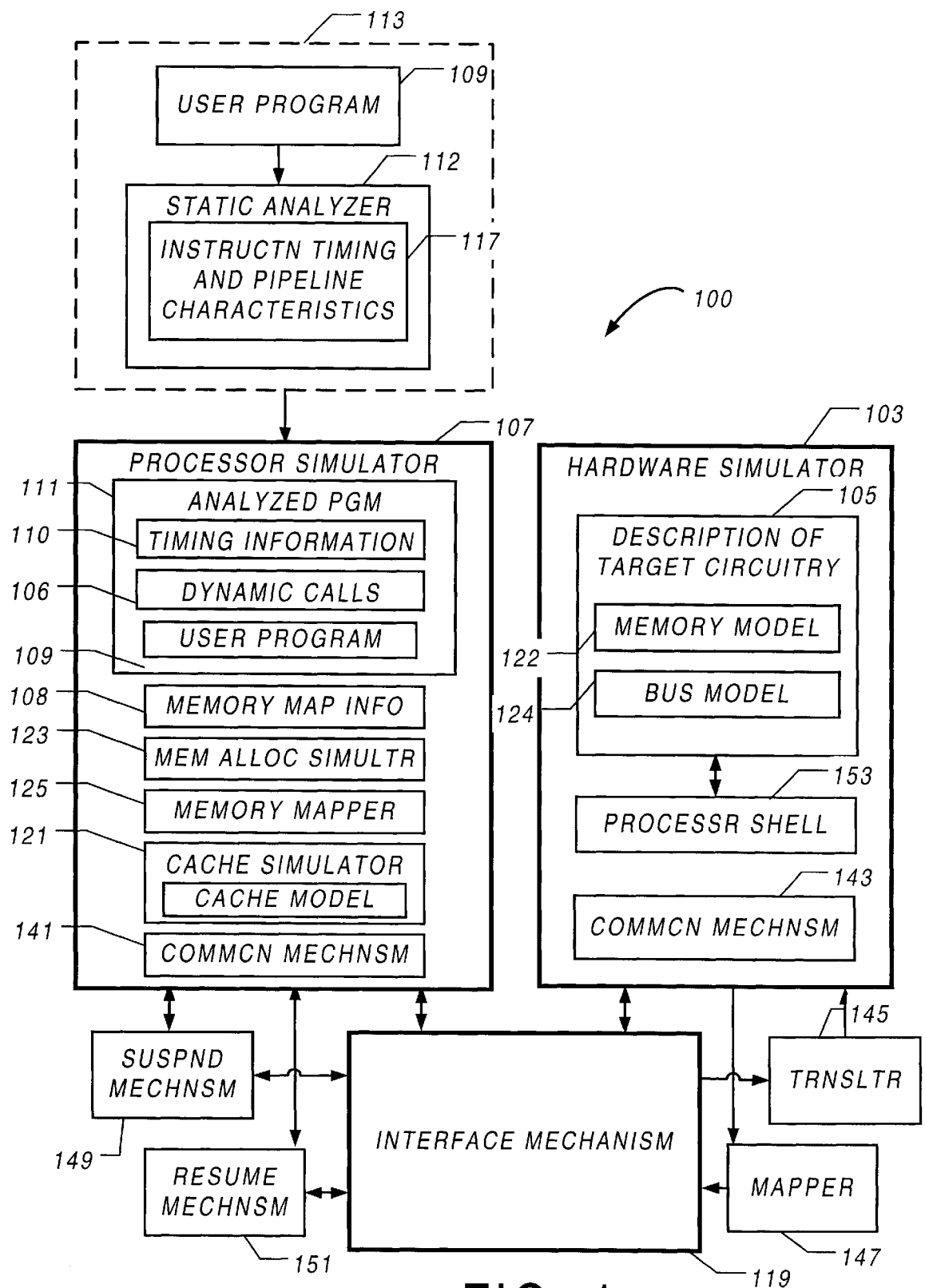
FIG. 1 shows a single processor embodiment of a co-simulation design system according to the invention.

The first one or two digits in a reference numeral indicate on which figure that reference numeral is first introduced.

Figure 2:
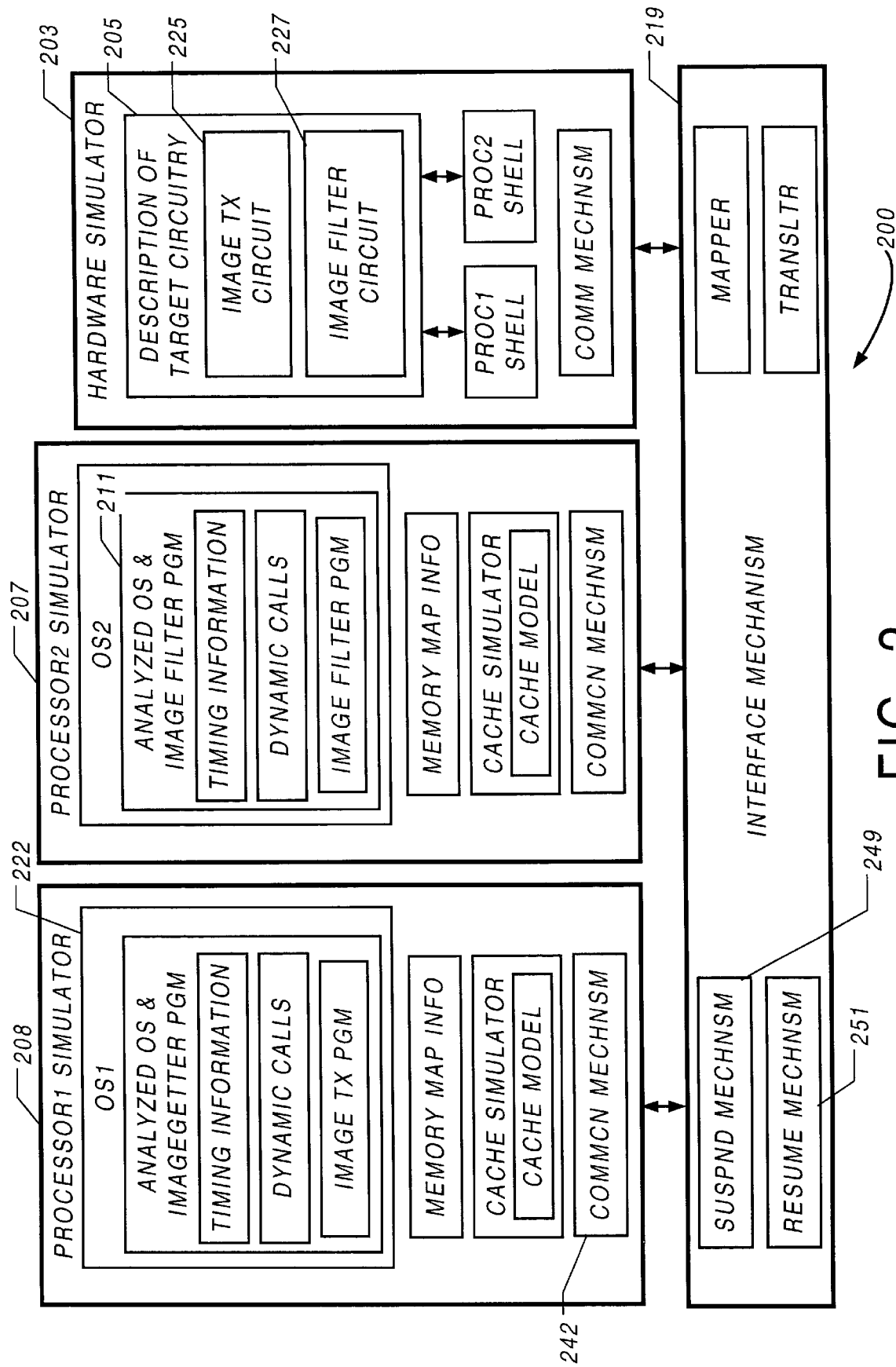
FIG. 2 shows a dual processor embodiment of a co-simulation design system according to the invention.
Figure 10:
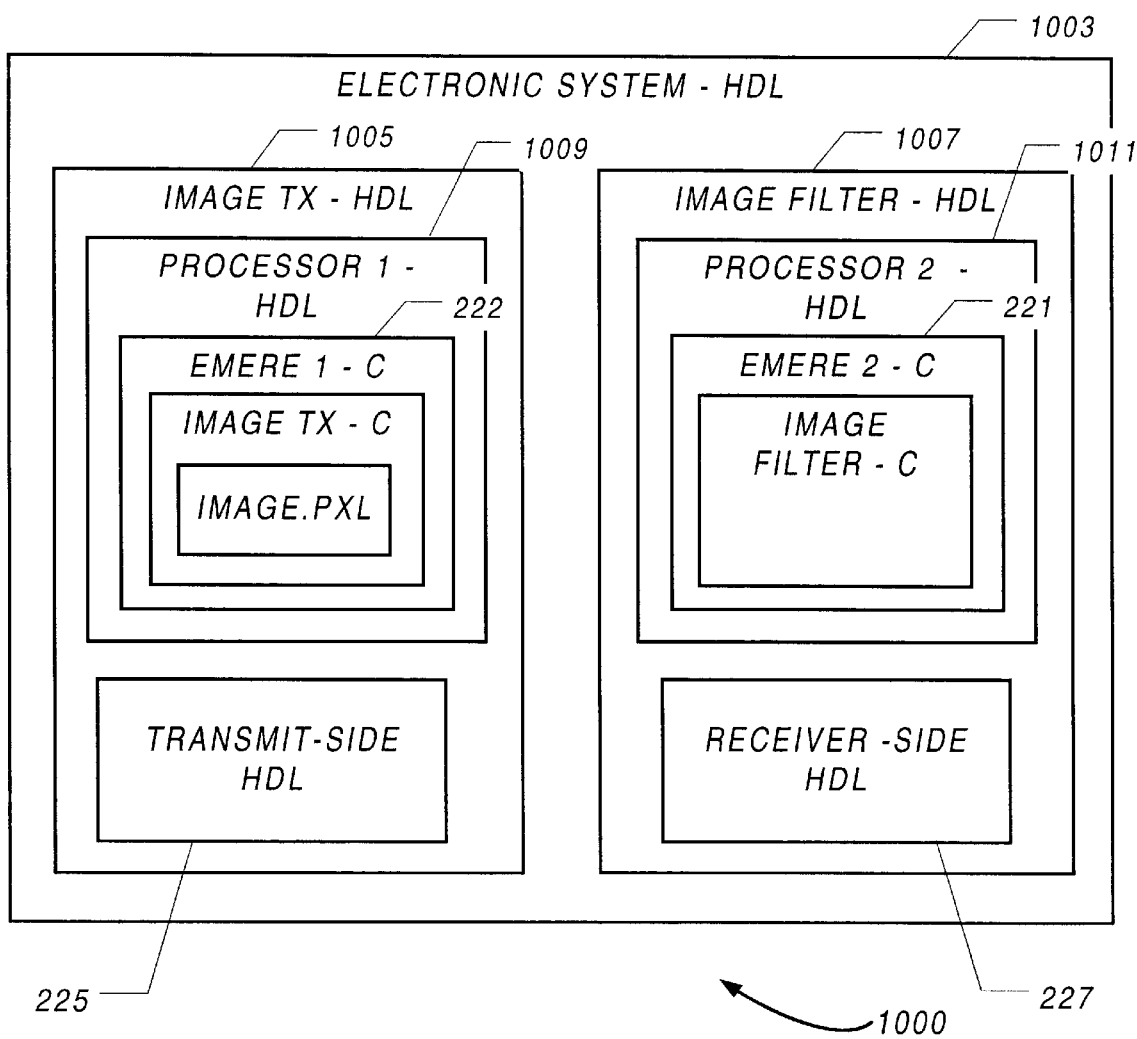
FIG. 10 shows a set of modules used to simulate the system of FIG. 8 according to an embodiment of the invention.

For example, any reference numerals between 100 and 199 are first introduced in FIG. 1, any between 200 and 299 are first introduced in FIG. 2, any between 1000 and 1099 are first introduced in FIG. 10, and so forth.

The method, processor model, and system embodiments of the invention include components that operate on a host computer system. The host computer system may be a single computer, for example, a computer workstation. Such workstations are readily available, and may operate under any operating system (OS) such as any variants of the UNIX operating system (including LINUX™), or any variants of Microsoft Windows® (e.g., Windows NT, Windows 98, or Windows 2000 from Microsoft Corporation, Redmond, Wash.), or the Mac OS® (Apple Computer, Cupertino, Calif.). Some embodiments operate under a computer network that includes a plurality of host processors interconnected as a network, while other embodiments run on a multiprocessor computer that includes a plurality of host processors. The term "host computer system" thus means a computer system with a single host processor, or a plurality of interconnected host processors that may be interconnected as a network, or a multiprocessor computer.

FIG. 1 shows a design system embodiment of the present invention. Design system 100 operates on a host computer system and simulates an electronic system that contains target digital circuitry and at least one target processor executing a user program. The target processor typically may or may not have a pipeline, and includes either a virtual memory system or a cache system, the cache system being either a single cache or a separate data cache and instruction cache. A hardware simulator 103 simulates the target digital circuitry. In the preferred embodiment, the hardware simulator operates in a hardware description language, in particular Verilog, and so the description 105 of the target digital circuitry is provided by the user in the form of Verilog code. The invention can also work with other hardware description languages such as VHDL, and with hardware descriptions in terms of libraries, or libraries and classes written in a higher-level language such as 'C,' or 'C++.' Thus, the invention does not depend on the particular hardware models used in the hardware simulator 103.

Co-simulation design system 100 also includes a processor simulator for each processor that simulates the target processor executing the user program, and one such processor simulator is shown as 107. The processor simulator 107 executes the user program substantially on the host computer system, which provides for extremely rapid simulation of the software. While only one processor is shown, the simulation system can accommodate additional processor simulators of additional target processors to simulate a multiprocessor system.

Processor simulator 107 simulates execution of a user program 109 on the target processor by executing an analyzed version 111 of the user program 109. The analyzed version of the user program is thus a program derived from the user program by an analysis process. The analyzed version includes the user program, and timing information on how the target processor would execute the user program 109 such that while the host processor executes the analyzed version 111 of the user program, the processor simulator 107 generates accurate execution timing information incorporating the target processor instruction timing as if the user program 109 was executing on the target processor. For processors that have a pipeline, the timing information incorporates pipeline effects. Furthermore, for a processor that includes a cache, the processor simulator includes a cache simulator 121 executing a cache model, and a memory mapper 125 that translates between host memory addresses and target memory addresses using memory mapping information 108 relating host addresses to target addresses.

An interface mechanism 119 is coupled to both the processor simulator 107 and the hardware simulator 103 and enables communication between processor simulator 107 and hardware simulator 103. Processor simulator 107 includes a communication mechanism 141 to pass information to the hardware simulator 103 using the interface mechanism when an event requires interaction of user program 109 with the target digital circuitry. Such events include times when user program 109 encounters an input/output instruction, or when the program has an arithmetic exception during execution, and other significant events.

In one embodiment, the target digital circuitry includes a target memory for the target processor, and the hardware simulator provides for simulating at least some of the operations of the target memory by running a hardware model 122 of the target memory, with the contents of the simulated target memory stored in the host computer system. Typically, the user selects to simulate only some bus transactions that may occur in executing the user program by running bus hardware model 124 on the hardware simulator.

In another embodiment, the co-simulation design system 100 provides for accurately simulating bus transactions. In such an embodiment, the description 105 of the target digital circuitry includes a bus hardware model 124 of the bus of the target processor. At least some of the operations of the target processor bus may be simulated by running bus hardware model 124 on the hardware simulator. Typically, the user may select to simulate only some bus transactions that may occur in executing the target processor by running bus hardware model 124 on the hardware simulator.

When both the target processor bus and the target processor memory are simulated by target memory model 122 and target bus model 124, a significant event may include, for example, the cache simulator's determining that a cache miss has occurred that requires a number of bus cycles and memory accesses to be simulated in the bus model 124 and memory model 122 of the target digital circuitry. In such an example, the user may choose to simulate these bus and memory transactions using the target memory model 122 and target bus model 124. Note that the memory model 122 preferably does not store actual data but rather uses the memory of the host computer system for data storage. Similarly, the bus model 124 preferably does not move actual data but rather simulates the timing the bus cycles required to move data.

The hardware simulator 103 also includes a communication mechanism 143 to pass information to processor simulator 107 using the interface mechanism at events significant to the hardware simulator 103 that need to be communicated to the processor simulator. Such an event includes when a signal in the target digital circuitry connected to the target processor is asserted, for example, an interrupt.

The interface mechanism 119 passes the information across the hardware/software boundaries. The preferred embodiment interface mechanism 119 includes a message passing kernel. Thus, in the preferred embodiment, both the processor simulator and the hardware simulator communication mechanisms 141 and 143 are included in interface mechanism 119. Also, the processor simulator and the hardware simulator are tasks under the kernel, and the kernel provides the mechanism for the tasks to communicate whenever one or the other task requires it. When several processor simulators operate, each runs independently as a task under the kernel.

Those in the art will appreciate that other types of interface mechanisms are possible, including using multiple threads, and using a complete or partial operating system.

The hardware simulator and the processor simulator each has its own definition of time, i.e., its own time domain, with the interface mechanism providing a mechanism to synchronize time whenever processor simulator 107 and hardware simulator 103 need to communicate. Similarly, when several processor simulators operate, each processor simulator has its own concept of time, as does the hardware simulator.

As shown in block 113, the analyzed version 111 of the user program is obtained by an analysis process performed on user program 109 by analyzer 112. Analysis is described in more detail below and briefly includes 1) inserting dynamic hooks 110 in the form of calls to functions that during execution invoke dynamic mechanisms that may effect timing and that cannot be determined ahead of execution. For example, dynamic hooks 110 may include calls to functions that invoke the cache simulator 121 when there are memory references in the user program 109 that might produce a cache miss, 2) decomposing the user program 109 into linear blocks (which can be as short as a single instruction) and 3) calculating for each linear block the time delay that would be incurred by executing that linear block on the target processor. In the case the processor simulator includes the memory allocation simulator 123, analysis further includes inserting hooks in the user program to invoke the memory allocation simulator during execution of the analyzed program that correspond to dynamic memory allocations that would occur if the user program was being executed on the target processor.

The time calculating uses characteristics 117 of the particular target processor, including instruction timing and characteristics of the processor. Such processor characteristics may include pipeline characteristics for a target processor that includes a pipeline so that the result is the analyzed program which includes the instruction of user program 109, and timing information 110 that includes pipeline effects.

While the analyzed program 111 of the preferred embodiment includes the timing information 110 in the form of additional programming instructions that accumulate a simulation time delay while the user program is executed, in alternate embodiments, the timing information may be included in the analyzed version in the form of a timing information data structure, such as an array of timing delays for each block. In such a case, the processor simulator would include instructions external to the analyzed version of the program to accumulate the delay while the user program is executing on the host computer system. Similarly, while the dynamic hooks inserted, for example, for invoking the cache simulator are in the form of additional programming instructions that call functions that during run time invoke the required dynamic part, data structures may be used to refer to programming instructions that are external to the analyzed version of the user program. Such alternatives also are envisaged in the invention.

When an event occurs that requires the processor simulator to communicate to the hardware simulator, the processor simulator's communication mechanism 141 sends information to hardware simulator 103 associated with the event through the interface mechanism 119. The hardware processor receives the associated event information and processes it. Typically, the event may be an input/output instruction in the user program to send information or to poll a port or to execute a number of bus cycles, or otherwise to interact with the hardware simulator.

The associated event information preferably includes time delay information indicating an amount of simulated time since a previous event occurred, such as when the processor last started or resumed operation, or when the processor simulator last sent event information, or when the hardware simulator last received event information. The hardware simulator 103, upon receiving the time delay information, executes for an appropriate amount of hardware simulation time.

The design system 100 also includes a translator 145 that translates information from a first format understandable in the user program domain, e.g., a program function call or a memory mapped I/O instruction, to a second data format understandable in the hardware simulator domain, for example, when the digital circuitry is described in HDL, by some HDL code to indicate signal line assertion. For example, when the user program is in 'C' and the target digital circuitry is defined in Verilog, the translator 145 can translate a C variable passed to an output function call to the corresponding Verilog variable in the digital circuitry description.

Typically, the processor simulator 107 operates much faster than the hardware simulator 103. That is, simulation time is consumed much faster (in real time) on a processor simulator than on a hardware simulator because hardware simulator 103 of design system 100 models the digital circuitry 105 in detail, while the processor simulator 107 does not model the architectural detail of the target processor, but rather runs the user program substantially on the host computer system. The timing detail comes as a result of the analysis process 113 and in accumulating the delay during processing using timing information 110.

In the preferred embodiment, the hardware simulator provides a simulation time frame for the design system. That is, simulation time is started and maintained by the hardware simulator, and whenever synchronization is required, all times are synchronized to the hardware simulation time, which is the simulation time for the system.

The design system also includes a suspend mechanism 149 and a resume mechanism 151 coupled to the processor simulator that allow the processor simulator to suspend and resume operation. In the preferred embodiment, the suspend and resume mechanisms are in the interface mechanism 119 and provide for suspending and resuming operation of any task. In the preferred embodiment, when the processor simulator sends associated event information which includes time delay information, it passes a message to the kernel in the interface mechanism that causes the processor simulator to be suspended. The resumption mechanism uses the interface mechanism to place events on an event queue in the hardware processor. Thus, when the processor simulator suspends, the kernel also restarts the hardware simulator and places instruction in the hardware simulator's event queue to resume the processor simulator at some later time. The hardware processor then continues until an event is reached which causes the processor simulator to resume, for example, a previously scheduled resumption of the processor simulator in its event queue.

Thus, in the preferred embodiment, the suspend and resume mechanisms of the interface mechanism 119 use an event queue which is in the hardware simulator. Those in the art will appreciate that other interface mechanisms and resume and suspend mechanisms may be used. For example, in an alternate embodiment, the processor simulator and the hardware simulator are independent tasks running under the interface mechanism, and the interface mechanism scheduled all tasks by maintaining its own one or more event queues.

Thus, in the preferred embodiment, when associated event information including time delay information is sent by processor simulator 107 to hardware simulator 103, the suspend mechanism suspends operation of processor simulator 107 while hardware simulator 103, upon receiving the time delay information, executes for an appropriate amount of hardware simulation time. Once hardware simulator 103 processes the event information and produces an event result, such as a signal being asserted, or simply the time delay being consumed, it typically sends the event result to processor simulator 107. The resume mechanism 149 resumes operation of processor simulator 107 upon the processor simulator receiving the event result.

Note that if no time delay needs to be executed by the hardware simulator, such as when the processor simulator is already in time synchronization with the hardware simulator and does not have any internal events that need to be processed in that simulation time, the processor simulator need not suspend operation. As another example, the user program may encounter a program that asks only for the current hardware simulation time. Or the user program may encounter an input/output command before the processor simulator has accumulated any delay since the last access to the hardware simulator. There would not be any need to suspend operation under such circumstances.

With the suspend/resume mechanisms of the preferred embodiment, when the processor simulator's execution is suspended, the delay time passed to the hardware simulator is used to schedule the resumption of the suspended task, by placing a delay event on the hardware simulator queue to have the interface mechanism to resume executing the suspended user program task running on the processor simulator.

One event result may be an interrupt that occurs in the digital circuitry during the execution of the time delay. The interrupt is communicated to the processor simulator 107, and upon receipt of this event result, on resumption of the processor simulator, processes the interrupt by calling an interrupt handler.

The design system 100 also includes a processor shell 153 in hardware simulator 103 that simulates activity of at least some of the external hardware entities of the target processor, in particular, those signals that are connected to the digital circuitry of the target electronic system which affect a user program. Included are those hardware variables and other hardware entities the user program may access or that may generate asynchronous events such as interrupts. As an example, the hardware shell provides access to the reset line or the pause line of a processor. The processor shell normally would provide an interface to the hardware simulator in the hardware description language(e.g., Verilog). Note that by "signal" we mean a signal or a hardware variable or an event or any other general entity defined within the hardware simulator.

The design system 100 also includes a mapper 147 that translates information from the second format understandable in hardware simulator domain, such as a signal assertion to indicate some asynchronous event, or register contents, or simulation time, to the first data format understandable in the processor simulator domain, for example, to one or more software variables accessible to the user program. Note that mapper 147 is not to be confused with memory mapper 125.

Since simulation speed is extremely important, and since a single host processor can only process a single task at a time, the invention also provides for carrying out the simulation in a multiprocessor computer that includes several host processors. In such a system, the processor simulator operates on one or more of the host processors, while the hardware simulator operates on one or more other host processors. The interface mechanism is programmed to handle the communication between the processor simulator host processor, and the other host processors executing the processor simulator. How to implement such an arrangement would be clear to those in the art.

The invention also provides for carrying out the simulation in a host computer system that includes several host processors interconnected using a network connection. In such a system, the processor simulator operates on one or more of the host processors, while the hardware simulator operates on one or more other host processors. The mapper and the translator also may operate on a separate host processor of the network. That is, the processor simulator is coupled to the mapper and the translator by a first computer network connection, with the interface mechanism controlling communication between the processor simulator and the mapper and translator over the first network connection. Also the hardware simulator is coupled to the mapper and to the translator by a second network connection, with the interface mechanism controlling communication between the mapper and the translator, and the hardware simulator over the second network connection.

Note that the tasks of an individual processor simulator can be split across several host processors of the host computer system. Similarly, the tasks of the hardware simulator can be split across more than one host processors of the host computer system. Other networked or standalone multiprocessor combinations and permutations of operating the elements of the design system will be clear to those in the art.

Cache Modeling and Memory System Simulation

The preferred embodiment includes as part of the analyzer shown in FIG. 1 as 112 that analyzes the user program 109 to generate analyzed program 111, a dynamic analyzer that performs data access analysis, including inserting hooks to invoke a cache simulator 121 during execution of analyzed program 111. The cache simulator 121 simulates the target processor's cache behavior during execution of the analyzed user program 111 on the host computer system. The cache simulator 121 preferably also stores trace data to provide for reporting the run-time statistics, such as the number of cache references and misses, the hit ratio, and the types of cache misses. In the preferred embodiment, this can not only show global statistics about the performance of a program, but also show statistics at individual basic linear blocks of the user program, and thus is capable of identifying the location of any bottle-necks (i.e., high miss-ratio regions) of the user program 109. The trace data in the preferred embodiment is a set of counters updated for each cache miss. The cache simulator 121 is useful for tuning the user program 109 and for evaluating processor architectures, including providing dynamic instruction level timing information.

Figure 17:
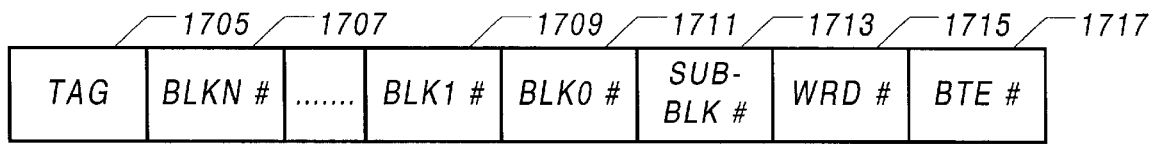
FIG. 17 shows how a cache is addressed.

The cache simulator 121 can simulate several types of well known cache structures using a generic cache model that uses a list of parameters to describe both the structure of a particular cache and the policies governing its operations. A cache configuration file (a text file in our implementation) is used to specify the values of these parameters for a particular processor cache model. Thus, the cache structure is defined by a list of physical structure parameters specified in the cache configuration description file having a syntax described herein below. The parameters include the number of blocks (or cache lines), the number of sub-blocks within a block, the number of words in each sub-block, and the number of bytes in a word. The cache model can simulate a tree-structured cache, that is, a cache wherein a block at a higher level represents a sub-cache at a lower level. The cache of the ARM 940 processor (ARM Ltd., Cambridge, United Kingdom), for example, has a two-level tree structure. FIG. 17 shows how the components that are used for addressing a cache for an hierarchical set associative cache. If the cache is hierarchically structured, a series of block numbers is used to identify the desired cache block (sub-cache) at each hierarchical level. The address of a datum is used to identify the desired cache block in a (sub-)cache. An address is built from a Tag (1705), Block Numbers (1707–1711), Sub-Block Number (1713), Word Number (1715) and Byte Number (1717).

A replacement policy specifies a way of choosing a victim cache block in a set to be swapped out when a new entry is mapped onto this set and all of the cache blocks are filled. Two well-known replacement policies are least recently used (LRU) and random. A LRU strategy replaces the cache block that was least recently accessed, and a random strategy simply chooses a cache block randomly from the set. Normally, a pseudo-random method is applied, which chooses one after the others in order of their block numbers in a set.

A write policy specifies whether or not an update to the external main memory should be carried out when writing to an entry in a cache block. Two well-known write policies are write through and write back. A write-through policy updates both the cache and the main memory on encountering a write, while a write-back policy only writes to the cache. The modified cache block is then written to main memory only when it is replaced. A status bit is also used to indicate whether the block has been modified (such a modified cache block is called "dirty"), and write-back to main memory occurs only when the cache block is dirty. If there is a write miss in the cache, which means the requested entry is not found in the cache block, the entire cache block may need to be read in first to the cache before updating a single entry. Strategies to deal with this write-miss include 1) a write-miss not resulting in writes to cache, so that the datum is simply written directly to main memory; and the whole block being read in first, followed by a normal write-hit action as mentioned in the write policy above. This second strategy is called write-allocate.

The refilling policy specifies how many cache blocks are to be 'refilled' or brought in to the cache when there is a read miss or a write miss with write-allocate. The cache blocks are refilled only with entries having adjacent addresses.

The cache configuration description file used by the invention to describe each cache to be simulated is a text file that includes a list of cache definitions, each having two components, a header and a body. The header specifies the type of cache: an instruction cache (I-cache), data cache (D-cache) or unified cache (e.g., combined cache). The cache definition body also has two components: an optional field specifying the number of hierarchical levels, and a list of parameter definitions, each specifying the values of the parameters at a level. If the optional field is not specified, a hierarchical level of one is assumed, that is, a normal flat structured cache. Additional fields can be added to the cache definition file to represent any new cache technologies, and the cache simulator extended to simulate such technologies. In our implementation, the following eleven parameters are defined at the lowest level:

1. the number of sets (i.e., the set associativity);
2. the number of blocks in a set;
3. the number of sub-blocks in a block, with each sub-block having its own valid and dirty bits;
4. the number of words in a sub-block;
5. the number of bytes in a word;
6. the write policy (write-back or write-through);
7. the replacement policy (LRU or random)
8. whether write allocate (Yes or No);
9. the number of block refills;
10. the memory read cycle time; and
11. the memory write cycle time.

These parameters are further described below.

The last two parameters are for simple simulations wherein the cache simulator 121 returns the time penalty for the cache miss. The invention provides for modeling the time penalty incurred by a cache miss at any user-set level of detail. For example, referring again to FIG. 1, the description of the target digital circuitry may include a hardware bus model 124. The target digital circuitry description may include hardware memory model 122. The invention provides for simulating in hardware the execution of the required number of bus cycles and memory accesses using the hardware bus model 124 whenever the cache simulator determines there a cache miss. Thus, fully dynamic simulations also are provided for wherein a cache miss results in the cache simulator 121 of the processor simulator 107 using the communications mechanism 141 to send event information to the hardware simulator 103, the event being to execute the required number of bus cycles on the bus model part 124 of the target digital circuitry description. This causes the suspend mechanism 149 (FIG. 1) to suspend operation of the processor simulator 107. The hardware simulator 103 now processes the associated event information by executing a number of bus cycles on bus model 124 (and optionally the required number of memory cycles on memory model 122) and returns to the processor simulator 107 when it has completed the operation. The resume mechanism 151 (FIG. 1) now resumes operation of the processor simulator 107.

If the number of sets is one, i.e., the cache is direct-mapped cache, the replacement policy is ignored. At other intermediate levels, only three parameters are defined:

1. number of sets;
2. the number of blocks (sub-caches) in a set; and
3. the replacement policy (optional).

The syntax of the cache configuration file is illustrated below:

```
icache | dcache | cache
{
    NumOfLevel : int (optional)
    StructureLevel 1
    {
        NumberOfSet : int
        NumberOfBlock : int
        NumberOfSubBlock : int
        NumberOfWord : int
        NumberOfByte : int
        WritePolicy : (WriteBack | WriteThrough)
        ReplacePolicy : (LRU | random)
        WriteAllocate : (Yes | No)
        Memory Read Cycle : int
        Memory Write Cycle : int
        NumberOfBlockRefills : int
    }
    ...
```

```
    ...
    StructureLevel n (where n is an integer greater than 1)
    {
        NumberOfSet : int
        NumberOfBlock : int
        ReplacePolicy : (LRU | random)
    }
}
```

Figure 18:
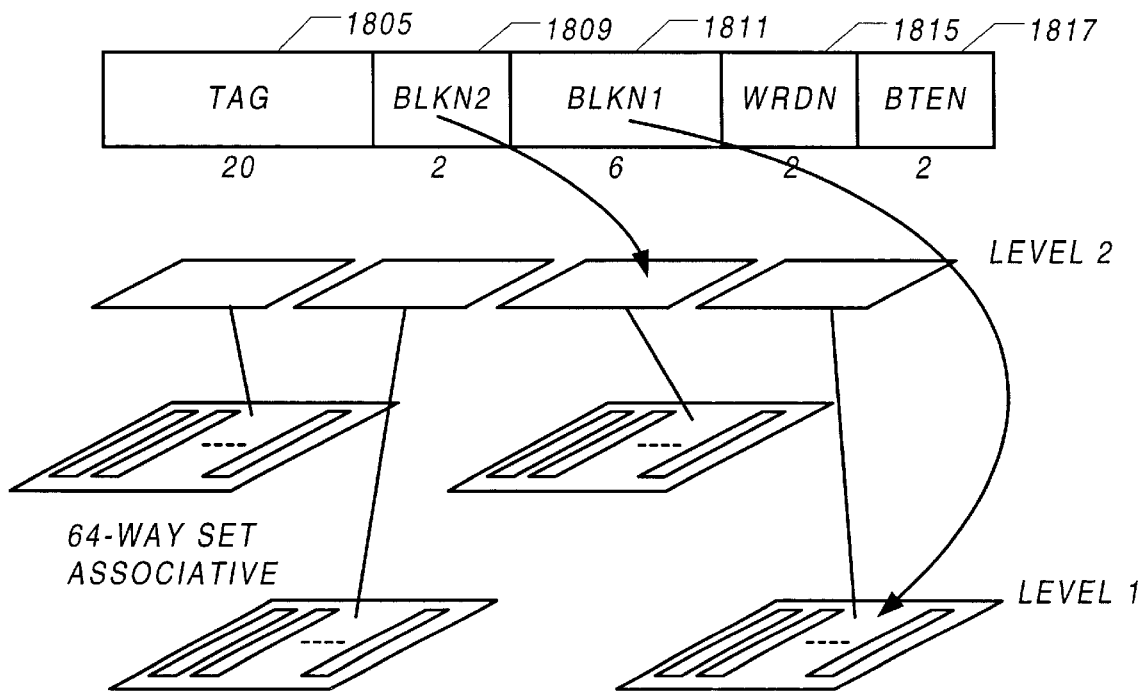
FIG. 18 shows a set associative cache.
Figure 19:
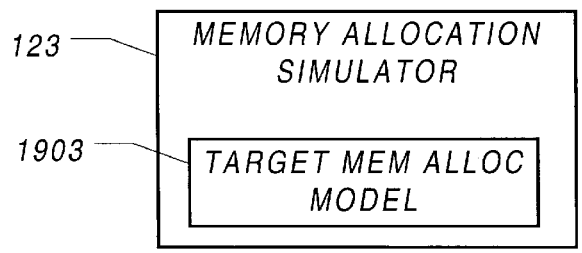
FIG. 19 shows a memory allocation simulator in accordance to an embodiment of the present invention.

As an example, consider the ARM940 I-cache shown in FIG. 18. This cache has a two-level structure. At the top level, it is direct-mapped, and at the bottom level, it is 64-way set-associative. The description file for this ARM940 instruction cache is as follows.

```
    icache
    {
            NumOfLevel : 2
            StructureLevel 1
            {
                    NumberOfSet : 64
                    NumberOfBlock : 1
                    NumberOfSubBlock : 1
                    NumberOfWord : 4
                    NumberOfByte : 4
                    WritePolicy : WriteBack
                    ReplacePolicy : random
                    WriteAllocate : Yes
                    MemoryReadCycle : 2
                    MemoryWriteCycle : 3
                    NumberOfBlockRefills : 1
            }
            StructureLevel 2
            {
                    NumberOfSet : 1
                    NumberOfBlock : 4
            }
    }
```

A Design Example

A typical electronic system that can be simulated using the preferred embodiment co-simulation design system can include many components that are either in the form of digital circuitry or as software comprising one or more user programs to run one or more target processors. The digital circuitry is implemented using an HDL. Software components include the user programs, and may include behavioral modeling of some hardware components.

Figure 8:
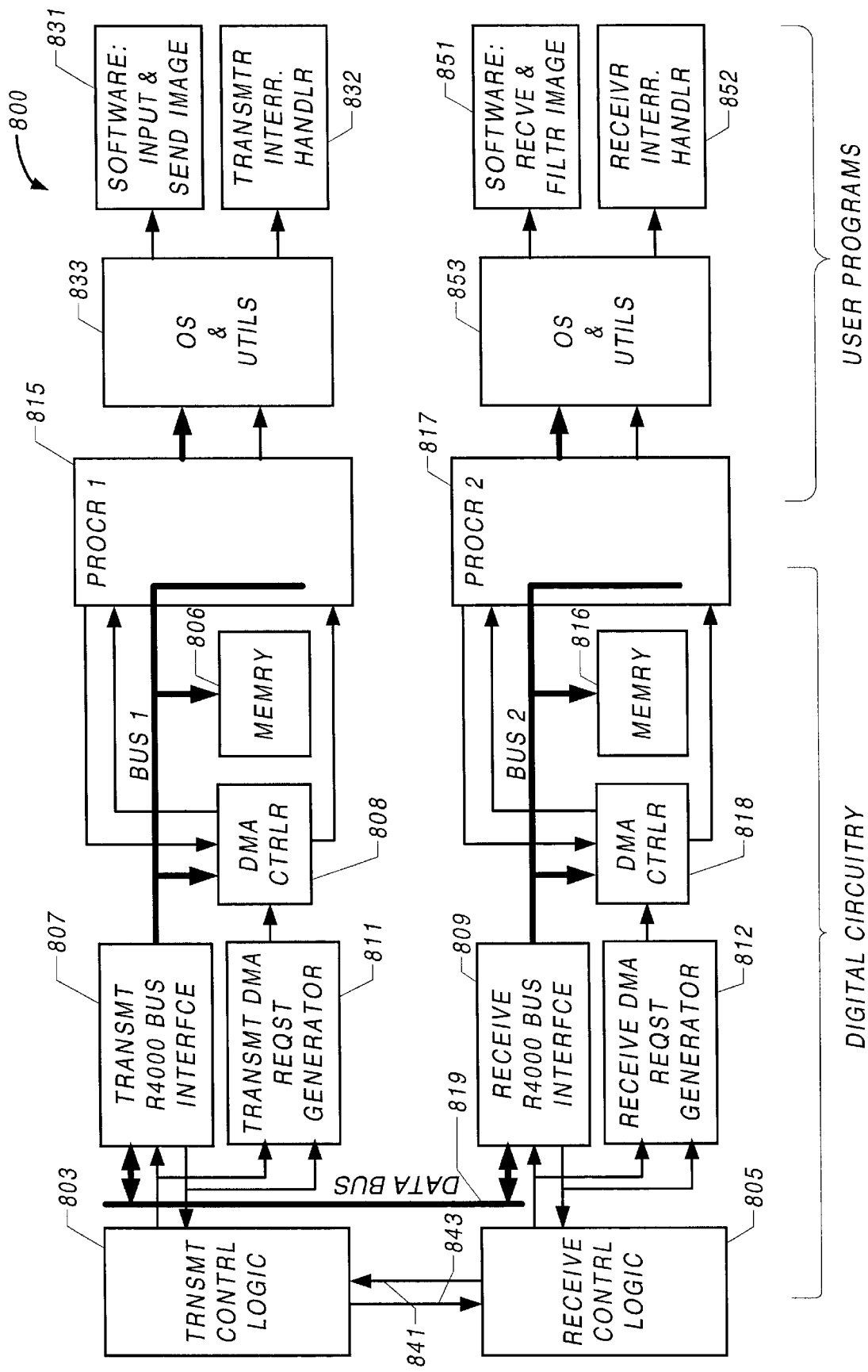
FIG. 8 shows an example dual processor electronic system that may be designed using a co-simulation design system according to the invention.

Various aspects of the invention will be explained with reference to an example electronic system using those aspects to design the example system. The example electronic system, which in itself is prior art, but when simulated using the invention is not prior art, is illustrated in FIG. 8.

The particular electronic system 800 of the example includes two target processors named processor 1 and processor 2, each a MIPS R4000 processor (MIPS Technologies, Inc., Mountain View, Calif.). The two target processors communicate through a simple protocol implemented in a transmitter control logic module 803 and a receiver control logic module 805. The transmitter control module 803 and receiver control logic module 805 are interfaced to the busses BUS 1 and BUS 2 of target processors 1 and 2, respectively, via a transmitter R4000 bus interface module 807 and a receiver R4000 bus interface module 809, respectively. Both processor systems include memory. In simulation, each memory responds to processor cache miss cycles which appear on either processor bus, and respond to DMA cycles to transfer data to/from the memory.

In this example, processor system 1 loads an image then programs its DMA controller to transmit it. It does so, a byte at a time, through the transmitter, to the receiver module in processor system 2. The receiver system performs two DMA transfers, the first, to receive the image header information, and the second, to receive the image into memory. Each DMA transfer signals completion through the assertion of a 'DMA complete' interrupt. When the full image has been received, processor system 2 then performs various filtering operations on the image and displays all images.

The electronic system includes four major software components, a software module 831 written in 'C' to run on target processor 1 (the processor shown as 815) under control of an operating system 833. When started, software 831 reads in an image file then transfers the image, pixel by pixel, to the second processor. Interrupt handler software module 832 is invoked on completion of a DMA transfer.

On the receiver side, a software module 851 contains code which receives the image to be processed then filters the image. Software 851 runs on processor 2 (shown as 817) under control of operating system 853. An interrupt handler 852 is invoked on completion of each DMA transfer.

On the hardware side, each of BUS1 of processor 1 and BUS2 of processor 2 is respectively coupled to DMA controller 808 and DMA controller 818, respectively, memory 806 and memory 816, respectively, and bus interface 807 and bus interface 809, respectively. These modules are all modeled in Verilog. The transmitter and receiver control modules 803 and 805 are hardware modules, and in one version make use of the two signals 841 and 843 in a two-signal asynchronous protocol to transfer data from processor 1 to processor 2 to enable processing by software module 851 of data transmitted by software module 831. The data bus 819 also is modeled in Verilog.

Note that the Verilog memory model 122 preferably uses the host memory system for storage of data as described herein below.

A DMA version uses the DMA request generators 811 and 812 for the transmit and receive DMAs, respectively.

Operation of a multiprocessor system such as the example system of FIG. 8 may be simulated by a design system 200 shown in FIG. 2. Design System 200 has two processor simulators 207 and 208 simulating the operation of both software program 831 and interrupt handler 832 on processor 815 and software program 851 and interrupt handler 852 on processor 817. The hardware simulator 203 simulates digital circuitry using the description of the target circuitry 205 which includes: 1) the model of data bus 819; 2) the models of transmitter control 803, transmitter bus interfaces 807, the DMA request generator 811, the DMA controller 808, and memory 806 as image transmitter circuitry 225; and 3) the models of receiver control logic 805 receiver bus interface 809, the DMA request generator 812, the DMA controller 818, and memory 816 as image filter circuitry 227.

There also are processor models for both processors that provide a software interface in the respective processor simulator for the required control signals to and from the transmitter and the receiver bus interfaces. The processor model for each of the processors in shown in FIG. 16. Note that the processor models for each of processor 1 and processor 2 include components modeled in hardware and components modeled in software.

Note that co-simulation design system 200 is basically co-simulation system 100, with an additional processor simulator. The operation thus follows that described above for design simulator 100.

An interface mechanism 219 comprising a message passing kernel is included coupled to the two processor simulators and to the hardware simulator. The interface mechanism in this embodiment includes the mapper and translator. The interface mechanism also includes a single suspend mechanism 249 and a single resume mechanism 251 to provide for suspending and resuming the operation of each of the processor simulator tasks.

The host computer system may include a computer network, the processor 1 simulator 208 and processor 2 simulator 207 may each run on different host processors of the network, so that the processor simulators are coupled to the hardware simulator by network connections. In such a case, the interface mechanism would control communications over the network connections.

Note that while two processors are shown here, it will be clear to those in the art from this two-processor example how to extend the system to simulating the operation of any number of processors.

Operating System and Assembly Language Support

User software usually operates in a target processor under the control of an operating system. The invention supports operating system (OS) modeling, and such OS included by several methods and means.

The preferred embodiment supports three ways. The first is to emulate the function and timing of the target operating system using a message passing operating system called EMERE herein. This is a very effective mechanism, especially when the user application code for operation on the target processor uses POSIX style system calls, for example, open, create, read, write, seek, and close.

A second way of including OS modeling is to use a target OS simulator. Several such operating system simulators are available. For example, VxSim™ simulates the VxWorks™ operating system (VxSim and VxWorks from Wind River Systems, Inc, Alameda, Calif.). This strategy delivers function and average timing, but not timing for the actual run.

A third approach is to include the target operating system as part of the user program in the simulation environment. Since the invention provides for rapid processor simulation speeds that simulate execution at speeds at or close to the same order of magnitude as the actual execution speed of the user program on the host computer system, the simulation environment of the present invention has the speed to boot a complete OS and application software. One way of doing this is to include the source code of the OS. This clearly requires having access to the OS source code, and also knowledge of the operating system. As an alternative, one can disassemble the object code of the target OS into assembly code, which can then be included in the user program as described in the next paragraph. This third approach provides complete function and timing.

The invention also provides for several mechanisms for manually including assembly code in a user program. One mechanism for incorporating the assembly code into 'C' code is to use a construct such as the 'asm' construct of 'C' for the Gnu GCC compiler (Free Software Foundation, Boston, Mass.). This identifies a block of target assembly code embedded within the 'C' code. The analyzer process regards this as a single block of code and produces appropriate model timing and functionality accordingly. If there is a lot of assembly code, then yet another technique for adding assembly code is to break the code up into basic linear blocks and separately embed each basic block into the 'C' code, for example using an 'asm' construct. This helps the analyzer to correctly model pipeline interactions. Yet another way to include assembly code is to convert it to equivalent 'C'. Object code also may be added to a user program. Doing so is a variation of adding assembly code. The user first disassembles the target object code using a disassembler. The resulting assembly code can then be added.

Operation of the Invention

Operating the invention will now be described. The preferred embodiment provides a view of the simulation environment using a debugger, and other embodiments do not necessarily use a debugger. A waveform viewer also is provided for viewing any of a set of desired hardware variables. In particular, the Gnu GDB debugger is used (Free Software Foundation, Boston, Mass.), and other debuggers may be used instead. While the invention does not require use of an HDL for the hardware simulator, the description will be provided using Verilog, and using the Super FinSiM™ Verilog simulator from Fintronic USA (Menlo Park, Calif.).

Thus, in the preferred embodiment, the debugger starts the simulation, and in the preferred embodiment first starts the kernel in the interface mechanism. The kernel thus starts the hardware simulation as a task. As the hardware simulation progresses, it invokes one or more processor simulators by passing a message to the interface mechanism which then starts the processor simulators as tasks under the message passing kernel.

A tool is provided for setting up all the files required. The user programs may need to be modified for operation in the co-simulation design system by replacing some of the input/output commands that interact with hardware with the equivalent calls that are available in the system (See under "Interface Functions" herein below). In addition, some of the operating system calls may have to be changed to those of the particular operating system used in the simulation when the simulation environment and the final target system are to be run under different operating systems. These changes are to account for differences between the simulation included operating system and the final target operating system.

Sample modules that might be set up to simulate the example of FIG. 8 are shown in module arrangement 1000 in FIG. 10.

Electronic System 1003 is the top level Verilog module that instantiates two Verilog modules, Image TX 1005 and Image Filter 1007. Image TX module 1005 is a Verilog module which instantiates the Transmitter Verilog module that includes the transmitter part of the digital circuitry (Image TX Circuit 225), and the Processor 1 Verilog 1009. The Processor 1 Verilog 1009 in turn is used to instantiate processor 1 simulator 208. Image Filter module 1007 is a Verilog module which instantiates the Receiver Verilog module that includes the receiver part of the digital circuitry (Image Filter Circuit 227), and the Processor 2 Verilog 1011. The Processor 2 Verilog in turn is used to instantiate processor 2 simulator 207 (FIG. 2).

In instantiating processor 1 simulator 208, the processor 1 HDL instantiates a copy of the EMERE operating system, EMERE1 222. EMERE 1 starts up the Image TX program, the C program to carry out the file retrieval and image transmitting. This in turn has a pointer to the image pixel file IMAGE.PXL that contains the image data.

In instantiating processor 2 simulator 207, the processor 2 HDL instantiates another copy of the EMERE operating system, EMERE 2 shown as 221. EMERE 2 starts up the Image Filter program, the C program to carry out the image filtering function.

Thus, the debugger starts the simulation, and typically first starts the kernel in the interface mechanism that in turn starts the hardware simulation. The first task is a hardware task, and some processor shell signal being asserted in the hardware starts the C language modules (the two operating system modules).

The Verilog implementation takes advantage of the availability in Verilog of the ability to include code in another language, in particular, the programming language interface (PLI) mechanism of Verilog, to invoke a user task/function (a processor simulator) from a hardware description. In the preferred embodiment, this mechanism is used to invoke the processor simulator from the hardware simulator via the interface mechanism. When a PLI gets started, the interface mechanism has control and is then able to start the processor simulator. In particular, the processor simulator, and in particular the operating system, is spawned from the Verilog wrapper every time the system receives a positive transition on a start signal called start.

VHDL also includes a mechanism called foreign attribute/entity for including a module not in VHDL in a VHDL simulation, and the VHDL implementation of the invention uses the foreign attribute mechanism to start the processor simulator from the hardware simulator with some signal that is part of the processor shell. During operation, this causes the interface mechanism to start the processor 1 simulator.

Thus in the preferred embodiment described herein, the hardware simulator is first invoked by the kernel and any processor simulators are then started later by the hardware simulator (via the interface mechanism). In an alternate embodiment, the interface mechanism could include all control, so that the software tasks such as the processor simulators are not started by a mechanism such as a PLI in the hardware simulator, which then leads the interface mechanism to start the processor simulator, but rather the interface mechanism would control the processor simulator and the hardware simulator using one or more event queues in the interface mechanism. In yet another alternate embodiment, the processor simulator can initiate the hardware simulator.

Prior to execution, the user may insert debugger breakpoints in the user programs for each processor simulator. Prior to execution the user can enable or disable the breakpoints. As the simulation is run under debugger control, whenever a breakpoint is encountered, the debugger stops execution. At this point, any software variable in any of the processor simulators and any hardware variable in the hardware simulator may be examined. The particular implementation of the invention provides a window on the viewer screen for each of the processor simulators and for the hardware simulator. When the systems stops at a breakpoint, the current instruction is highlighted. In addition, the implementation provides a "voltmeter"-like "value watch" window, at user option, to examine any hardware entities as the simulation proceeds. The environment also provides for single stepping both the processor simulators one instruction at a time, and the hardware simulator any number of time units at a time.

The preferred embodiment environments provides, at user option, both a command line operating mode, and an interactive mode under a graphical user interface.

The Interface Functions

In the preferred embodiment, a library of functions is provided that span the hardware/software interface and that can be inserted into the user program to facilitate communication between the processor simulator and hardware simulator, and to affect synchronizations. These calls allow for information to be passed between the processor simulator and the hardware simulator, and include the translator when the information is passing to the hardware simulator, and the mapper when the information is passing from the hardware simulator to the processor simulator. That is, these functions are provided for inclusion in the user program, and some functions translate event information from the first data format of the processor simulator to the second data format of the hardware simulator, while some of the other functions, such as those dealing with asynchronous events, deal at least in part with translating a hardware variable in the second data format to the first data format of the processor simulator.

Thus, in general, the interface functions use the general callback mechanisms in the hardware simulator to implement a bidirectional flow of information and control between the hardware simulator and processor simulator. Some processor model shell functionality, for example, is carried out in Verilog using the programming language Interface (PLI) mechanism, and in VHDL using the foreign attribute mechanism, which works differently from the Verilog PLI. This translates a hardware signal variable in the HDL environment to a software variable in the user program.

Thus, interface functions form a software shell to provide the user program access to the processor signals coupled to the digital circuitry in the electronic system. Those interface functions are implemented in the Verilog version using the low level IEEE standard Verilog PLI 1.0 and PLI 2.0 functions such as Verilog's 'tf' and 'acc' functions. These are difficult-to-use low level functions that allow for scheduling of events, etc., in Verilog. The preferred Verilog implementation of the invention is implemented using these functions to build software shell interface functions that are much easier to use in a higher-level language user program to provide access to the hardware simulation from the user program running on the processor simulator. For example, the Verilog environment has a general registration mechanism that allows a user to register a callback function (e.g., a 'C' function) that is associated with a hardware variable, that causes the function to be invoked whenever that variable changes state. The preferred embodiment implementation of the interface mechanism uses this general call back mechanism. For example, those interface functions that wait for hardware variable changes use these functions.

Note that while the interface functions are used in the invention for interactions between the hardware simulator and the processor simulator, a user can take advantage of the availability of these functions and use them in a hardware simulation to behaviorally simulate part of the digital circuitry.

When a user prepares a user program for simulation, the user may insert interface functions, for example, to get or update the state of input or output ports. Whenever the analyzer encounters a call to an interface function in the user program, it inserts a block boundary at that point, so that accurate timing up to the call is provided for the processor simulator.

A sampling of interface functions is described in abovementioned incorporated by reference U.S. patent application Ser. No. 09/430,855. Clearly different functions may be provided in different implementations, and certainly the form of any of these functions is not meant to be limiting. Other forms may be used.

The following are some of the provided functions:

The PutPort (vast_putport(int *)) and GetPort(vast_getport(int *)) interface functions cause the states of all other tasks including the hardware simulator to be brought up-to-date.

The WaitEvent function (vast_waitevent(unsigned int *, unsigned int *)) waits for the occurrence of any event or time out on the given delay.

The WaitPort function (vast_waitport(int *)) waits for the occurrence of a value change at the given port before continuing to execute the calling task.

The GetTime function(vast_gettime( )) returns the current hardware simulator time, i.e., the system simulation time.

There also is a CreateRef function for creating a reference (void *vast_createref(char *name)) to an HDL variable, such as a Verilog net, register, integer or real variable in the case of Verilog HDL. This is analogous to defining in the user program a memory location for some hardware register so that the GetVar and Putvar functions can be used like mapped memory input/output.

Once a reference is created, the WaitVar function (int vast_waitvar(void *varaddr)) is available that waits for a specified hardware variable to change its value. Similarly, functions for respectively retrieving (void vast_getvar(void *varaddr)) and writing to (void vast_Putvar (void *varaddr)) a hardware processor variable are also provided.

The preferred embodiment also allows for automatically reading or writing to memory mapped devices, that is, devices that have target addresses. Such devices and their target addresses are defined, for example, in an information file (called vpm.info file—see herein below). Code is inserted during the analysis process that defines variables that enable host access to the devices, using, for example, host variables for the devices' addresses. During run time, prior to any data accesses (read or write), a determination is made as to whether an address is the address of a device or memory. If a device, then the read or write to the device is executed using the interface functions. For example, a write is executed by implementing the necessary interface functions to cause the data written out to the device, including executing the required number of bus cycles on a hardware model 124 of the bus when included in the description 105 of the digital circuitry. See below for more details on how the memory mapping is made.

The preferred embodiment also allows for inclusion of code such as debugging code that is interpreted by the analyzer as executing in zero time on the target processor.

Functions are also available for the handling of asynchronous events such as interrupts. One set function (vast_enableasynevent) enables asynchronous events, while another (vast_disableasynevent) disables all asynchronous events. A function is also provided for registering the handler program provided as an asynchronous event handler function. The asynchronous event handler function is called when an asynchronous event occurs. The registration function (vast_regasyneventhandler(void (*f)( )) accepts a function pointer pointing to the asynchronous event handler function.

Asynchronous events are described in more detail in above-mentioned incorporated by reference U.S. patent application Ser. No. 09/430,855. Briefly, the preferred embodiment uses a special hardware variable asynevent. When set to 1, on resumption of the processor simulator, the asynchronous event handler function pointed to by the vast_regasyneventhandler( ) will be called if the asynchronous event is enabled.

Timing

Figure 9:
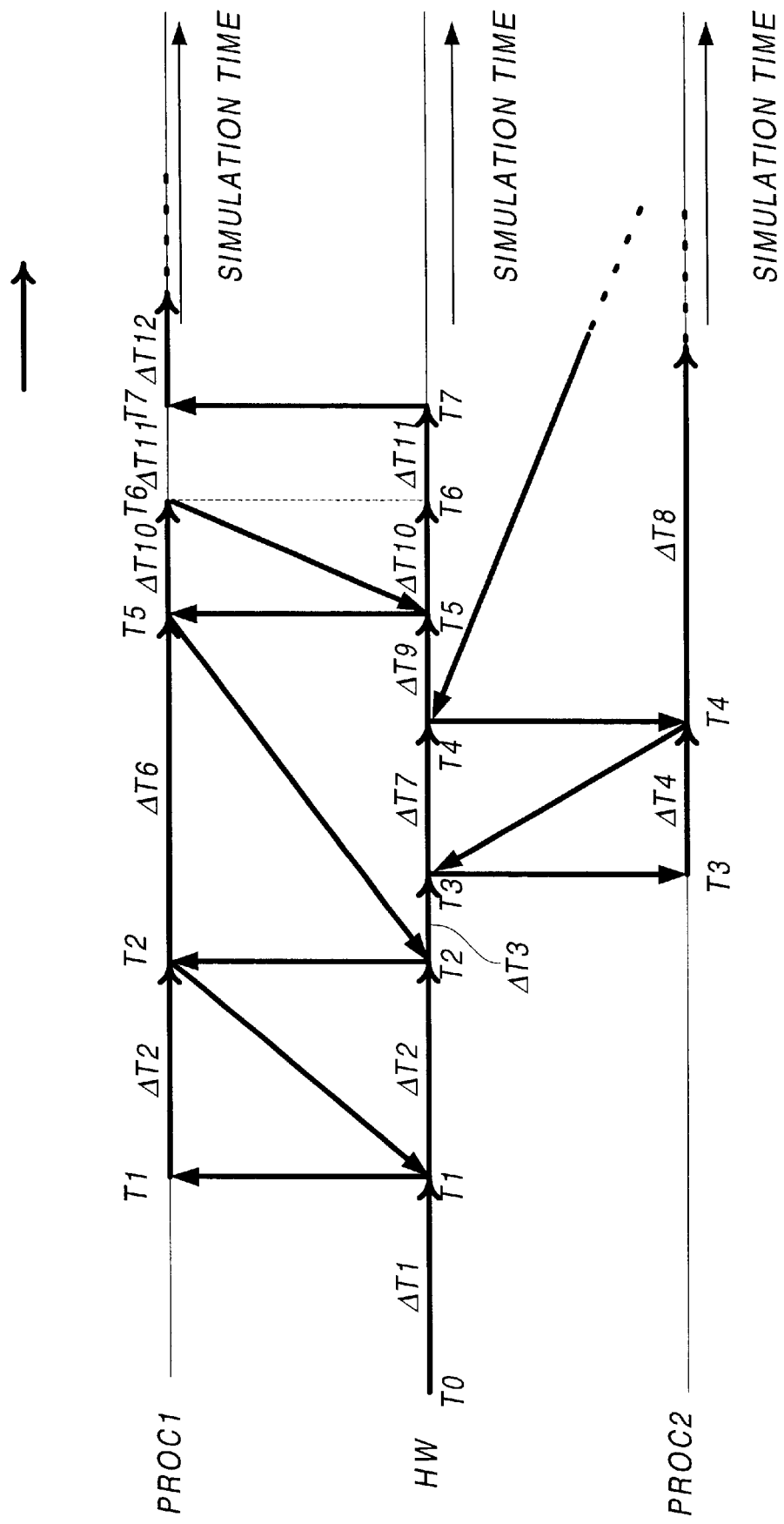
FIG. 9 shows a timing diagram of an example two-processor simulation according to an embodiment of the invention.

Typical operation will now be explained with the aid of FIG. 9 which shows an example of the timing of execution of a design system such as that of FIG. 2 including two processor simulators and the hardware simulator.

The hardware simulator provides the simulation time frame. Any units of time may be used, and clock cycles will be assumed to be the unit of time. Each of processor 1 and processor 2 may have different speeds and thus its own simulation time. Assume that the first task is some execution for a time $\Delta T1$ until time T1. At this time, a start signal in the digital circuitry starts the processor simulator for processor 1. Processor 1 executes for a time $\Delta T2$ until time T2 (measured in processor simulator 1's simulation time). Suppose at this point, processor simulator 1 encounters a memory reference that causes the cache simulator to perform a cache lookup, and the cache lookup determines that there has been a cache miss. This cache miss event causes processor simulator 1 to use its communication mechanism to send the event information to the hardware simulator. This in turn causes the suspend mechanism 249 to suspend operation of processor simulator 207.

Note that while processor simulator 207 has consumed $\Delta T2$ of simulation time, the hardware simulator 203 has not moved because the processor simulator executes so much faster than the hardware simulator on the host computer system. Thus when the information is communicated to the hardware simulator, it is still at time T1.

The hardware simulator 203 now processes the associated event information, which in this example is to execute a required number of bus cycles on the target bus model included in the processor 1 HDL. Hardware simulator returns to processor1 simulator 207 when it has executed the required number of bus cycles, say time delay $\Delta T2$ at time T2.

Starting from T2, processor 1 executes for a time $\Delta T6$ until time T5 (measured in processor simulator 1's simulation time). Suppose at this point, processor simulator 1 encounters an interface function, such as a putvar function to send a signal to the digital circuitry. It now uses its communication mechanism to send the event information to the hardware simulator. This in turn causes the suspend mechanism 249 to suspend operation of processor simulator 207. While processor simulator 207 has consumed $\Delta T6$ of simulation time, the hardware simulator 203 has hardly moved, so is still at time T2. The hardware simulator 203 now processes the associated event information, which may be to determine a variable and return its value to processor1 simulator 207 when it has executed the time delay $\Delta T6$ at time T5. However, before reaching T5, after only $\Delta T3$ of simulation time has been consumed, at T3 (<T5), a signal in the digital circuitry causes the second processor simulator (processor 2 simulator 208) to start executing. It processes for $\Delta T4$ and encounters an interface function at time T4, at which time it send the information associated with the interface function encountering event (e.g., an input/output instruction) to the hardware simulator 203, which has not progressed beyond T3.

The hardware simulator 203 now continues to execute, including processing the new event information, until it reaches time T4, at which time the processor simulator 207 task in the event queue of the interface mechanism causes the resume mechanism 251 to re-start the suspended process. Processor 2 simulator 208 now processes for time $\Delta T8$ at which time another significant event occurs. This causes the hardware simulator to process until the next time in its queue. This occurs after $\Delta T8$ at time T5 when the processor 1 simulator 207 recommences operation. The processor 1 continues operation until the next significant event, which occurs at time T6. The significant event is to wait $\Delta T11$ units of simulation time. Note that one aspect of the invention is the capability of modeling processing to a selected level of accuracy, and in this instant, the user has selected to "behaviorally" model rather than accurately model hardware known to require ΔT11 units of simulation time to operate as a means of saving host computer simulation time. So the software task is now suspended and the interface mechanism returns to the hardware simulator not long after T5 in the hardware simulator's time frame.

Starting from T5, the hardware simulator executes for ΔT10 until T6. The hardware simulator now reaches the time when the first processor simulator's operation was suspended (in hardware simulation time). Note that the hardware simulator does not pass control to the software task, but rather continues to process for the ΔT11 delay requested. That is, the event queue information on the processor 1 simulator is to restart at time T7. When hardware simulator 203 reaches T7, the processor 1 simulator 207 indeed resumes operation for ΔT12, and so forth.

Analysis of the User Program

Detailed operation of the analysis process (performed in our implementation by a program called VPMA) is now described. The analysis of a user 'C' program is carried out with reference to the particular virtual processor model. The virtual processor model includes a file of parameters for the particular target processor, and contains, for example, how memory is partitioned, whether the processor includes a pipeline, and if yes, the number of stages in the instruction pipeline of the target processor, data on the cache, data on instruction timing, information on how to parse instructions on the assembly language of the processor, and other components used by the analysis process. The part of the virtual processor model used by the analyzer is called target processor specific information herein.

The user 'C' program to be analyzed is preferably available in the form of a file that includes a set of 'C' functions. The result of the analysis is an analyzed 'C' program that when run on the host processor provides timing information that considers pipeline effects such as pipeline hazards (if a pipeline is included), and that invokes the cache simulator when there are memory references.

By static analysis we mean analysis that determines timing information and does not require execution of the program. Such static analysis provides timing information about instruction timing, and considers pipeline effects such as pipeline hazards if the processor included a pipeline. Above mentioned incorporated by reference U.S. patent application Ser. No. 09/430,855 described static analysis in detail, and the static analysis part of the operation of analyzer 113 will only be summarized herein. By dynamic analysis, we mean analysis of the user program to generate an analyzed program. Dynamic analysis provides for certain timing information to be generated during execution of the analyzed user program.

Figure 3A:
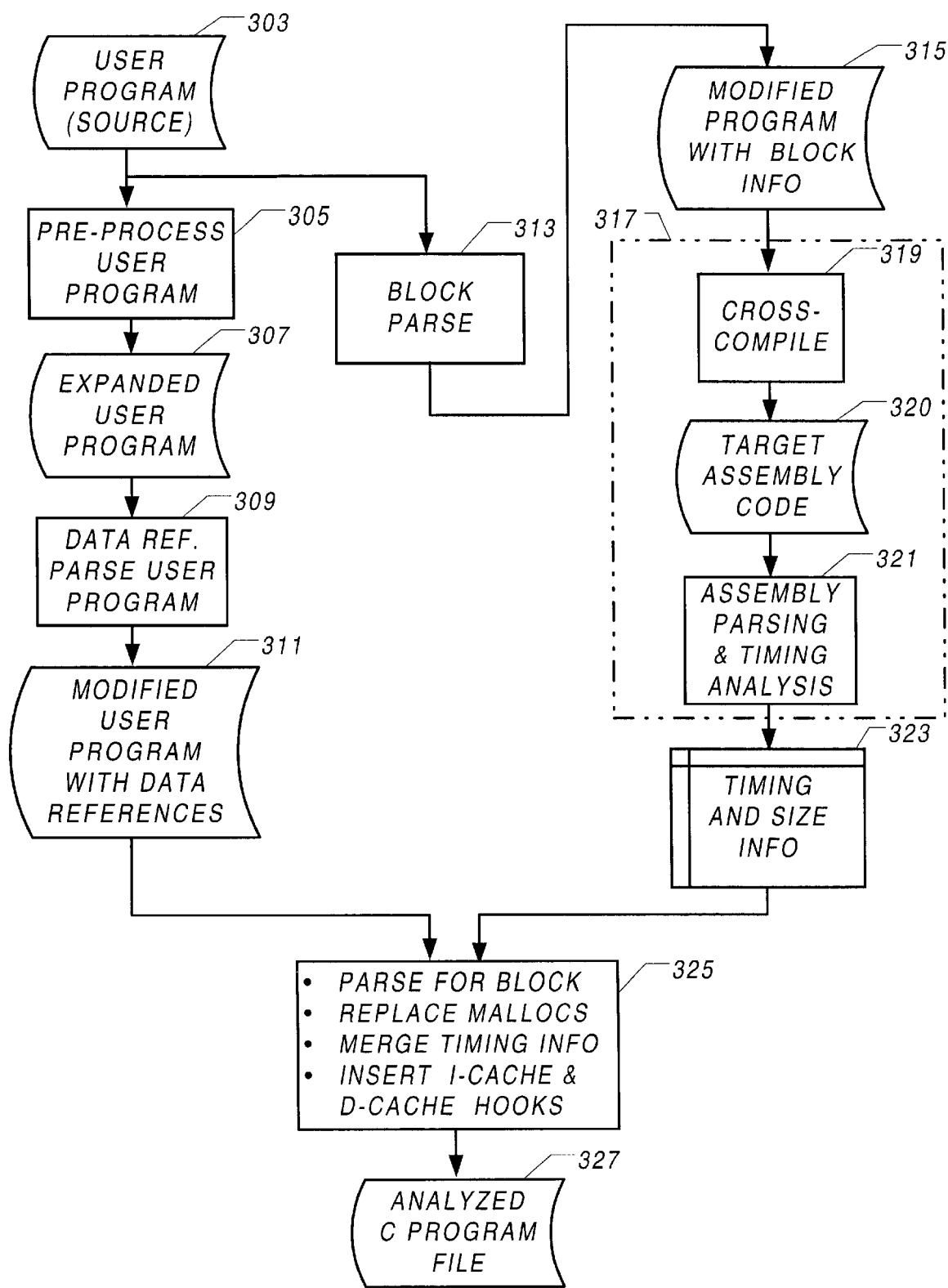
FIG. 3A shows a flow chart of the user code analysis process according to an embodiment of the invention.
Figure 3B:
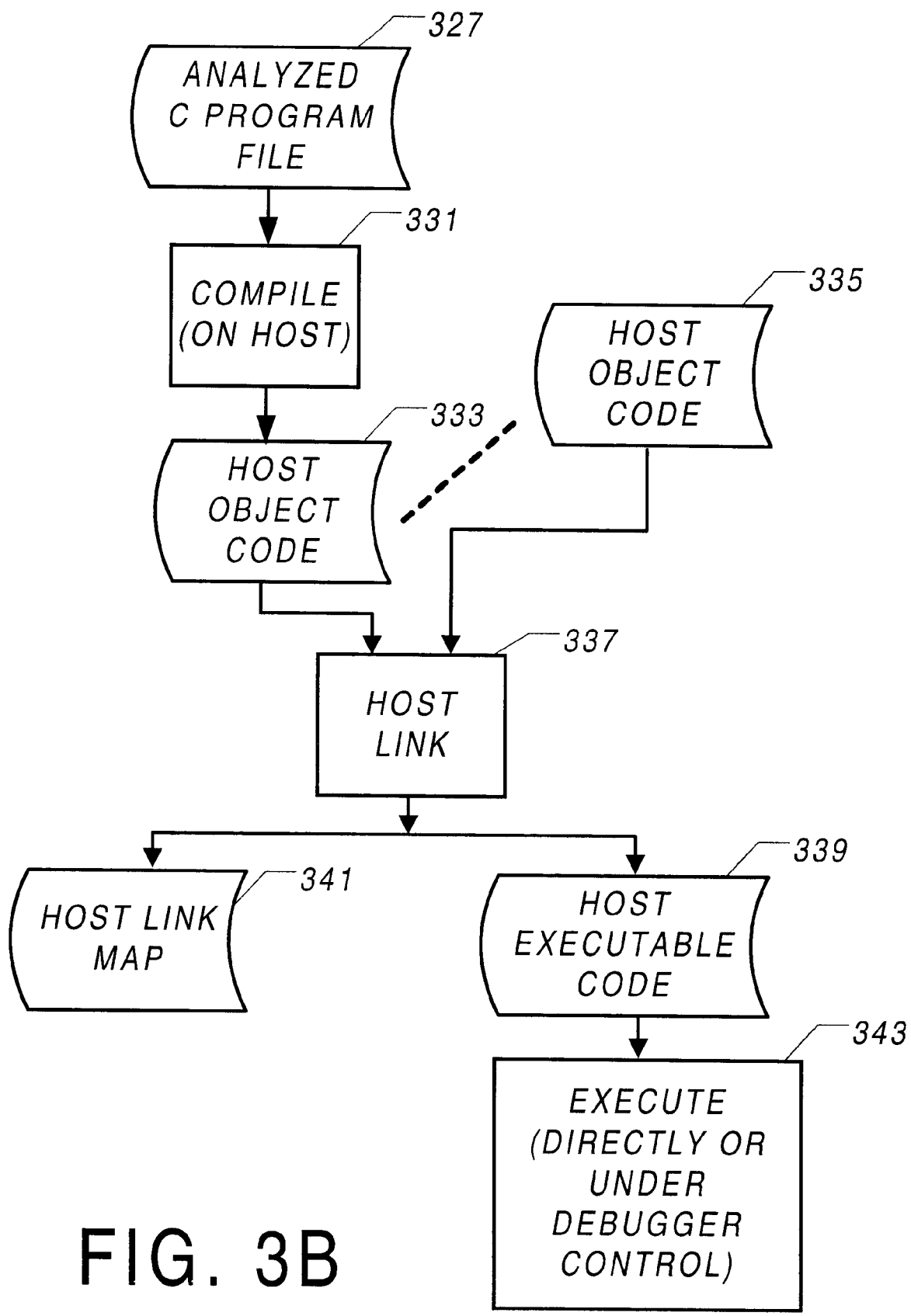
FIG. 3B shows a flow chart of linking several analyzed modules and execution of the analyzed user program according to an embodiment of the invention.
Figure 3C:
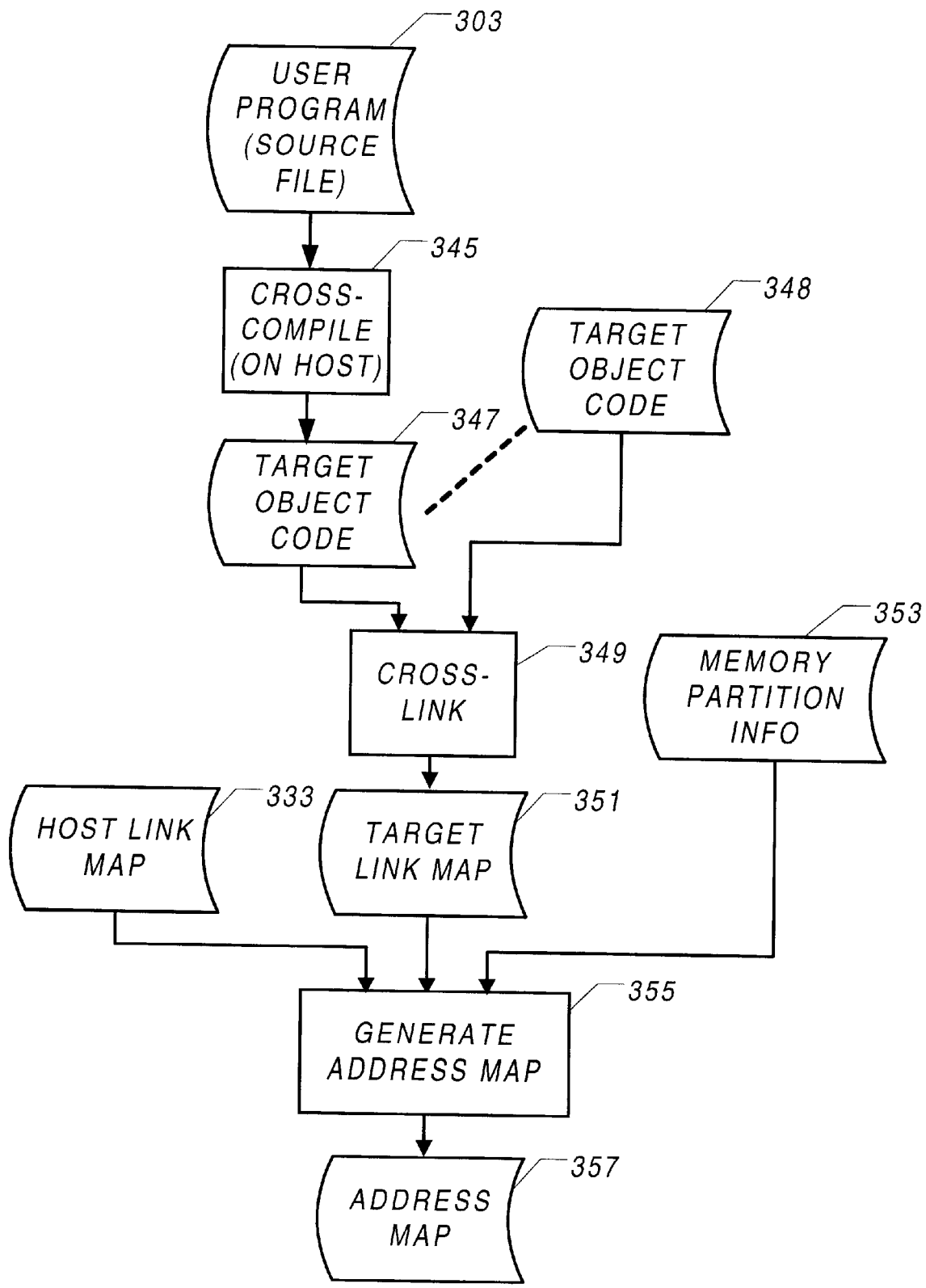
FIG. 3C shows a flow chart of the process of generating an address map according to an embodiment of the invention.

FIGS. 3A, 3B, and 3C show flow charts of the analysis process 300, which include static and dynamic analysis, and show how the information produced by the analysis process is used. Referring first to FIG. 3A, the first step of the analysis process 300 is preprocessing the user program source 303 to expand any macros. This generates expanded user program 307. The expanded user program is now subject to data reference parsing (step 309), including D-cache parsing. This data reference parsing step 309 uses a first 'C'-language user program parser and includes inserting one or more data reference hooks into the user program whenever a memory reference is made, and thus generates a modified user program 311 with data reference calls. In the particular embodiment, the data reference hooks are inserted before any statement that includes a memory reference. The hooks are in the form of calls to a data reference function called vpm_dc( ) which determines if the reference is to a device or memory, and if to memory, builds an entry to be processed by the cache simulator simulating the data cache. The syntax is vpm_dc(addr, read, size)

where addr is the address in the memory reference, read indicates whether this is a read or write reference (read=1 indicates a read, while read=0 indicates a write), and size is the size of the item being referenced. For example, the C statement x=y;

would have the following two memory reference calls inserted before the statement in D-cache parsing step 309 and one statement after, as follows:

```
(vpm_flushwrite ( ),
vpm_dc(&y, 1, sizeof (y)),
vpm_dc(&x, 0, sizeof (x)),
x = y)
...
...
(vpm_flushwrite ( ) ...,
``` where the first vpm_flushwrite( ) call is inserted to flush the device writes from the previous statement. The second flushwrite shown above is for the previous data write. As described in more detail below, when the vpm_dc call is executed, the memory mapper 125 is called and determines if the reference address is a device address or a memory address. If the address is not a device address, the memory reference is added to a list of references that are to be looked up in program order at the end of the block using the cache simulator. If it is a device address, and a read access, then the read from the device is executed immediately. If it is a device address, and a write access, then the write needs to be delayed until after the instruction has been executed on the host. In such a case, vpm_dc when run queues the write to the device. One or more such writes may be queued before the statement is executed. The inserted vpm_flushwrite( ) function de-queues all the writes on the queue and executes them, i.e., sends the data to the one or more devices.

Note that the code insertion becomes more complex for compound or complex user program statements. For example, x++, *x++, or --(*x++) will produce complex insertion. Furthermore, some of the code insertion will occur within the statements. For example, the program line for (i=2; i<=n; i++)

results in the following fragment in modified user program with data references 311.

```
for ((vpm_flushwrite(), vpm_dc(&(i), 0, sizeof(i)), i = 2);
    (vpm_flushwrite(), vpm_dc(&(i), 1, sizeof(i)),
    vpm_dc(&(n), 1, sizeof(n)), i <= n); (vpm_flushwrite(),
    vpm_dc(&(i), 1, sizeof(i)), vpm_dc(&(i), 0,
    sizeof(i)), i ++))
```

The first vpm_flushwrite is to flush any previous write references.

The analysis process also includes parsing the user 'C' program 303 to determine the linear blocks. In the particular embodiment, block parsing step 313 uses a second 'C'-language user program parser which searches for the language constructs that identify the beginning and end of such linear blocks, and places start and end block information in these locations. As described in detail in above-mentioned incorporated by reference U.S. patent application Ser. No. 09/430,855, in the particular embodiment, second user program parser 313 places labels at the beginning of each linear block. The result of this step is a modified 'C' program file 315 with block information.

Note that normally, linear block boundaries are natural constructs in a language such as C, and analyzing the program block by block to determine timing information allows the analyzed program to run fast on the host processor. To provide for accurate timing calculations at the beginning and end of a multi-instruction linear block, linear blocks may be defined to be as short as a single instruction. In such a case, the analyzed program would run more slowly on the host computer system, but executing such a finely analyzed program, when required, would produce accurate timing information.

Once the linear block boundaries are determined, the next step in the analysis is determining by static analysis the time delay for each linear block of the user using characteristics of the target processor. This is shown in the flow chart of FIG. 3A as the set of blocks 317. Each step in the static time delay determining process 317 is now discussed for the preferred embodiment case of the user program including code in some higher-level language such as 'C.' Alternate higher-level language embodiments might include 'C++' statements in the user program, or statements in some other programming language.

The first step in 317, shown as 319, is cross-compilation on the host processor of the modified user program file 315 into the assembly language of the target processor. This generate a target assembly code file 320 corresponding to the 'C' user program, but with the labels that were applied in the parsing step 313 incorporated. For this, a compiler ("cross-compiler") that generates assembly language for the target processor is run on the host processor. Note that each different type of processor needs its own cross-compiler, so when a virtual processor model is selected, the particular cross-compiler to use in analysis is also specified. Which cross-compiler to use is thus part of the target processor specific information.

The next step shown as 321 includes parsing the assembly language of file 320 line by line to determine the time delay in clock cycles required for each line, and the size in bytes of target code of each line. Simultaneously, a timing analysis process (also in step 321) is started. The assembler parsing process of step 321 communicates with the timing analysis process of step 321 via a communication channel to pass timing information, including adjustments for pipeline effects in the case of a processor that includes a pipeline, to the timing analysis process.

The result of the assembly parsing the timing analysis step 321 is a set of timings for each linear block in the 'C' code. A set of sizes of each blocks also is produced. The timing and size information of the blocks is shown as 323 in the flow chart of FIG. 3A.

The analyzer, in step 325, now parses the modified user program 311 using a third 'C' language user program parser. The parser ignores all vpm_dc and vpm_flushwrite (data reference or cache-related) calls, and breaks the modified user program 311 into linear blocks, keeping track of the block numbers in the same way as block parsing step 313, but without inserting the block boundary labels into the program. Step 325 also includes combining the linear block timing and size information 323 with the modified user program 311 that includes data references, and inserting hooks (in this implementation, function calls) to call the D-cache simulator and the I-cache simulator, thus generating an analyzed C program file 327 that includes static information for determining instruction timing information for the linear blocks, and code to dynamically determine timing effects caused by cache effects for references that might require a cache lookup. This provides the timing information for the processor simulator 107 (FIG. 1).

In particular, step 325 includes:

inserting prototypes of the function being used and definitions of the devices (with any host address mechanisms);

inserting a set of static arrays to include the timing and the size of each block from using timing and size information 323;

replacing any dynamic memory allocation statements in the user program with special versions of the dynamic memory allocation calls that in run time allocate host space, and keep track of how memory would be allocated or de-allocated in the target processor. This aspect is further described below;

inserting 'C' statements in each block (preferably at the end) to increment a global delay counter for that block;

inserting calls for those aspects of timing that cannot be determined until runtime. This includes code (hooks) in the form of calls to the instruction cache and data cache simulator. See below for more detail. It also may include for example, code (hooks) to call a bus access simulator or bus access and memory access simulator at runtime, and code to trap any execution exceptions such as arithmetic exceptions also may be inserted; and inserting statements to make sure that line numbering is maintained, and that when the program is run under debugger control, the debugger will ignore the added statements.

Each of the hooks for the instruction cache simulator that is inserted in modified program 311 is inserted at the end of each block, in the form of a function call to a function that uses the size information in timing and size information 323. The particular function is named vst_Icache in our implementation, vst_ICache during execution returns the delay caused by the I-Cache simulator lookup. The syntax of vst_Icache is vst_ICache(function_index, accumulated_size, block_size) where function_index is the index of the function, accumulated_size is the accumulated size of the function up to the block boundary, and block_size is the size of the block.

In order to process the hooks for the data references (which may be data cache references) that are inserted in modified program 311, a data cache hook is inserted at the end of each block, also in the form of a call to a function. During execution, a list of data references is built up in the block from all the vpm_dc calls. The function inserted at the end of each block calls the cache simulator to look up the data cache for all the references in the list, in execution order. The particular function is named vst_DCache in our implementation, vst_Dcache has no parameters, and during execution returns the delay caused by the D-cache simulator lookup of all the memory references in the block, the execution in order of appearance in the linear code block. In addition to the vst_Dcache call, a call is inserted to a function called vpm_resetdc. vpm_resetdc resets the list of memory references used for the previous block, so that the vpm_dc calls in the next block correctly build up a list of data references (e.g., memory references) for that next block.

Note that building up a list of data cache references (using vpm_dc calls) and then processing the accumulated list of memory references when the end of the block is reached is one way of implementing the invention. In an alternate implementation, the data reference hook (function vpm_dc) could call the cache simulator for the data cache simulator directly rather than waiting until the end of the block.

Thus, the analysis process includes inserting hooks in the user program for references that might cause a cache lookup, such hooks including the vpm_dc calls and vst_Dcache calls for data references, and vst_Icache calls for references that are to instructions.

The analysis program also inserts, as part of merge step 325, code at the start of each new function to determine the index of the function and to keep track of all indices for each of the functions in the user program. The function vst_NewFID(function_name) returns the index of the function. When executed, it looks up the I-cache simulator and determines if an index already exists for this function. If not, it generates a unique new index and registers the function name and the new index in the I-cache simulator. If an index already exists, the function vst_NewFID returns the existing function index.

Variables also are provided that allow the D-cache and I-cache to be turned on or off during program execution. These variables are called vst_ICacheOn and vst_DCacheOn for the I-cache and D-cache, respectively.

The result of parsing and timing information merging step 325 is an analyzed 'C' program file 327 that includes static timing information and dynamic analysis hooks. The static timing information incorporates pipeline effects in the case that the target processor includes a pipeline.

Referring now to FIG. 3B, the analyzed 'C' program file 327 is compiled (step 331) on the host processor to run on the host processor. The output is host processor analyzed object code 333. Continuing on FIG. 3B, the analyzed host object code 333 is linked in host linking step 337 with other analyzed host object code modules, one such other object code module shown as 335, to produce host executable code 339. In this implementation, a separate host link map 341 also is produced, and this link map is used to generate a host memory to target memory mapping described elsewhere herein (See FIG. 3B and description below). The executable code is run (step 343) by the designer on the host computer system to simulate the execution of the user 'C' program on the target processor.

Note that in one embodiment, the simulation execution step 343 is carried out not under debugger control, while in the preferred embodiment, the simulation execution step 343 is carried out under debugger control as explained elsewhere in the specification.

In the preferred embodiment, line numbers are preserved during the analysis process, even though new code is inserted, by inserting the new code without inserting any new-line characters. Other mechanisms may be used to preserve line numbers, and alternatively, line re-mapping data may be kept for use during execution of the user program on the host processor under debugger control.

FIG. 3C describes the part of the analysis process that determines an address map for use in mapping between host addresses and target addresses. In step 345, the original user program is cross-compiled to produce target object code module 347. This alternatively may be produced from target assembly code 320 from cross-compilation step 319. The target object code module 347 is linked in target cross-linking step 349 with other target object code modules, one such other target object code module shown as 348, to produce target executable code (not shown) and a target link map 351. Note that one link map is generated for each processor simulator. Thus, the vpm.info file may define information for several processors, for example, processor 1 and processor 2 for the simulation system shown in FIG. 2. A link map is then generated to use in each processor simulator that simulates the individual processors.

In the preferred embodiment, the default allocation is that all code and all constants are mapped into ROM, while all data areas as well as the heap and the stack are mapped into RAM. Means are provided for other alternatives.

This target link map 351 is combined with the host link map 341 produced by linking step 337 (see FIG. 3B) and target memory partition information 353 to generate an address map. The target memory partition information 353 describes how the target system's memory space is partitioned into ROM and RAM. In our implementation, the memory partition information 353 is in the form of a text file that contains the name of processor model, the name of the file linked to produce the target executable, the starting address (a target address) of the ROM, the end address (target) of the ROM, the starting address (target) of the RAM, and the end address (target) of the RAM. Note that in this implementation, a separate host link map 341 and a separate target link map are produced. Alternative implementations of this part of the invention produce target executable code or host executable code, either or both of which that includes the link map in embedded form.

The host to target address map 357 in our implementation is a file that includes two tables. The first table is a table of function addresses. Each table entry includes the function name, the host address of the function, the target starting address of the function, and the target ending address of the table. The second table is for data, and includes a single line for each data entry. Each data entry includes the host starting address, the host ending address, the target starting address, and the target ending address.

One such file is generated for each target processor being simulated. The host-to-target address map is used by the memory mapper 125 that maps addresses between host and target address space as required for example by the cache simulator 121 for simulating the cache (data cache and instruction cache, or combined cache) and as described in more detail elsewhere herein. The memory mapper 125 may also be used for device address mapping and for simulating the target memory.

Some of the preferred embodiment analysis steps of FIGS. 3A, 3B, and 3C will now be described in more detail.

The second user program parsing step 313 identifies linear blocks in the 'C' language user program file and inserts labels. The preferred embodiment uses 'C'-language aimed at the GCC compiler from Free Software Foundation, Boston, Mass. ("GCC" for "GNU 'C' Compiler", "GNU" for "Gnu's Not Unix"). GCC includes extensions of 'C'. Labels are inserted using one such extension, the asm ("<string>") construct, where <string> is an alphanumeric label, to inset the labels. This way, the labels will be identified as labels in any assembly code resulting from compilation. The parser defines and maintains a block counter. This counter commences at 0 at the beginning of the file when the first block beginning is identified, and increments when certain linear block boundaries are encountered. The number of block boundaries depends on the particular language construct. This is described in detail in above-mentioned incorporated by reference U.S. patent application Ser. No. 09/430,855, and summarized herein.

Briefly, the second user program parser 313 inserts three different types of labels (each including its block number)

for each construct. These labels use the letters b, p and e to respectively indicate "begin", "part" and "end". The first user program parser 305 inserts a b (i.e., "begin") label for the assembler language before the 'C' language statement that identifies the construct, an e (i.e., "end") label after the 'C' statement that identifies the end of the construct (usually "}" indicates the end of the construct), and one or more p (i.e., "part") labels.

The parser 313 also identifies the type of block construct, and what number of block this is. For example, the parser 313 identifies a while construct block with the letter w for while. In addition, "X__" is inserted at the beginning of each inserted label to enable the system to distinguish labels it inserts from other labels. Therefore, prior to a while statement, the label x__wbn__1 (using the asm ("X__wbn__1") statement) is inserted, where n__1 is the current value of the block counter. After the end (usually the final "}" of the while loop, the label X__wen__2 is inserted, where n__2 is the now current value of the block counter. n__2 will be equal to n__1+1 if there are no block constructs in the body of the while loop. In addition, after the beginning "{" of the block of statements executed in the body of the while loop, a X__wpn__1 label is inserted, where n__1 is now the same block count number as in the X__wbn__1 label that indicates the beginning of the loop.

The parser 313 identifies and inserts labels in 'C' constructs that indicate different types of linear blocks, including while loops, do-while loops, for loops, if and if-else statements, and switch-case statements. Plain blocks, identified by "{" and "}", that are not associated with any loop also are identified. Thus, a user can force the parser to recognize block boundaries by manually inserting a "{" and "}". This adds an important advantage to the system—a linear block can be as short as a single instruction, and the user has the option of so analyzing the code to get instruction-by-instruction timing.

The parser 313 also forces a boundary whenever it encounters statements that require software/hardware interaction and synchronization between input and output, such as I/O reads, and functions inserted by the user to implement virtual ports, described elsewhere herein, and other functions recognized as dealing with the interface mechanism, for example to pass control messages between the processor simulator and the hardware simulator. These functions are called "synchronized interface mechanism functions" herein and include many of the interface functions described herein above. The parser forces accurate timing to be made available whenever a synchronized interface mechanism function is encountered. In one embodiment, the synchronized interface mechanism function is surrounded by "{" and "}" characters. In the preferred embodiment, each synchronized interface mechanism function is recognized by its name. When encountered, the function is treated as a block.

The parser also keeps a count of the total number of blocks and the total number of functions in the 'C' language file. The number of blocks is the final value of the incremented block counter.

The output of block boundary 'C' language parsing step is a temporary 'C' language file 315 which is the modified user program with the block information inserted.

Figure 4:
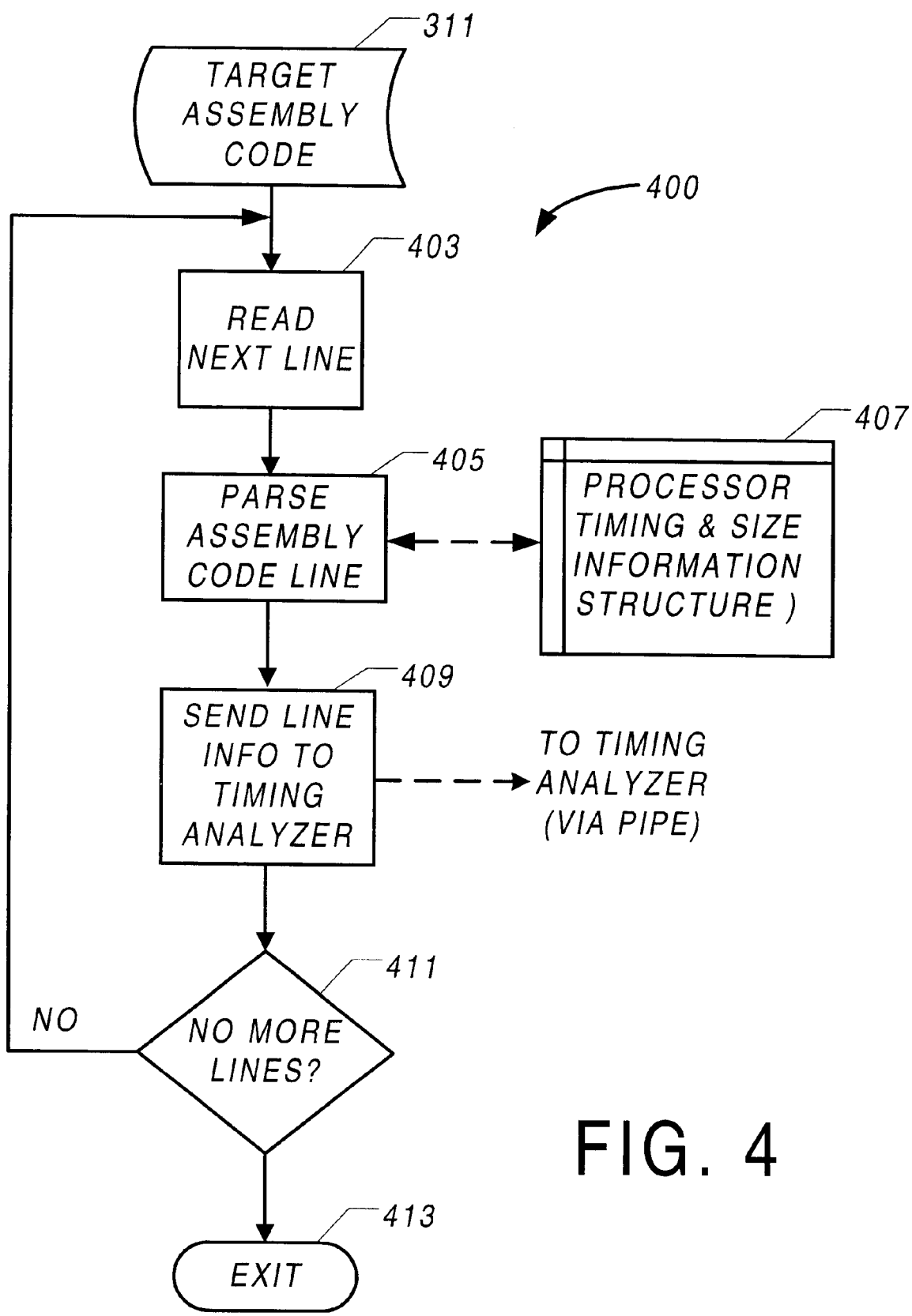
FIG. 4 shows a flow chart of an assembly code parsing step for inclusion in an analysis process according to an embodiment of the invention.
Figure 5:
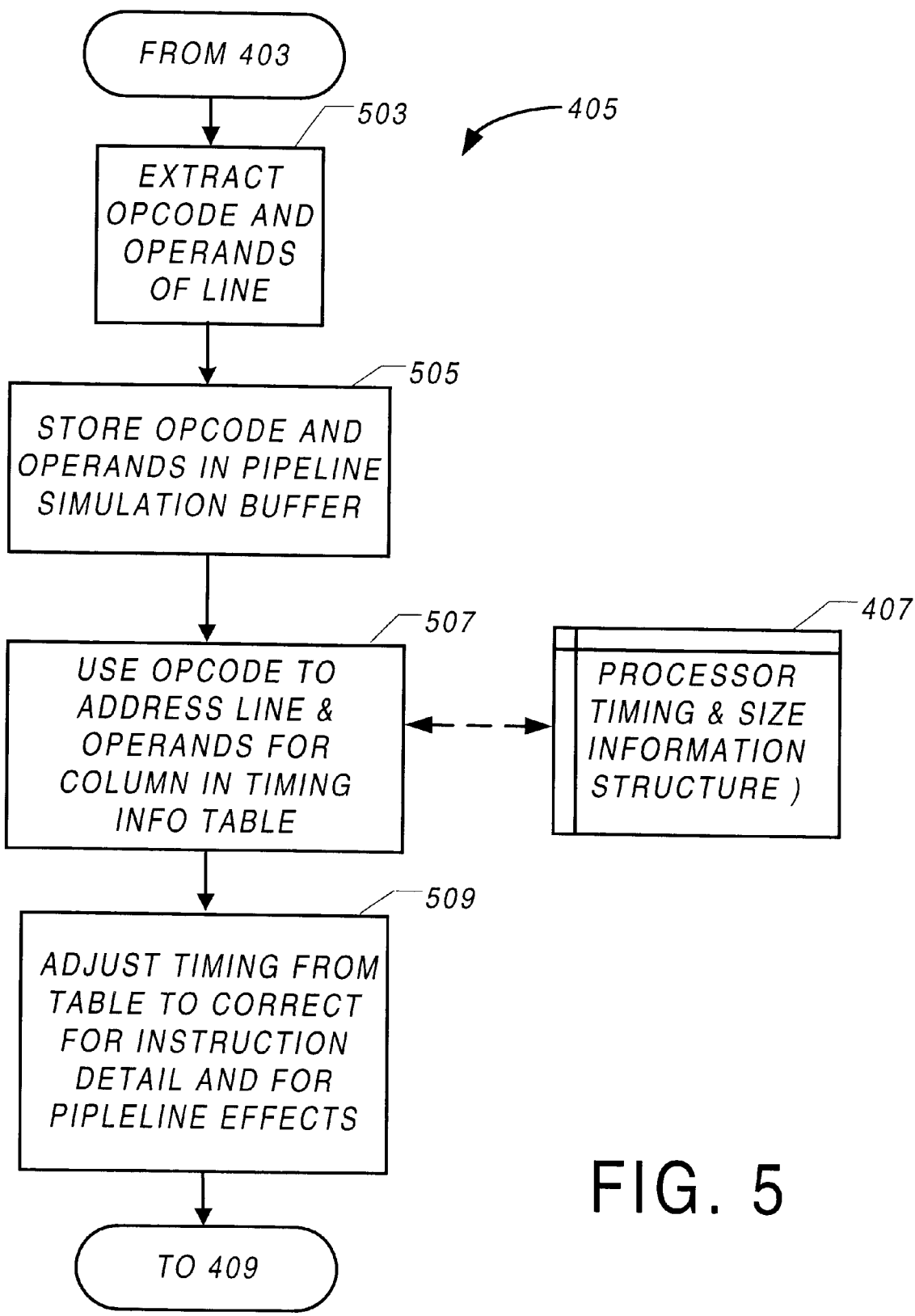
FIG. 5 shows a flow chart of the single line parsing step according to an embodiment of the invention.
Figure 6:
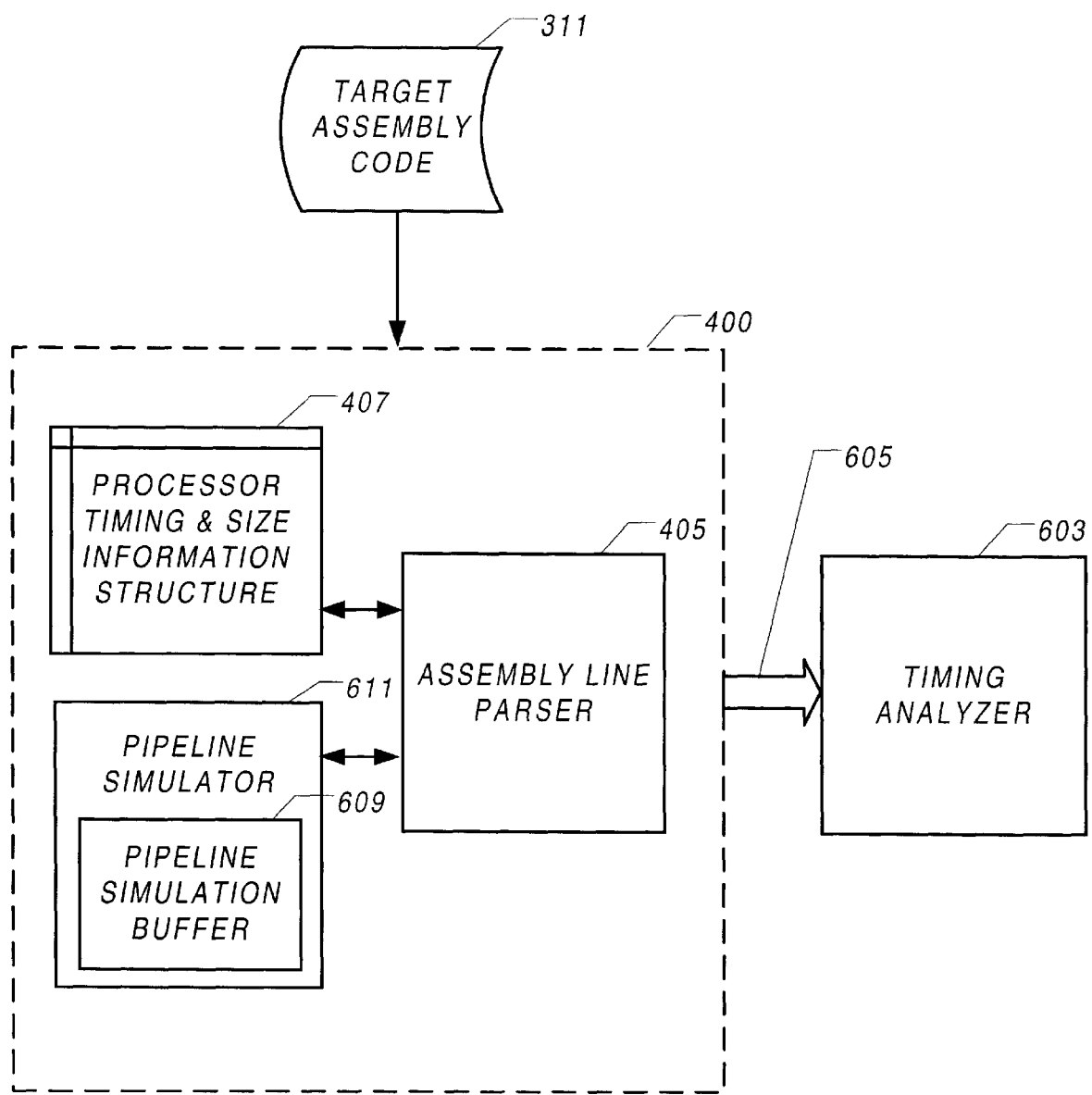
FIG. 6 shows a timing analyzer process communicating with assembly code parser according to an embodiment of the invention.

The assembly parsing and timing analysis step 321 includes an assembly parsing process part shown in more detail in FIG. 4, FIG. 5 and FIG. 6 and explained in detail in above-mentioned incorporated by reference U.S. patent application Ser. No. 09/430,855. Referring first to FIG. 4, assembly parser 400 in step 403 reads each of the lines of the cross-compiled assembly code file 320, then parses, in line parsing step 405, the instruction of the assembly code line to determine the timing delay (if any) and the size of the instruction (in bytes). The timing delay is the delay, in clock cycles, that it takes for the target processor to execute the line of assembly code.

As shown in FIG. 6, the parsing and timing analysis step 321 also includes running timing analysis code (the "timing analyzer" 603) which is described in more detail below. In the particular embodiment, parsing process 400 is started by the analyzer, and then the analyzer commences the timing analysis process 603 which communicates with assembly parser 400 through a pipe 605, and any alternate means of communication may be used in alternate implementations. Every time an assembly line parser 405 of assembly parser 400 completes parsing a line, it sends back information related to the line to timing analyzer 603 in step 409. The line information includes the time delay and any other timing information for the line and the size of the line, if an instruction, or, if a label, the name of the label. A token is used to identify the type of information as described in more detail below. The type of token also tells the timing analyzer what information to expect in the pipe for the line.

In the preferred embodiment, the assembly line parser 405 and the data it used are part of the Virtual Processor Model (VPM). The assembly line parser sometimes is called the technology parser. This part is not common to all processors, but is specific to the target processor, and thus forms part of the target processor specific information of the virtual processor model. In the preferred embodiment, a configuration file naming an executable parser is used when specifying the virtual processor model in a design to be simulated.

The assembly parser uses target processor timing information 407, i.e., information about the target processor that includes the time in clock cycles for each instruction and for the different addressing modes. In general, the timing for any instruction is determined by the opcode of the instruction, the operands the instruction is using, the type of addressing, and other such information. In the preferred embodiment, the designer of the virtual processor model manually extracts timing information from available data on the particular target processor. Such data includes the manufacturer's data book and may also include manufacturer's or other's models and other timing and functional information. The timing information is stored in a timing information data structure. A tabular structure is preferably used as the data structure, with each row structure representing an instruction, and each column structure representing different addressing modes or other variants of the instructions. In our embodiment, the individual instruction timing in the timing information table assumes a full pipeline and no pipeline hazards.

The timing information also forms part of the processor specific information in the virtual processor model.

The details of assembly line parsing step 405 are shown in FIG. 5. In step 503, the assembly line parser 405 first extracts the opcode of any assembly language instruction in the line and uses the opcode in step 507 to address the line of the table. As the parsing of the line progresses in step 503, more information on the operands is extracted from the assembly language line, and this is used to determine the column in step 507. The row and column provide the timing information for the assembly code line from the timing information table structure 407.

Timing information data structure 407 (i.e., the table structure) is preferably compressed as described in above-mentioned incorporated by reference U.S. patent application Ser. No. 09/430,855. Once the timing information is obtained in step 507 by a table lookup on the compressed table 407, the line parser 405 calls an adjustment process 509, which in the particular computer program implementing this step in the preferred embodiment, is a function called "lookup". The function lookup returns any timing delay adjustment (in cycles) necessary for the specific instruction to the timing obtained via the table lookup.

Another aspect of the adjustment process 509 is adjusting the timing to account for pipeline effects as described in more detail hereinunder.

Steps 403, 405 and 409 are carried out for each line. FIG. 4 shows step 411 checking if there are more lines to process. If not, the assembly code parsing process 400 terminates, otherwise, steps 403, 405 and 409 are repeated until there are no more lines in target assembly code file 320.

An aspect of the invention described in detail in above-mentioned incorporated by reference U.S. patent application Ser. No. 09/430,855 is accounting for pipeline effects such as pipeline hazards. In addition to the assembly parser 400 obtaining timing information by referencing the timing information table 407, the assembly line parser 405 determines any timing adjustments that need to be made and which instruction's timing needs to be adjusted because of pipeline effects. This determination is made as part of adjustment step 509. As shown in FIG. 6, the assembly parser 400 includes a pipeline simulator 611 that preferably comprises a pipeline simulation buffer 609 with the same number of entries as there are stages in the pipeline of the target processor. Every time the assembly line parser 405 encounters an opcode or operand, it stores the opcode or operand in the pipeline simulator buffer. This is shown as step 505 in FIG. 5.

When the lookup routine called lookup (step 509) is invoked for making adjustments to the timing, it adjusts the timing obtained from the timing information table according to the particular instruction and addressing mode and operand, and also checks the contents of the pipeline buffer 609 for possible pipeline hazard conditions. The lookup function identifies the potential for pipeline stalls and actual stall conditions, and calculates the delay penalty for such a stall, and which instruction would incur such delay penalty, and returns the adjustment (called the "amendment") required for the timing and also information to indicate which instruction to apply the amendment to. The instruction information is supplied as an offset: a digit indicating how many instructions back to apply the amendment to. For example, the previous instruction is indicated by a 1, two back by a 2, and so forth.

Thus, in the preferred embodiment, the lookup function including the pipeline specification also forms part of the processor specific information in the virtual processor model.

Analyzing the pipeline simulation buffer for hazards and determining penalties, if any, is different for each type of processor. The target processor manufacturer publishes details on the pipeline processing, builds models having the pipeline characteristics, and such information is used to design the pipeline analysis part of function lookup. How to so design the pipeline analysis part of timing adjustment step 509 using manufacturer's (or other) data and models would be clear to those in the art from the examples and discussion herein.

Referring again to FIG. 6, the assembly parser 400 passes tokens and data to the timing analyzer 603 via a pipe 605. Clearly any other communication channel may be used. Different types of tokens are used to indicate different types of information, and the type of token identifies to timing analyzer 605 the type and amount of information that follows.

Timing analyzer 603 generates timing and size information 323 for each block for inserting 'C'-code into the modified user 'C' program 311 at each block to indicate how much delay occurs in such a block. To do this, timing analyzer 603 allocates an array of a size at least equal to the known number of blocks (the largest increment of the block counter). Each array location is used to store the delay for that block. Those in the art will appreciate that other structures may be used to store the timing results for each block.

Timing analyzer 603 examines all the tokens arriving from the assembly parser 400. Each time the timing analyzer gets a token, it knows from the type of token how many numbers or strings to obtain from pipe 605 for that token. As timing analyzer 603 encounters tokens with delay, it adds up the delays on the fly for each block until the end of the block. Timing analyzer 603 also maintains a block number counter that indexes the array location.

Whenever an amend token is encountered for a block, timing analyzer 603 adjusts the accumulated delay accordingly. Thus, when the assembly parser first sets up the pipeline simulation buffer 609, it sends a set buffer token to the timing analyzer, and the timing analyzer then sets up an analyzer buffer of at least the same size for determining how to make timing amendments. If the amend token refers to an instruction which is in a previous block, the analyzer goes back to the previous block (array element) and changes the number (i.e., the accumulated delay) in the previous block location of the delay array element.

Block boundaries are obtained from the labels. There are two types of labels in the assembly code, the ones the first parser 313 inserted as block information, and labels that the assembler has put in. The timing analyzer ignores assembler labels. Those that we put in include an identifier, in this case the "x__" that the labels commence with. Such labels enable the timing analyzer to know where in the user program any assembly code is.

Adjustments to time delays are made depending on the type of block encountered because different parts in a linear block may execute a different number of times.

The preferred embodiment includes a provision for optimization. Typically, running the cross-compiler with the optimizer invoked may move some of the labels, may cause some other code to be shared, and may cause linear code segments to execute a different number of times in some loops. Thus, when the optimization flag is invoked by running the VPMA process with an optimization flag invoked, the interpretation of the tokens takes into account knowledge of how the compiler optimization may shift some of the labels and/or code in some of the blocks, and also, how the blocks within language structures are to be interpreted.

Note that the preferred embodiment timing analyzer 603 also stores the size in bytes of each linear code element. The size too is stored in an array.

The result of the timing analysis is timing and size information 323 in the form of two arrays, one with the delay time for each block and the other with the size of each block.

Exception Handling

One aspect of the analysis is determining the possibility of exceptions that occur during execution of the user program. Certain combinations of instructions are known to be able to produce exceptions (arithmetic overflows, divide by zero, etc.) during execution. When such an exception occurs during execution, the pipeline typically needs to be flushed, so a time penalty is introduced. In the preferred embodiment, during analysis, at user option, the analyzer examines instruction combinations for the possibility of exception. When such a combination is identified, the analyzer in the merge step inserts code at the identified locations that, when executed, evaluates exceptions, and when such exceptions occur, trap the processor simulator into an exception handling function that determines the timing penalty for the exception.

Sample Merged Code

FIG. 12 shows a simple user program to demonstrate by way of example how code is inserted by the analyzer to form the analyzed process. FIGS. 13A through 13I show excerpts from the actual 'C' code of the analyzed version of the user program shown in FIG. 12 in order to demonstrate by way of example, some of the code that is inserted. Comments have been added in FIGS. 13A–13I to describe some of the added code and the operation thereof. FIG. 14 shows a file, called vpm. info that contains the name of the processor model (a MIPS R4000 processor, in this case) and the memory partitioning that is used to generate a map between host and target memory, and other information used to map target addresses from host addresses (and vice-versa). The file vpm.info contains the name of file liked to produce the target image, the starting address (target) of the ROM, the end address (target) of the ROM, the starting address (target) of the RAM, and the end address (target) of the RAM. Optional parameters include: the target heap start address, the target heap end address, the target stack start address, and the target stack end start address. The file vpm.info also contains any device names and target address information.

Thus, in accordance with the preferred embodiment, the analysis process produces an analyzed version of the user program that includes instructions for accumulating the calculated linear block time. While the preferred embodiment analysis process inserts labels as a mechanism to identify block boundaries, other identifying mechanisms may be used. Also, while the preferred embodiment analyzed user program includes inserted instructions that include inserted labels to identify block boundaries, and timing information in the form of data structures indicating the amount of delay per block, other implementations are possible, and such other implementations are included in the scope of the invention.

In accordance with one alternate implementation, the analyzed version of the user program again includes instructions for accumulating the calculated linear block time, however, in this alternate, function calls are inserted at block boundaries rather than labels. The functions are executed at run time. The analysis process inserts code in these functions to accumulate the delay during execution. The functions for each block may include a start-up function that determined any startup penalty due to need to re-fill the pipeline, for example in some cases where the block had started from a branch.

In accordance with another alternate implementation, the analysis process produces a parallel structure that keeps track of the different programming structures within the user program and the block boundaries. Thus, the analyzed version of the user program includes the user program and the parallel structure that mimics the user program structure.

Other alternatives would be apparent to those of ordinary skill in the art from the details provided herein.

Operation of the Cache Simulator

As described above in more detail, the dynamic analysis part of analyzer 112 inserts instrumentation code (i.e., hooks) into the user program 109 whenever there is a reference (e.g., a memory reference) and also at the start of each function and at the end of each linear block. At the start of each function, code to call the cache simulator for the instruction cache is inserted when there is an instruction cache. A combined cache is handled similarly. At the end of each linear block, code is inserted to call the cache simulator for all memory references in the just ended linear block. When the analyzed program 111 is executed on the host computer system, executing the inserted code for the instruction or combined cache causes a cache lookup to be performed using the cache simulator 121.

Executing the I-Cache

Executing the inserted code for the I cache (the vst_ICache calls) is now described in more detail. The analysis process described above produces address information of all user defined, as well as library functions for the target machine where the program is supposed to run. This is shown as address map 357 in FIG. 3C, and is included in memory map info 108 in FIG. 1. Analysis process also calculates the offset size of each linear block from the beginning of the function enclosing it, and the size of each linear block in the user program. When executing a vst_Icache call, the cache simulator 121 uses the memory mapper 125 which in turn uses these pieces of target information to generate the starting target address and the size of the linear block being executed. The cache simulator 121 then immediately processes this instruction reference by "looking up" the addresses in the simulated cache, that is, the cache simulator compares the tags and uses the remaining address bits to find the desired cache block to load the data. Note that the cache model does not store any real data, only target addresses. The cache simulator then causes the system to accumulate the delay caused by the cache lookup. When there is a cache hit, the cache simulator returns a value of zero for function vst_ICache( ). Cache misses are handled differently depending on the level of detail desired by the user. One level of detail is to return a delay calculated on an assumed time required to access memory (the memory read cycle time), the sub-block and word sizes, and the refilling policy for the cache. In accordance with another aspect of the invention, a higher level of detail may be invoked that causes a bus model in the hardware simulator to simulate the reading of memory into the cache via the bus. That is, a cache miss results in the cache simulator 121 of the processor simulator 107 using the communications mechanism 141 to send event information to the hardware simulator 103, the event being to execute a required number of bus cycles on the bus model part of the target digital circuitry. The required number of bus cycles is determined using the sub-block and word sizes, and the refilling policy for the cache. This causes the suspend mechanism 149 (FIG. 1) to suspend operation of the processor simulator 107. The hardware simulator 103 now processes the associated event information by executing the required number of bus cycles and returns to the processor simulator 107 when it has completed the operation. The resume mechanism 151 (FIG. 1) now resumes operation of the processor simulator 107. In such a case, the cache simulator returns a value of zero for function vst_ICache( ).

Executing Data References

Figure 7A:
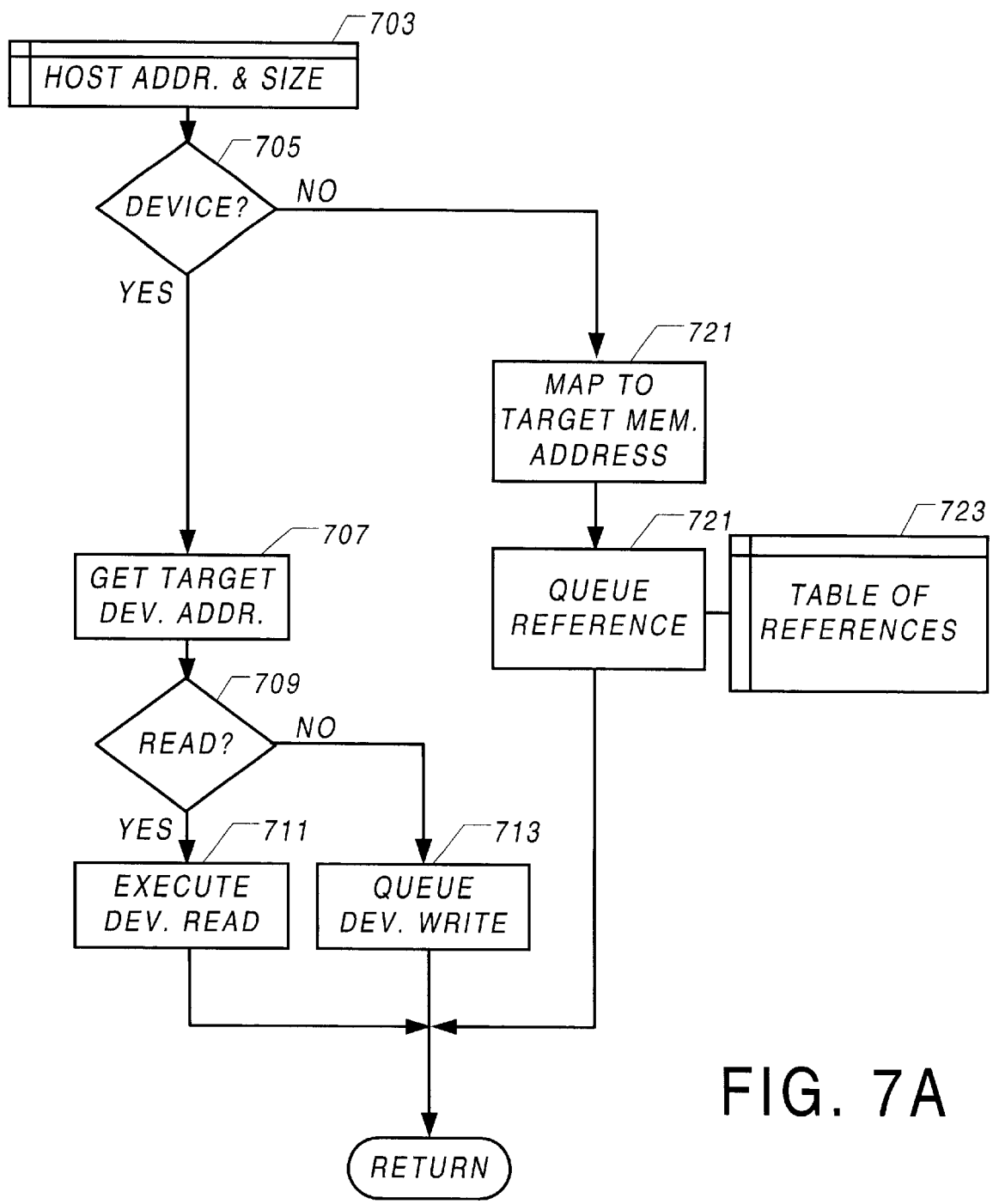
FIG. 7A shows a flow chart of execution of the data memory reference hooks inserted during the analysis of the user program according to an embodiment of the invention.

Executing the data reference hooks (the vpm_dc calls) is now described in more detail. Like the instruction cache references, the data reference generation method gathers the target address information at a very high level (e.g. C-source level), using the instrumentation code statements (i.e., hooks) that were inserted during the analysis step, in particular, the vpm_dc calls. During execution of the analyzed program 111 on the host computer system, the inserted codes generate reference target addresses and sizes. Since the analyzed program runs on the host computer system in the host address space, addresses are provided in host memory space. FIG. 7A shows how memory references are processed in run time by the vpm_dc calls. The host address (and size) is shown as 703 in FIG. 7A. In step 705 it is determined if the address is device address. See below under "Reading and Writing to Devices" for a description of how reads and writes to devices are processed. If the reference is not for a device, the host address is converted in step 721 to a target memory address by memory mapper 125. Step 721 of determining the target address from the host address uses memory map information 108 generated during the analysis which describes how host memory and target memory locations relate to one another. Memory map information 108 preferably is in the form of file 357 generated in the flow chart of FIG. 3C. Step 721 is described in more detail below. The target memory reference is queued (added to a list) in step 721 for later processing at the end of the linear block. The list preferably is in the form of a table of memory references. The data cache lookups using the cache simulator are then executed at the end of the linear block in order of appearance in the linear block by executing the code inserted at the end of the linear block that calls the cache simulator 121. Note that in an alternate embodiment, the cache simulator lookups are executed as they occur rather than at the end of the linear block. The cache simulator 121 executes the cache model by processing each entry in the memory reference table and simulating the actions of a real cache.

FIG. 7B shows a flow chart for step 721 of determining the target address of a data memory reference from the host address. Step 721 is carried out by memory mapper 125. There are basically four types of data: stack, heap, constants (and strings), and global and static variables. Where each type of data is stored may be changed at user option. The location is known to the cache simulator. For example, when code is stored in ROM, the constants also may be stored in the ROM. The other data is then stored in RAM. The stack typically is kept at the top of RAM, global and static variables are typically stored at the bottom of RAM. The heap starts on top of the area for global and static variables. The analysis program generates a map that enables identifying the areas and mapping their host computer system addresses to target addresses. Determining which area a (host) address lies in and mapping to a target address are done on-the-fly, as the host data address is being generated during execution of the analyzed user program.

For the stack and heap regions, the analysis program inserts data structures and code to manage a model 729 of the target stack and a model 719 of the target heap. As described in more detail below for the case of the heap (see under "Dynamic Memory Allocation"), every allocation (e.g., a malloc call) and de-allocation (e.g., a free call) of the host stack and the host heap are emulated by functions inserted in the user code to replace the original allocation and de-allocations. During execution, allocations and de-allocations are carried out on the host memory, and the allocations that would occur in the target processor system are emulated using the target heap model 719 and target stack model 729. Similar to the cache model's not keeping actual memory content, the stack and heap models only keep track of addresses and sizes, not contents of the data. Contents of data are kept in the memory of the host computer system.

Constants are typically stored in the code area, for example at the beginning of the function defining them. Thus, referring to FIG. 7B, if it is determined in step 706 that the reference is to a constant, the calculation of the target address is carried similar to that of the instruction address earlier. The process calculates the offset size of the constant from the beginning of the function. This is simply the difference between the host address of the constant and the starting host address of the function. Step 708 then adds this offset to the corresponding target address of the function to obtain the target address of the constant.

Steps 715 and 725 determine, respectively, if the reference is in the heap space and in the stack space. If neither, then the memory reference is for global/static data. The host and target address information is kept in the host to target address map 357 generated in the analysis process as described above. Thus, the target address of any global/static data is determined from the host address in step 731 by looking up the table in file 357.

Memory Modeling

Operation of the memory model 122 of the description 105 of the target circuitry is now described. The memory model, for example, is coupled to the bus model 124 and responds to bus cycles by returning onto the relevant hardware data signal lines contents of the target memory specified by the hardware address on the relevant lines of the bus. During execution, such contents of target memory are stored in the memory of the host computer system.

In our Verilog embodiment, the memory model 122 includes a behavioral model of memory implemented as a PLI. We provide a function for use in the memory PLI that refers to the hardware model that calls the processor simulator PLI, and then in run-time returns the task ID of the processor simulator PLI. That enables the behavioral memory model in memory model 122 to access the host memory within that task (i.e., of that processor simulator). We also provide a function that calls the memory mapper 125 of that processor simulator to translate a target address to the host address for that processor simulator. The behavioral model of memory for memory model 122 now carries out the read or write within the memory of the host computer system.

In this way, memory model 122 models the memory of the target processor system in hardware including storing the memory data in the memory of the host computer system.

Dynamic Memory Allocation

Memory allocation and de-allocations are dynamically simulated on the host computer system using a memory allocation simulator 123. The memory allocation simulator 123 maintains a model of the target heap on the host, and allocates memory on the host heap during execution of the analyzed user program. The particular model of the target heap used in the preferred embodiment is a doubly linked list inside a (top level) doubly linked list. An element in the top level doubly linked list has a link (in host address space) to the previous top level element and a link (in host address space) to the next element. The contents include an element of the inner level doubly linked list. The inner level element includes a first link (in target address space) to the previous segment of memory in target heap space, and a second link (in target address space) to the next segment of memory in target heap space. The inner level element also includes the host memory for the segment of heap memory. An "inuse" flag is included to indicate if the segment is allocated or free, and an entry is included to indicate the size of the segment (in bytes).

In this way, the host maintains the contents of the target heap, and a simulation of the behavior of the target heap as memory is dynamically allocated, de-allocated, and re-allocated using, for example, such 'C' language functions as malloc( ), free( ), realloc( ), and calloc( ).

As would be clear to one of ordinary skill in the art, any other model of the target heap may be used to implement memory allocation simulator 123, such that the host maintains the contents of the target heap, and a simulation of the behavior of the target heap as memory is dynamically allocated.

The analysis process replaces each memory allocation construct in the user program with a call to the memory allocation simulator to perform the same function. Thus, for example, the instruction malloc(1000) would be replaced with a corresponding function call, vst_malloc(1000), which would create a new top level element in the heap doubly linked list which includes host memory allocation of 1000 bytes for storage of user data, and which has as the inner level doubly-linked list a simulation of where this memory would be allocated on the target computer system. For example, if a "free" target heap segment of length 1000 bytes was available, this segment might be selected for the target heap allocation, and then the inner pointers would be set to provide for a target allocation of 1000 bytes. As a result of this operation, the top-level list is also modified to reflect the allocation of 1000 bytes in the host heap space. The "inuse" flag would be set to indicate that the segment was in use (allocated). As another example, if a "free" target heap segment of 10,000 bytes was available, this would be split into two target segments, one of 1,000 bytes for the allocation, and the other segment of 9,000 bytes free to be allocated later.

The instruction free (ptr) would likewise be replaced with corresponding function call, vst_free (ptr), which would on execution both de-allocate the area in host heap corresponding to the area pointed to by pointer ptr, and simulate the de-allocating of the malloced area in the target computer system associated with the pointer ptr. If possible, the de-allocated segment would be joined with the previous and with the following segment in the simulation of the de-allocation of the target memory on the target computer system.

Thus, referring again to FIG. 7B, when there is a memory reference (a host address), steps 705, 715 and 725 determine what area of host memory the memory reference is in. If this is the heap area (step 715), then in step 717, the process determines what host heap segment (in the top level structure) this address is in, and from this, determines where in the target heap this address is associated with. By calculating the offset value of the host address from the starting host segment address and adding this offset value to the starting target segment address, the target address is then determined, completing step 717.

Note that if there is a need to translate target heap address back to host heap address, a similar but reverse address translation mechanism can be used. This can be done by determining where in the target heap segment the target address is located in (through the low-level structure), to find out the host heap segment the corresponding host address should be located in. By calculating the offset value of the target address from the starting target segment address and adding this offset value to the corresponding starting host segment address, the host address is then determined.

Reading and Writing to Devices

The target processor information may include a list of devices, and the target addresses in the address space of the target processor for each device. The device information, when included, is included in the vpm.info information file, which then includes for each device the name of the device, the target address of the device, and the memory window for the device in bytes since each device will typically have a set of addresses. Note that the particular vpm.info information file shown in FIG. 14 for the illustrative example does not include any devices.

As part of the analysis process, code also is inserted in the user program that during execution defines host variables (e.g., a set of #DEFINE statements using the names in the vpm.info file) for each of the devices that have target addresses, and performs a memory allocation (a malloc) within the host computer system address space for these variables.

These device variables and the corresponding host memory locations are thus mapped to the target addresses corresponding to the devices. The device address information forms part of memory mapper 125.

Referring again to FIG. 7A, whenever a memory reference is made, the vpm_dc hook inserted for the data reference determines if the address is a device address (step 705 in FIG. 7A). If yes, the process obtains the target address of the device (step 707) then determines in step 709 whether the reference is a read or write. If a read, then in step 711, the read from the device is executed and vpm_dc returns. If the reference is a write to a device, the memory reference is queued (step 713) and vpm_dc returns. The analyzed user program performs the instruction that includes the data reference. Note that prior to executing the instruction, more read or writes may be encountered, and any other writes are queued in order. Once the instruction is executed, the queued device writes are carried out using the inserted vpm_flushwrite( ) call.

Executing a read from a device causes the processor simulator 107 using the communications mechanism 141 to send event information to the hardware simulator 103, the event being instructions to read from the device in the target digital circuitry, for example via the bus on a bus model part of the target digital circuitry. This causes the suspend mechanism 149 (FIG. 1) to suspend operation of the processor simulator 107. The hardware simulator 103 now processes the associated event information by reading from the device in the target digital circuitry via the bus on the bus model part of the target digital circuitry, and returns to the processor simulator 107 when it has completed the operation. The resume mechanism 151 (FIG. 1) now resumes operation of the processor simulator 107. The data read is now available and is stored in the host memory in the appropriate location.

Similarly, executing a write to a device reads the data from host memory, then causes the processor simulator 107 using the communications mechanism 141 to send event information to the hardware simulator 103, the event being the data and instructions to write the data to the device in the target digital circuitry, for example via the bus on a bus model part of the target digital circuitry. This causes the suspend mechanism 149 (FIG. 1) to suspend operation of the processor simulator 107. The hardware simulator 103 now processes the associated event information by writing the data to the device in the target digital circuitry via the bus on the bus model part of the target digital circuitry, and returns to the processor simulator 107 when it has completed the operation. The resume mechanism 151 (FIG. 1) now resumes operation of the processor simulator 107.

Cache Processing

The vst_Dcache function inserted at the end of each block processes the accumulated data references. For this, the cache simulator 121 looks up each memory reference in the cache model in order. The vst_Icache function similarly processes the I-cache. In either case, a cache look-up is simulated during execution of the analyzed user program by extracting the tag bits from a target address, comparing the tag with all the tags of a set provided by the block number part of the address. If one of the tags produces a hit, the look-up completes and returns zero time penalty. If it is a miss, the cache simulator identifies the causes of the miss, such as first time accessing the data, a conflict at the same cache block, or every cache block containing a valid entry (i.e., no more room for the new data). It then updates the cache according to the policies set out in the cache configuration file. The actual time penalty incurred by the cache miss can be calculated in two ways, either by estimating the number of cache entries that need to be loaded from memory then multiplying it with a constant read or write cycle time, or by invoking a user-written miss handler which can perform a real bus transaction under a hardware simulation environment to obtain a more accurate timing.

Selecting the Level of Detail

One additional aspect of the invention is providing for simulating a processor at a user selected level of detail. Thus where greater timing accuracy is required or desired than provided by running the user program completely on the host computer system, those aspects of the target processor's execution where greater accuracy is required may be modeled in hardware. Such hardware is then included in the digital circuitry simulated by the hardware simulator. For example, the processor bus, or the processor bus and the processor memory may be modeled as hardware in the language of the hardware simulator to model bus accesses or bus/memory accesses.

When faster execution time is desired, the user may select simulating a processor operation without taking into account pipeline effects such as pipeline hazards.

Furthermore, when a user desires faster execution time, the user may select to estimate the delay caused by a cache miss totally in the processor simulator by using an assumed read or write memory cycle time, while when the user wishes more timing accuracy, the user may select to model cache misses in the hardware simulator by running a hardware model of the bus executing the required number of bus cycles.

Thus a user can start out with a simple processor model to start off the design process. At some stage of the design process, the user may need to go to more detail in one or another aspects of the design, and the user selected level of detail feature of the invention provides for that. Thus, the processor model can operate at a selected level of detail. Selected parts of the model can be modeled as hardware.

One example of modifying the level of detail in order to speed up execution of the analyzed user program is not invoking the cache simulator for all references that might require a cache lookup. The timing accuracy of such an approach would typically be less than for a fully dynamic system, and may be improved by using a cache performance prediction method for those references that do not cause the cache simulator to be invoked at run time.

Note that the code inserted during analysis for modeling in more detail can call software modules of the processor model that include the appropriate interface functions (getvarS, putvarS, etc.) to access the hardware modules of the processor model. Calls to these software modules are thus inserted during analysis. Thus, a bus model for inclusion may include a software component and a hardware model of the bus, with the software component including the necessary code to access the hardware during execution.

The Virtual Processor Model

We call the model of the target processor that runs on the co-simulation design system a virtual processor model. One aspect of the invention is a method for creating such a virtual processor model, the method comprising creating a processor model shell for operation on the hardware simulator of the design system to simulating activity of one or more signals of the target processor accessible to digital circuitry external to the target processor, creating a software shell to provide the user program access to the processor signals coupled to the digital circuitry in the electronic system, and creating target processor specific information for use in analyzing a user program to determine user program timing information such that when the user program is run on a processor simulator operating on the host computer system, the processor simulator accurately simulates execution, including providing timing, as if the user program was executing on the target processor, with the timing taking into account instruction timing.

Analyzing the user program is described in detail above and includes parsing the user program, inserting dynamic hooks to invoke the cache simulator, decomposing the user program into linear blocks, and determining linear block timing information.

The processor model shell provides the hardware simulator the ability to access in hardware entities that affect variables defined in the user program. For example, the PLI call back mechanism from the hardware simulator that starts a processor simulator or that sends a message to the user program is included in the processor shell. Thus the processor shell includes a mapper from the data format of the hardware simulator to the data format of the processor simulator. When the hardware simulator simulates hardware described in a hardware description language, the processor model shell includes access to code in the hardware description language. For example, the mechanism that relates the hardware variable asynevent to causing the processor simulator to run an asynchronous event handler is part of the processor software shell.

The software shell comprises functions accessible to a higher-level language code when the user program includes instructions in such a language. The software shell thus includes the translator of event information from the data format of the processor simulator to the data format of the hardware simulator. In the particular embodiment, the software shell includes the interface functions described herein above that provide the user program access to the hardware simulator.

Note that in some embodiments, the hardware simulator simulates hardware using a higher-level language, and in such a case, the processor model shell provides access to instructions in the higher-level language.

When the target processor includes a cache, the target processor specific information includes cache information including cache structure information and one or more cache operational policies.

When the target processor includes different types of memory, the target processor specific information may include memory partition information.

When analysis of user code includes cross-compiling the user code, the target processor specific information includes information on how to parse cross-compiled target code to determine the time delay for each line in each section of the target code corresponding to each linear block in the user program. The target processor specific information thus including the instruction timing information and, when a pipeline is included, the pipeline characteristics of the target processor.

The level of detail of any processor model is user selectable. Thus, different features of the target processor may be selected for modeling in hardware on the hardware simulator as a processor model or as a combination of hardware on the hardware simulator and software on the processor simulator, that is, as a processor hardware model and a processor software model. Analysis of the user code then includes inserting dynamic hooks into the user program to access such hardware modeled features or combines software/hardware modeled features. During execution, these hardware features are modeled on the hardware simulator. For example, the processor bus may be modeled in hardware as bus model 124. In such a case the bus model 124 is included in the description of the target digital circuitry simulated by the hardware simulator.

The level of detail in a processor model can be modified from simulation run to simulation run depending on the needs.

Figure 11:
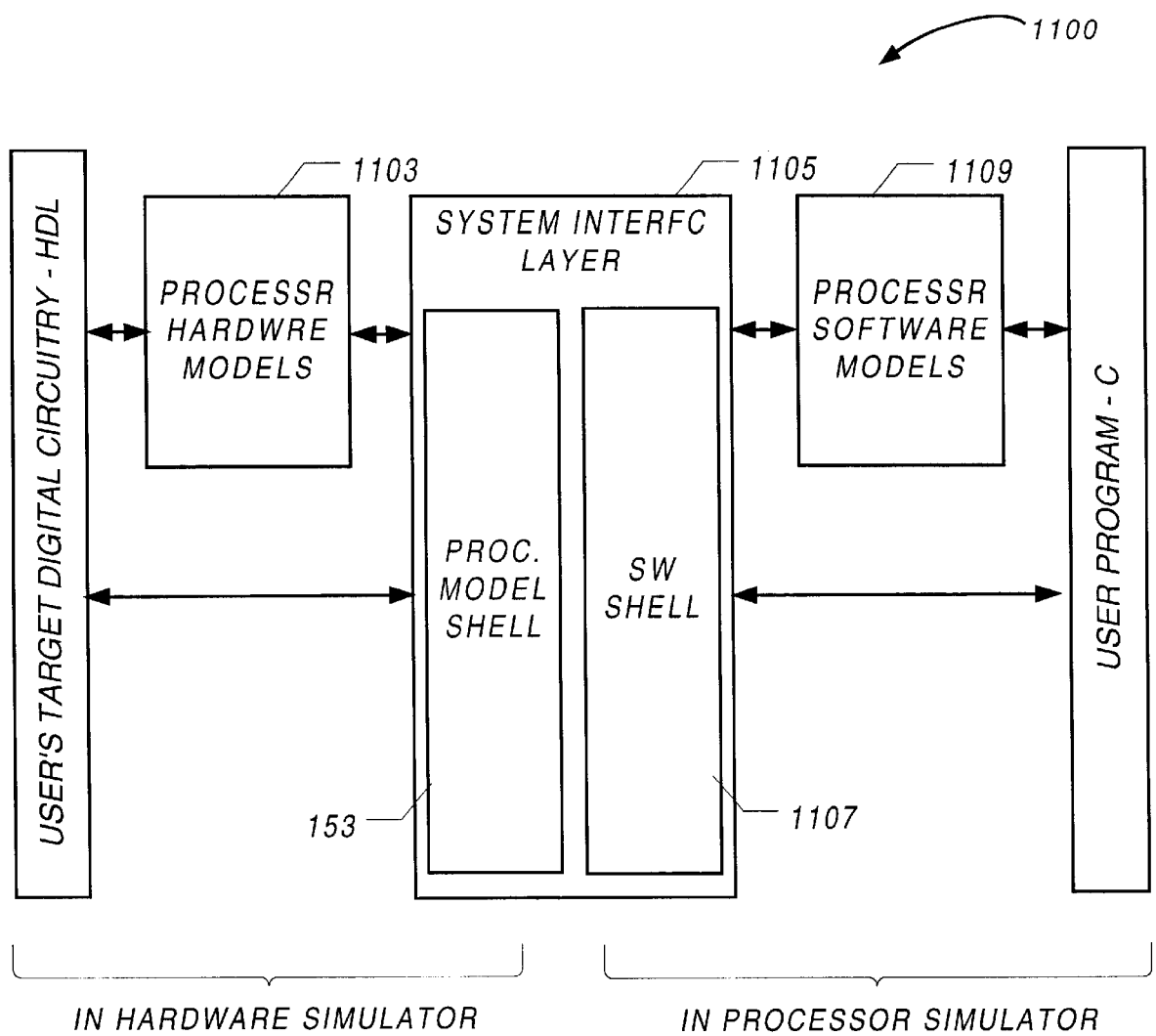
FIG. 11 shows a processor model formed according to an embodiment of the invention.

FIG. 11 shows part 1100 of a virtual processor model in one embodiment in which the hardware simulator simulates digital circuitry specified in an HDL, while the processor simulator simulates execution of a user program written in 'C.' The system interface layer 1105 of the processor model includes the processor model shell 153 and the software model shell 1107. The latter includes both input/output interface functions and other interface functions, for example, interface functions that access hardware simulation time. Processor model part 1100 includes one or more processor hardware models 1103, and one or more processor software models 1109. The reader will appreciate that a typical processor hardware model may operate in conjunction with a processor software model component. For example, model 1100 may include a hardware bus model 124 (FIG. 1) to model the target processor bus. Model 124 may then be coupled to a memory model 122 (FIG. 1) that uses the memory of the host computer system, in particular, the memory in the processor simulator for the contents of memory. Thus, to simulate a bus/memory access, the hardware bus model in model 1100 provides timing, and a software model that works together with the hardware model to perform the memory access function, i.e., to access target memory contents from the memory model for the user program in response to one or more bus cycles.

Figure 16:
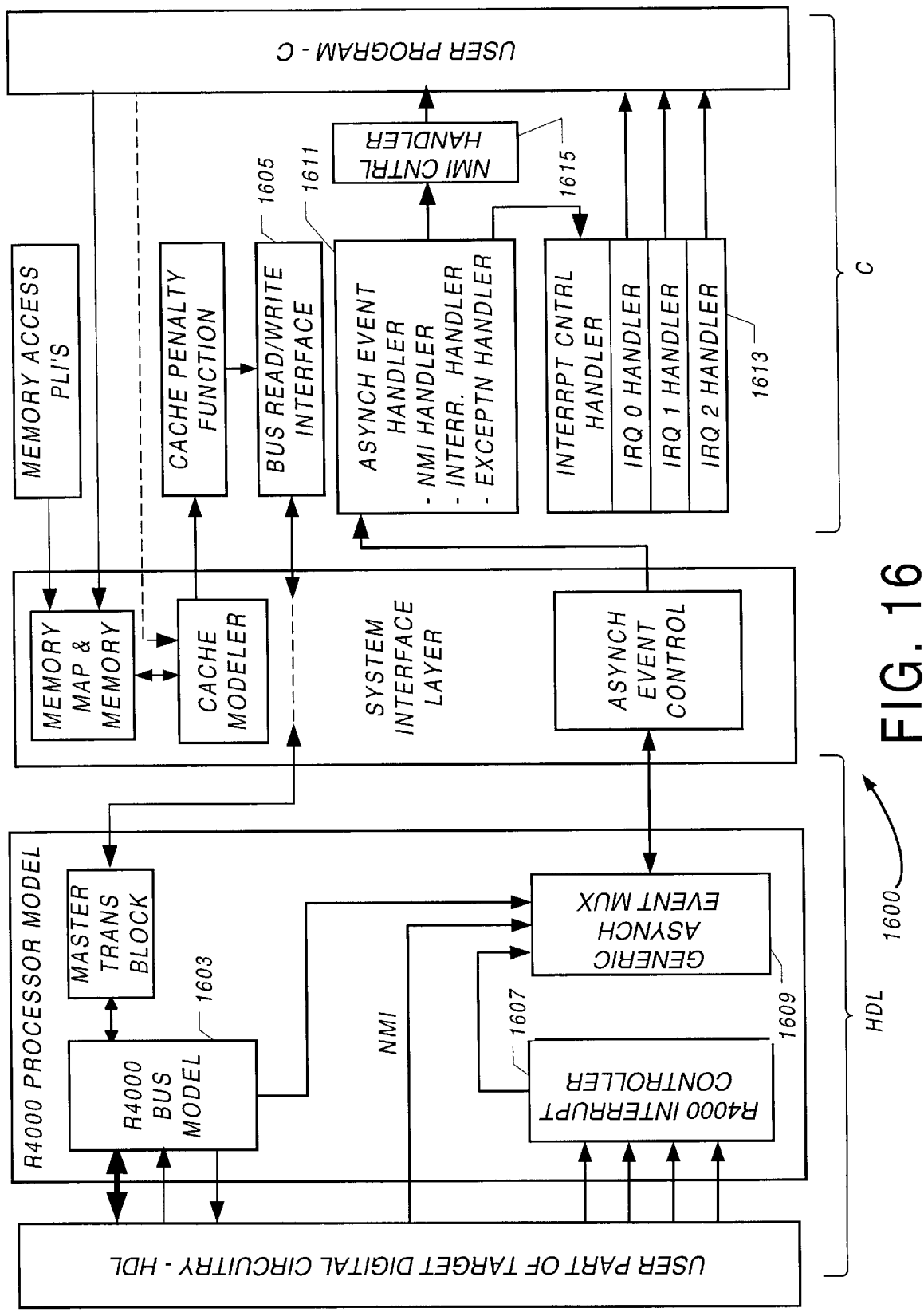
FIG. 16 also shows a processor model formed according to an embodiment of the invention, showing more detail of the model than FIG. 11.

An example of a fairly complex processor model 1600 is shown in FIG. 16. This processor model 1600 is suitable for use in simulating both processor 1 and processor 2 in the electronic system shown in FIG. 8. Processor model 1600 is for a MIPS R4000 and includes a bus model 1603 as part of the processor hardware model, and bus functions (bus read/write interface) 1605 as part of the software processor model of processor model 1600. Similarly, to simulate the processing of interrupts, including non maskable interrupts (NMIs), the hardware model includes an interrupt controller 1607 and an asynchronous event multiplexer 1609 to generate the single asynchronous event provided for in this model, and the software model includes an asynchronous event handler 1611 an interrupt control handler 1613, and an NMI handler as part of the processor software model of processor model 1600.

In general, some processor software models operate without any corresponding processor hardware model. Thus, if a user selects to model a bus access by a fixed time delay, this can be accomplished by a software simulation model.

Therefore, although the present invention has been described in terms of the presently preferred embodiments, it is to be understood that the disclosure is not to be interpreted as limiting. Various alterations and modifications will no doubt become apparent to those of ordinary skill in the art after having read the above disclosure. Accordingly, it is intended that the appended claims be interpreted as covering all alterations and modifications as fall within the true spirit and scope of the invention.

What is claimed is:

1. A co-simulation design system for testing by simulation an electronic system on a host computer system, the electronic system including target digital circuitry, a target processor having a cache, and an accompanying user program to be executed on the target processor, the design system comprising:

a processor simulator using software executing on the host computer system for simulating execution of the user program on the target processor, the software including an analyzed version of the user program;

a hardware simulator to simulate the target digital circuitry using software executing on the host computer system; and an interface mechanism that couples the hardware simulator with the processor simulator including controlling communication between the processor simulator and the hardware simulator, wherein the processor simulator includes a communication mechanism to communicate with the hardware simulator using the interface mechanism when an event requires interaction of the user program with the target digital circuitry, a cache simulator for simulating the operation of the cache;

wherein determining the analyzed version of the user program includes:

decomposing the user program into linear blocks and calculating the time delay that would be incurred by executing each linear block on the target processor, the time calculating incorporating target processor instruction timing, and identifying those parts of the user program that include one or more references that might require a cache lookup;

such that executing the analyzed version of the user program:

(i) causes the cache simulator to be invoked for at least one of the references that includes a memory reference that requires a cache lookup, invoking the cache simulator accounting for the effect of any cache misses on timing, and (ii) produces accurate timing information incorporating target processor instruction timing and cache effects.

2. The design system of claim 1, wherein the target processor includes a pipeline, and wherein the time calculating incorporates pipeline effects, such that executing the analyzed version of the user program produces accurate timing information incorporating target processor instruction timing, cache effects, and pipeline effects.

3. The design system of claim 1, wherein executing the analyzed version of the user program causes the cache simulator to be invoked for any reference that include a memory reference that requires a cache lookup.

4. The design system of claim 3, wherein the user program includes statements in a high level language, wherein decomposing the user program into linear blocks includes parsing the user program to determine linear block boundaries, wherein calculating the time delay for each linear block comprises:

cross-compiling the user program to produce target code;
parsing the cross-compiled target code to determine the time delay for each line in each section of the target code corresponding to each linear block in the user program, the time delay determining using characteristics of the target processor; and
calculating the time delay for each linear block of the user program from the time delays determined in the target code parsing step, and
wherein identifying those parts of the user program that include one or more references that might require a cache lookup further includes:
inserting hooks in the user program to invoke, at run time, the cache simulator for any reference that includes a memory reference.

5. The design system of claim 4,
wherein the processor simulator further includes a memory mapper that translates between host memory addresses and target memory addresses, the translation using memory mapping information, and
wherein invoking the cache simulator for one of the memory references further includes invoking the memory mapper to translate the host memory address for the memory reference into the target memory address for the memory reference.

6. The design system of claim 5,
wherein the target digital circuitry including one or more devices coupled to the target processor, each device having a target address,
wherein the memory mapper also translates between the host addresses of each of the devices and the target addresses of each of the devices,
wherein the identifying step of determining the analyzed version of the user program includes identifying those parts of the user program that include one or more references that each is either a memory references or a reference that require a read or write to a device, and inserting hooks in the user program to invoke, at run time, a reference process for each of the references, the reference process including: determining if the reference is a memory reference or a device reference, and if a device reference, determining the target address of the device, and causing the processor simulator to communicate with the hardware simulator via the communication mechanism to cause the device to be written to or read from, and if a memory reference, invoking the cache simulator for the memory reference.

7. The design system of claim 4,
wherein the processor simulator further includes a memory allocation simulator that allocates memory on the host computer system while simulating the allocation of memory by the target processor, and
wherein the analysis process includes inserting hooks in the user program to invoke the memory allocation simulator during execution of the analyzed program that correspond to dynamic memory allocations that would occur if the user program was being executed on the target processor.

8. The design system of claim 3,
wherein the cache includes a data-cache and the processor simulator includes a data cache model, and
wherein identifying those parts of the user program that include one or more memory references that might require a cache lookup further includes:
identifying those parts of the user program that include one or more memory references that require a data-cache lookup, and
inserting hooks in the user program to invoke, at run time, the cache simulator using the data-cache model for the memory references that require a data-cache lookup.

9. The design system of claim 3,
wherein the cache includes an instruction-cache and the processor simulator includes an instruction-cache model, and
wherein identifying those parts of the user program that include one or more memory references that might require a cache lookup further includes:
identifying those parts of the user program that include one or more memory references that require an instruction-cache lookup, and
inserting hooks in the user program to invoke, at run time, the cache simulator using the instruction cache model for the memory references that require an instruction cache lookup.

10. The design system of claim 4, wherein the analyzed user program includes instructions for accumulating the calculated linear block time delays, and executing the analyzed program includes executing the user program and executing the time delay accumulation instructions.

11. The design system of claim 4, wherein executing the analyzed program includes executing the user program while making reference to the calculated linear block time delays.

12. The design system of claim 3,
wherein the processor simulator and the hardware simulator process independently of each other.

13. The design system of claim 3,
wherein the processor simulator communication mechanism communicates information associated with the event to the hardware simulator, and
wherein the hardware simulator receives the associated event information.

14. The design system of claim 13,
wherein the hardware simulator processes the associated event information.

15. The design system of claim 14,
wherein the event information includes time delay information indicating an amount of simulated time since a previous event, and
wherein, upon receiving the time delay information, the hardware simulator executes an appropriate amount of hardware simulation time.

16. The design system of claim 3,
wherein the host computer system includes a computer network containing a first and a second host computer,
wherein the processor simulator operates on the first host computer,
wherein the hardware simulator operates on the second host computer, and
wherein the processor simulator is coupled to the hardware simulator by a computer network connection of the computer network, and
wherein the interface mechanism controls communications over the network connection.

17. The design system of claim 14, further comprising
a suspend mechanism coupled to the processor simulator that temporarily halts execution of the user program on the processor simulator while the hardware simulator processes the event information.

18. The design system of claim 17, wherein the interface mechanism includes the suspend mechanism.

19. The design system of claim 14,
wherein the hardware simulator processing the event information produces an event result, and,
wherein the hardware simulator includes a mechanism to communicate the event result to the processor simulator using the interface mechanism.

20. The design system of claim 19, wherein the event result is an interrupt, and is processed upon receipt of the event result by the processor simulator.

21. The design system of claim 19, further including
a resumption mechanism coupled to the processor simulator to resume execution of the user program upon receipt of the event result.

22. The design system of claim 4, wherein the cache simulator returns a time delay when the cache simulator determines there is a cache miss.

23. The design system of any of claims 4–22, wherein the significant event is the cache simulator determining that there is a cache miss that requires a number of bus cycles to be executed, the number of bus cycles determined by characteristics of the cache.

24. The design system of claim 23, further comprising
a suspend mechanism coupled to the processor simulator, wherein the target processor includes a bus and wherein the target digital circuitry simulated by the hardware simulator includes a bus model,
wherein the processor simulator communication mechanism communicates information associated with the event to the hardware simulator,
wherein the hardware simulator receives the associated event information and processes the associated event information, processing the associated event information including processing the number of bus cycles, and
wherein the suspend mechanism temporarily halts execution of the user program on the processor simulator while the hardware simulator processes the event information.

25. The design system of claim 3, wherein the event requiring the user program to interact with the target digital circuitry is an input/output instruction to the hardware simulator.

26. The design system of claim 3, wherein the processor simulator uses a first data format and the hardware simulator uses a second data format, the system further including a translator to convert the associated event information from the first data format to the second data format.

27. The design system of claim 19,
wherein the hardware simulator contains a processor model shell to access of at least some of the external hardware signals of the target processor connected to the digital circuitry in the electronic system, and
wherein the processor simulator uses a first data format and the hardware simulator uses a second data format,
the design system further including a mapper to map an event result in the second data format to the first data format.

28. The design system of claim 27, wherein the host computer system includes a computer network, wherein the processor simulator is coupled to the translator and the mapper by a first computer network connection of the computer network, the interface mechanism controlling communication between the processor simulator, and the translator and the mapper over the first network connection.

29. The design system of claim 28, wherein the translator and the mapper are coupled to the hardware simulator by a second computer network connection of the computer network, the interface mechanism controlling communication between the translator and the mapper, and the hardware simulator over the first and second network connections.

30. The design system of claim 3, wherein the hardware simulator operates in a hardware description language, and at least some of the digital circuitry is specified in the hardware description language.

31. The design system of claim 3, wherein the hardware simulator provides for modeling digital circuitry in a high level language and, wherein at least some of the digital circuitry is specified in the high level language.

32. The design system of claim 3, wherein the interface mechanism includes a message passing kernel.

33. The design system of claim 32, wherein the processor simulator and the hardware simulators are tasks under the kernel.

34. The design system of claim 32, wherein the host computer system includes a plurality of host processors, and, wherein the processor simulator and the hardware simulators execute on different host processors.

35. A co-simulation design system for testing by simulation an electronic system on a host computer system, the electronic system including target digital circuitry, first and second target processors, and accompanying first and second user programs to be executed on each of the target processors, at least the first target processor having a cache, the design system comprising:
a first processor simulator using software executing on the host computer system for simulating execution of the first user program on the first target processor, the software including an analyzed version of the first user program;
a second processor simulator using software executing on the host computer system for simulating execution of the second user program on the second target processor, the software including an analyzed version of the second user program;
a hardware simulator to simulate the target digital circuitry using software executing on the host computer system; and
an interface mechanism that couples the hardware simulator with the first and second processor simulators, including controlling communication between the first and second processor simulators and the hardware simulator,
wherein the first processor simulator includes a first mechanism to communicate with the hardware simulator using the interface mechanism when an event requires interaction of the first user program with the target digital circuitry,
wherein the second processor simulator includes a second mechanism to communicate with the hardware simulator using the interface mechanism when an event requires interaction of the second user program with the target digital circuitry,
wherein determining the analyzed version of each user program includes decomposing the respective user program into linear blocks and calculating the time delay that would be incurred by executing each linear block on the respective target processor, the time calculating incorporating respective target processor's instruction timing,
wherein determining the analyzed version of the first user program further includes identifying those parts of the first user program that include one or more references that might require a cache lookup,
such that executing the analyzed version of each user program produces accurate timing information incorporating the respective target processor instruction timing including any cache effects in the case of the first target processor.

36. The design system of claim 35, wherein at least one of the target processors includes a pipeline, and wherein the time calculating for determining the analyzed version of the user program for the target processor that includes the pipeline also incorporates pipeline effects, such that executing the analyzed version of the user program for the target processor that includes the pipeline produces timing information that also incorporates pipeline effects.

37. The design system of claim 35, wherein the first and second processor simulators and the hardware simulator process independently of each other.

38. The design system of claim 35,
wherein the first processor simulator communication mechanism communicates information associated with the first user program event to the hardware simulator,
wherein the second processor simulator communication mechanism communicates information associated with the second user program event to the hardware simulator,
wherein the hardware simulator receives the first user program associated event information, and
wherein the hardware simulator receives the second user program associated event information.

39. The design system of claim 38,
wherein the hardware simulator processes the first user information associated event information, generating a first user program event result, and
wherein the hardware simulator processes the second user information associated event information, generating a second user program event result.

40. The design system of claim 39,
wherein each event information includes time delay information indicating an amount of simulated time since the hardware simulator last received previous event information from the respective user program, and
wherein, upon receiving the time delay information from either of the processor simulators, the hardware simulator executes an appropriate amount of hardware simulation time.

41. The design system of claim 40, wherein the time delay information is forwarded to the hardware simulator from either of the processor simulator when no event information has been conveyed by that processor simulator to the hardware simulator within a predetermined amount of time.

42. The design system of claim 35,
wherein the host computer system includes a computer network containing a first and a second host computer,
wherein the processor simulator operates on the first host computer, wherein the hardware simulator operates on the second host computer,
wherein the processor simulator is coupled to the hardware simulator by a computer network connection of the computer network, and
wherein the interface mechanism controls communications over the network connection.

43. The design system of claim 35, further comprising:
first and second suspend mechanisms respectively coupled to the first and second processor simulators, each suspend mechanism temporarily halting execution of the respective user program on the respective processor simulator while the hardware simulator processes the respective user program event information.

44. The design system of claim 43,
wherein the interface mechanism includes the suspend mechanisms.

45. The design system of claim 39, wherein the hardware simulator processes the event information producing an event result for information associated with each event, and
wherein the hardware simulator includes a mechanism to communicate the event result to the respective processor simulator whose user program produced the event, using the interface mechanism.

46. The design system of claim 45, wherein one of the event results is an interrupt for a particular target processor, and is processed upon receipt of the event result by one of the processor simulator associated to the event.

47. The design system of claim 45 further including first and second resumption mechanisms respectively coupled to the first and second processor simulators to resume execution of the respective user program upon receipt of the respective user program event result.

48. The design system of claim 35,
wherein the host computer system includes a computer network, and,
wherein the first and second processor simulators are each coupled to the hardware simulator by a respective computer network connection of the computer network, the interface mechanism controlling communications over the network connections.

49. The design system of claim 35,
wherein the one of the user program events is an input/output instruction to the hardware simulator, and
wherein the interface mechanism controls communication of the input/output instruction from the event-associated processor simulator to the hardware simulator.

50. The design system of claim 35,
wherein the first and second processor simulators use a first data format and the hardware simulator uses a second data format, the system further including a translator to convert the events when the first or second user program for the first or second target processor, respectively, requires interaction with the target digital circuitry from the first data format to the second data format.

51. The design system of claim 50, wherein the hardware simulator contains first and second processor model shells to simulate activation of the pins of the first and second target processors, respectively, the system further including a mapper to map an event result in the second data format to the first processor data format.

52. The design system of claim 35, wherein the interface mechanism includes a message passing kernel.

53. A method of simulating an electronic system that includes target digital circuitry and a target processor having a cache, the method comprising:
(a) simulating execution of the user program on the target processor by executing the analyzed version of the user program on the host processor, the executing of the analyzed version including invoking a cache simulation process for a memory reference in the user program, and accumulating accurate timing information, the cache simulation process simulating the cache to account for the timing effects of a cache miss, and the accurate timing information including incorporating instruction timing;
(b) simulating the target digital circuitry on a hardware simulator operating on the host computer system, the simulating of the target digital circuitry including accumulating accurate timing information; and
(c) passing communication between the simulation of execution of the user program and the hardware simulator at significant events, including events that require interaction between the user program and the target digital circuitry.

54. The method according to claim 53, wherein the analyzed version of the user program is obtained by an analysis process including: decomposing the user program into linear blocks, calculating the time delay related to the delay that would be incurred by executing each linear block on the target processor with no cache misses, identifying those parts of the user program that have one or more references that might require a cache lookup, and inserting hooks into the user program to invoke the cache simulation process for the one or more memory references, the time delay calculating incorporating target processor instruction timing according to the target processor characteristics.

55. The method according to claim 54, wherein the target processor includes a pipeline, and wherein the time calculating incorporates pipeline effects, such that executing the analyzed version of the user program produces accurate timing information incorporating target processor instruction timing, cache effects, and pipeline effects.

56. The method according to claim 53, wherein one of the significant events is a particular event requiring the user program to interact with the hardware simulator, and wherein the communication is information associated with the particular event, the associated event passed to the hardware simulator.

57. The method according to claim 56, further comprising:
  (d) receiving and processing the associated event information at the processor simulator.

58. The method according to claim 57, wherein the associated event information includes time delay information indicating an amount of simulated time since a previous significant event, and wherein said step (d) of processing executes an appropriate amount of hardware simulation time.

59. The method according to claim 58, further comprising:
  (e) suspending step (a) of simulating execution of the user program while the associated event information is processed in said step (d).

60. The method according to claim 58, wherein said associated event processing step (d) produces an event result.

61. The method according to claim 59, wherein said associated event processing step (d) produces an event result, the method further including:
  (f) resuming said execution user program simulating step (a) when the event result is produced.

62. The method according to claim 61, wherein the event result is an asynchronous event, and wherein said resuming step (b) causes simulation of execution of an asynchronous event handler, the handler being part of the user program.

63. The method according to claim 62, wherein the asynchronous event occurs before the processor simulator executes the appropriate amount of hardware simulation time.

64. The method according to claim 54, further including:
  (d) modeling one or more aspects of the target processor execution at a user selected level of detail.

65. The method according to claim 64, wherein the analyzing step further comprises:
  inserting hooks into the user program that causes at run time the one or more aspects of the target processor execution to be simulated at the selected level of accuracy.

66. The method according to claim 64, wherein the one or more aspects are modeled in hardware, and wherein the inserted code causes the one or more aspects to be simulated on the hardware simulator.

67. A method for creating a processor model for simulating the operation of a target processor executing a user program, the processor model for use in a simulation design system operable on a host computer system to simulate an electronic system that contains target digital circuitry and the target processor, the target processor having a cache, the design system including a hardware simulator for simulating the digital circuitry on the host computer system, the method comprising:

(a) creating a processor model shell for operation on the hardware simulator, the processor model shell accessing one or more signals of the target processor accessible to digital circuitry external to the target processor;
  (b) creating a software shell to provide the user program access to the processor signals coupled to the digital circuitry in the electronic system; and
  (c) creating target processor specific information for use in analyzing a user program to determine user program timing information such that when the user program is run on a processor simulator operating on the host computer system, the processor simulator accurately simulates execution, including providing timing, as if the user program was executing on the target processor, the timing taking into account instruction timing and pipeline effects, the user program analyzing including: decomposing the user program into linear blocks, calculating the time delay related to the delay that would be incurred by executing each linear block on the target processor with no cache misses, identifying those parts of the user program that have one or more references that might require a cache lookup, and inserting hooks into the user program to invoke the cache simulation process for any references that include a memory reference that requires a cache lookup, the time delay calculating using the target processor specific information.

68. The method of claim 67,
wherein the hardware simulator simulates hardware described in a hardware description language, and
wherein the processor model shell comprises an interface in the hardware description language.

69. The method of claim 68, wherein the software shell comprises high-level computer language code.

70. The method of claim 67,
wherein the hardware simulator simulates hardware using a high level language, and
wherein the processor model shell comprises an interface in the high level language.

71. The method of claim 67,
wherein the user program includes high level computer language code,
wherein determining the time delay for each linear block comprises:
  cross-compiling the user program to produce target code;
  parsing the cross-compiled target code to determine the time delay for each line in each section of the target code corresponding to each linear block in the user program; and
  determining the time delay for each linear block of the user program from the time delays determined in the target code parsing step, and
wherein the target processor specific information includes information on how to parse cross-compiled target code.

72. The method of claim 67,
wherein the hardware simulator defines the simulation time frame, and
wherein the software shell further provides a user program access to the hardware simulator for the purpose of user program time control.

73. The method of claim 67, further including:
selecting a level of detail of the processor model.

74. The method of claim 73, wherein said selecting a level of detail further includes:
  modeling in hardware one or more aspects of the target processor execution where greater accuracy is desired, execution of the one or more aspects simulated on the hardware simulator.

75. The method of claim 73, wherein the user program analyzing further includes inserting code into the user program that simulates at execution time one or more aspects of the target processor execution where greater accuracy is desired.

76. The method of claim 75, wherein inserted code includes code that causes the hardware simulator to simulate at least part of the one or more aspects of the target processor execution.

77. A method of simulating on a host computer system the execution of a user program on a target processor having a cache, the method comprising:

(a) decomposing the user program into linear blocks;

(b) determining linear block timing information including the time delays that would be incurred executing each linear block of the user program on the target processor with no cache misses, the determining using characteristics of the target processor including instruction timing and cache characteristics, the block timing information taking into account instruction timing and pipeline effects; and (c) identifying those parts of the user program that include one or more references that might require a cache lookup;

(d) inserting hooks into the user program to invoke a cache simulation process for any reference that includes a memory reference requiring a cache lookup;

(e) combining the linear block timing information with the user program;

(f) executing the combined user program and linear block timing information on the host computer system; and (g) simulating the target digital circuitry on a hardware simulator running on the host computer system, wherein execution of the combined user program and linear block timing information on the host computer system includes communicating with the hardware simulator when an event requires interaction of the user program with the target digital circuitry, such that the execution of the combined user program and linear block timing information on the host computer system simulates the execution of the user program on the target processor including providing accurate execution timing that takes into account instruction timing and cache effects.

78. The method of claim 77,
wherein the user program includes statements in a high level language,
wherein the step of decomposing the user program into linear blocks includes parsing the user program to determine linear block boundaries,
wherein determining the time delay for each linear block comprises:

cross-compiling the user program to produce target code;

parsing the cross-compiled target code to determine the time delay for each line in each section of the target code corresponding to each linear block in the user program, the time delay determining using characteristics of the target processor; and determining the time delay for each linear block of the user program from the time delays determined in the target code parsing step.

79. The method of claim 78,
wherein combining the linear block timing information with the user program produces an analyzed user program that includes instructions for accumulating the timing delay, and wherein the executing executes the analyzed user program on the host processor.

80. A co-simulation design system for testing by simulation an electronic system on a host computer system, the electronic system including target digital circuitry, a target processor, and an accompanying user program to be executed on the target processor having a target processor bus, the design system comprising:

a processor simulator using software executing on the host computer system for simulating execution of the user program on the target processor, the software including an analyzed version of the user program;

a hardware simulator to simulate the target digital circuitry using software executing on the host computer system; and an interface mechanism that couples the hardware simulator with the processor simulator including controlling communication between the processor simulator and the hardware simulator, wherein the processor simulator includes a communication mechanism to communicate with the hardware simulator using the interface mechanism when an event requires interaction of the user program with the target digital circuitry, wherein at least some of the operation of the target processor bus may be simulated by running a hardware model of the target processor bus on the hardware simulator, wherein determining the analyzed version of the user program includes:

decomposing the user program into linear blocks and calculating the time delay that would be incurred by executing each linear block on the target processor, the time calculating incorporating target processor instruction timing, such that executing the analyzed version of the user program produces accurate timing information incorporating target processor instruction timing.

81. A co-simulation design system for testing by simulation an electronic system on a host computer system, the electronic system including target digital circuitry, a target processor, and an accompanying user program to be executed on the target processor, the target digital circuitry including target memory for the target processor, the design system comprising:

a processor simulator using software executing on the host computer system for simulating execution of the user program on the target processor, the software including an analyzed version of the user program;

a hardware simulator to simulate the target digital circuitry using software executing on the host computer system; and an interface mechanism that couples the hardware simulator with the processor simulator including controlling communication between the processor simulator and the hardware simulator, wherein the processor simulator includes a communication mechanism to communicate with the hardware simulator using the interface mechanism when an event requires interaction of the user program with the target digital circuitry, and a memory mapper that translates between host memory addresses and target memory addresses, the translation using memory mapping information, wherein at least some of the operation of the target memory may be simulated by running a hardware model of the target memory on the hardware simulator, wherein the contents of the simulated target memory are stored on the host computer system, wherein determining the analyzed version of the user program includes:

decomposing the user program into linear blocks and calculating the time delay that would be incurred by executing each linear block on the target processor, the time calculating incorporating target processor instruction timing, such that executing the analyzed version of the user program produces accurate timing information incorporating target processor instruction timing.

82. The design system of claim 81,
wherein the user program includes statements in a high level language,
wherein decomposing the user program into linear blocks includes parsing the user program to determine linear block boundaries,
wherein calculating the time delay for each linear block comprises:

cross-compiling the user program to produce target code;

parsing the cross-compiled target code to determine the time delay for each line in each section of the target code corresponding to each linear block in the user program, the time delay determining using characteristics of the target processor; and calculating the time delay for each linear block of the user program from the time delays determined in the target code parsing step.

83. The design system of claim 82,
wherein the processor simulator further includes a memory allocation simulator that allocates memory on the host computer system while simulating the allocation of memory by the target processor, and
wherein the analysis process includes inserting hooks in the user program to invoke the memory allocation simulator during execution of the analyzed program that correspond to dynamic memory allocations that would occur if the user program was being executed on the target processor.

84. A co-simulation design system for testing by simulation an electronic system on a host computer system, the electronic system including target digital circuitry, a target processor, and an accompanying user program to be executed on the target processor, the design system comprising:

a processor simulator using software executing on the host computer system for simulating execution of the user program on the target processor, the software including an analyzed version of the user program;

a hardware simulator to simulate the target digital circuitry using software executing on the host computer system; and an interface mechanism that couples the hardware simulator with the processor simulator including controlling communication between the processor simulator and the hardware simulator, wherein the processor simulator includes a communication mechanism to communicate with the hardware simulator using the interface mechanism when an event requires interaction of the user program with the target digital circuitry, and a memory allocation simulator that allocates memory on the host computer system while simulating the allocation of memory by the target processor, wherein determining the analyzed version of the user program includes:

decomposing the user program into linear blocks and calculating the time delay that would be incurred by executing each linear block on the target processor, the time calculating incorporating target processor instruction timing, and inserting hooks in the user program to invoke the memory allocation simulator during execution of the analyzed program that correspond to dynamic memory allocations that would occur if the user program was being executed on the target processor, and such that executing the analyzed version of the user program produces accurate timing information incorporating target processor instruction timing.

85. A co-simulation design system for testing by simulation an electronic system on a host computer system, the electronic system including target digital circuitry, a target processor, and an accompanying user program to be executed on the target processor, the target digital circuitry including one or more devices coupled to the target processor, each device having a target address, the design system comprising:

a processor simulator using software executing on the host computer system for simulating execution of the user program on the target processor, the software including an analyzed version of the user program;

a hardware simulator to simulate the target digital circuitry using software executing on the host computer system; and an interface mechanism that couples the hardware simulator with the processor simulator including controlling communication between the processor simulator and the hardware simulator, wherein the processor simulator includes a communication mechanism to communicate with the hardware simulator using the interface mechanism when an event requires interaction of the user program with the target digital circuitry, and wherein determining the analyzed version of the user program includes:

decomposing the user program into linear blocks and calculating the time delay that would be incurred by executing each linear block on the target processor, the time calculating incorporating target processor instruction timing, and identifying those parts of the user program that include one or more references that might require a read or write to a device;

such that executing the analyzed version of the user program (i) causes the processor simulator to communicate with the hardware simulator via the communication mechanism to cause the device to be written to or read from for any reference that is a device reference requiring a read or write to a device, and (ii) produces accurate timing information incorporating target processor instruction timing.

86. The design system of claim 85,
wherein the processor simulator further includes a memory mapper that translates between the host addresses of each of the devices and target addresses of each of the devices, and wherein the analysis process includes inserting hooks in the user program to invoke during execution of the analyzed program a reference process for each of the references, the reference process including: determining if the reference is a memory reference or a device reference, and if a device reference, determining the target address of the device, and causing the processor simulator to communicate with the hardware simulator via the communication mechanism to cause the device to be written to or read from.

\* \* \* \* \*

UNITED STATES PATENT AND TRADEMARK OFFICE
CERTIFICATE OF CORRECTION

PATENT NO. : 6,263,302 B1
DATED : July 17, 2001
INVENTOR(S) : Hellestrand et al.

It is certified that error appears in the above-identified patent and that said Letters Patent is hereby corrected as shown below:

Column 49,
Line 39, change "the processor simulator operates" with -- the first and second processor simulators operate --.
Line 42, change "the processor simulator is" to -- the first and second processor simulators are --.

Column 50,
Line 41, change "the host processor," to -- a host processor, --.
Line 65, change "references" to -- memory references --.

Signed and Sealed this

Fifth Day of October, 2004

JON W. DUDAS
*Director of the United States Patent and Trademark Office*